US008847720B2

United States Patent
Goldbaum

(10) Patent No.: US 8,847,720 B2
(45) Date of Patent: Sep. 30, 2014

(54) ELECTROMAGNETIC INDUCTION DEVICE FOR GENERATION OF ELECTRICAL POWER

(71) Applicant: Harold J. Goldbaum, Vero Beach, FL (US)

(72) Inventor: Harold J. Goldbaum, Vero Beach, FL (US)

( * ) Notice: Subject to any disclaimer, the term of this patent is extended or adjusted under 35 U.S.C. 154(b) by 0 days.

(21) Appl. No.: 13/669,400

(22) Filed: Nov. 5, 2012

(65) Prior Publication Data

US 2014/0043128 A1 Feb. 13, 2014

Related U.S. Application Data

(60) Provisional application No. 61/555,862, filed on Nov. 4, 2011.

(51) Int. Cl.
*H01F 27/28* (2006.01)
*H01F 27/00* (2006.01)
*H02N 11/00* (2006.01)

(52) U.S. Cl.
CPC .............. *H01F 27/00* (2013.01); *H02N 11/008* (2013.01)
USPC .......................................... 336/186; 336/187

(58) Field of Classification Search
USPC ................................................ 336/186, 187
See application file for complete search history.

(56) References Cited

U.S. PATENT DOCUMENTS

| 2,821,685 | A | * | 1/1958 | Whitehorn | ..................... 333/156 |
| 3,777,255 | A | * | 12/1973 | Young et al. | ............. 324/207.17 |
| 5,331,536 | A | * | 7/1994 | Lane | .............................. 363/126 |
| 6,713,735 | B2 | * | 3/2004 | Terano | .......................... 219/632 |
| 2003/0102862 | A1 | * | 6/2003 | Goto et al. | ................ 324/207.16 |
| 2005/0068030 | A1 | * | 3/2005 | Mansfield et al. | ............ 324/309 |
| 2009/0289750 | A1 | * | 11/2009 | Ohsawa | ........................ 336/192 |

* cited by examiner

*Primary Examiner* — Tsz Chan
(74) *Attorney, Agent, or Firm* — Allen D. Hertz, P.A.; Allen D. Hertz

(57) ABSTRACT

An electromagnetic induction device having an array of linearly arranged wires spanning between a pair of conductor plates forming a parallel circuit between each of the wires. The wires are arranged forming a plurality of planes, which are stacked into layers. Multiple induction devices are assembled together providing at least one "inductor" and at least one "inductee". A moving magnetic field comprised of concentric circles is created in and around the at least one inductor when a cyclic current flows in the said wires. A voltage and current is induced by the said moving magnetic field. The field propagates then collapses through the wires of the inductees in a perpendicular manner, inducing therein a cyclic voltage and a current flow. The "inductor" and "inductee" can be shaped and assembled in a variety of form factors, including a linear arrangement, a toroidal arrangement, a stacked arrangement, and the like.

20 Claims, 23 Drawing Sheets

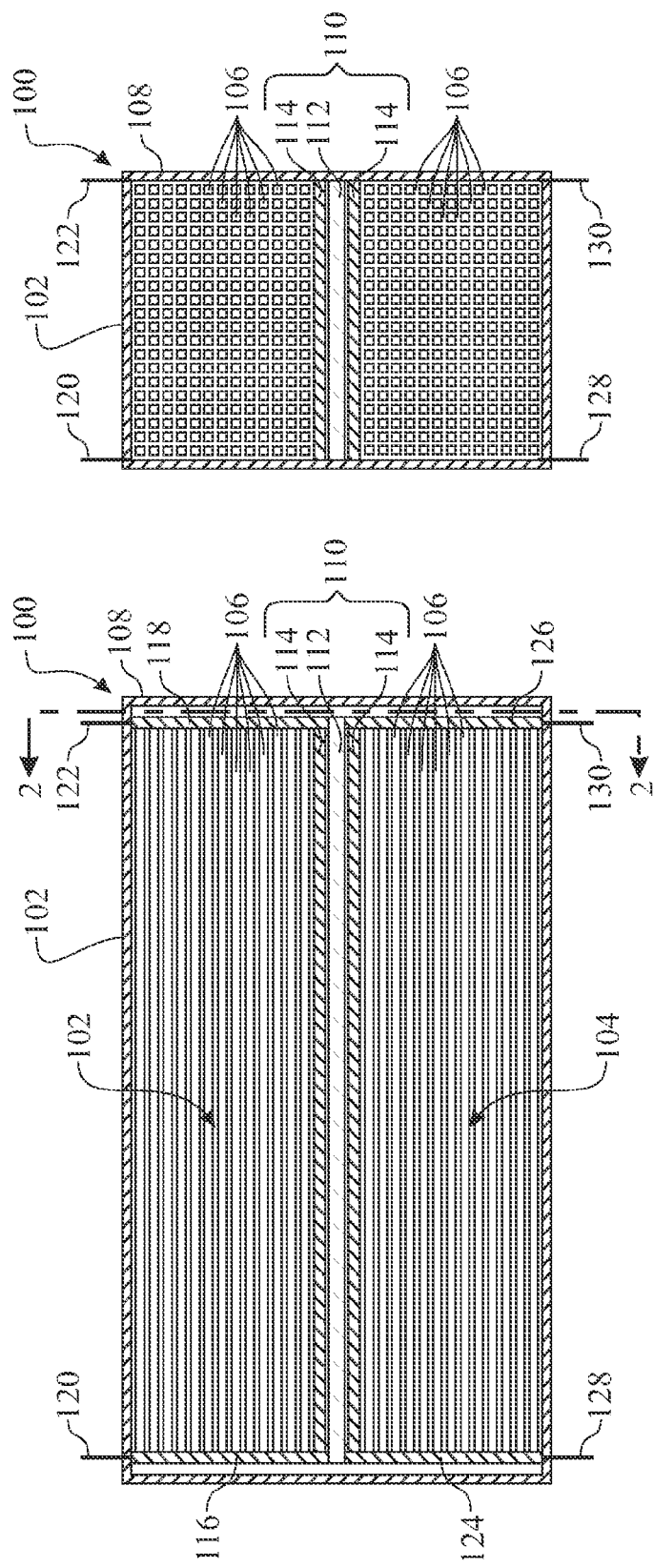

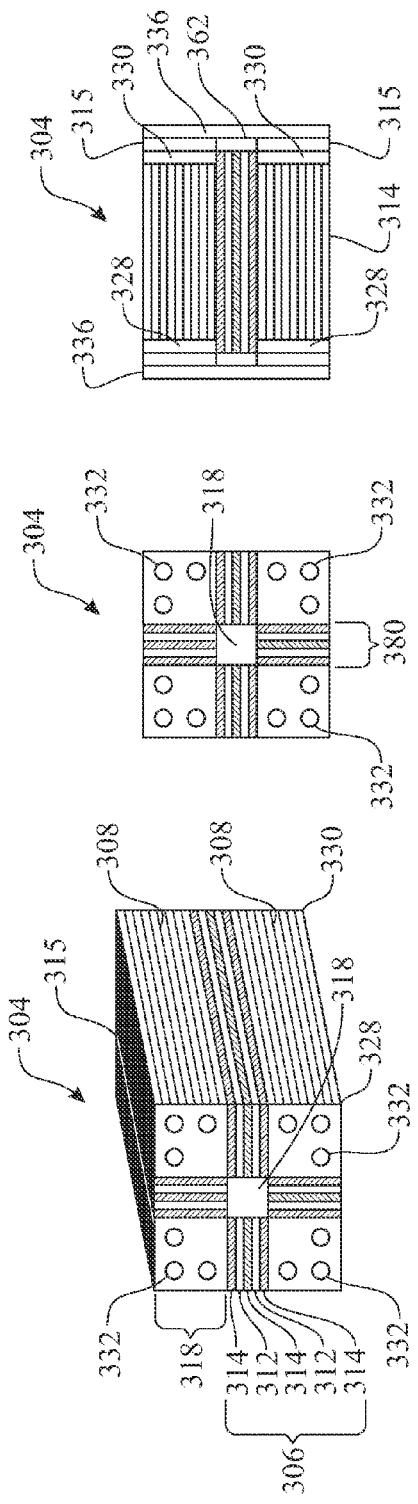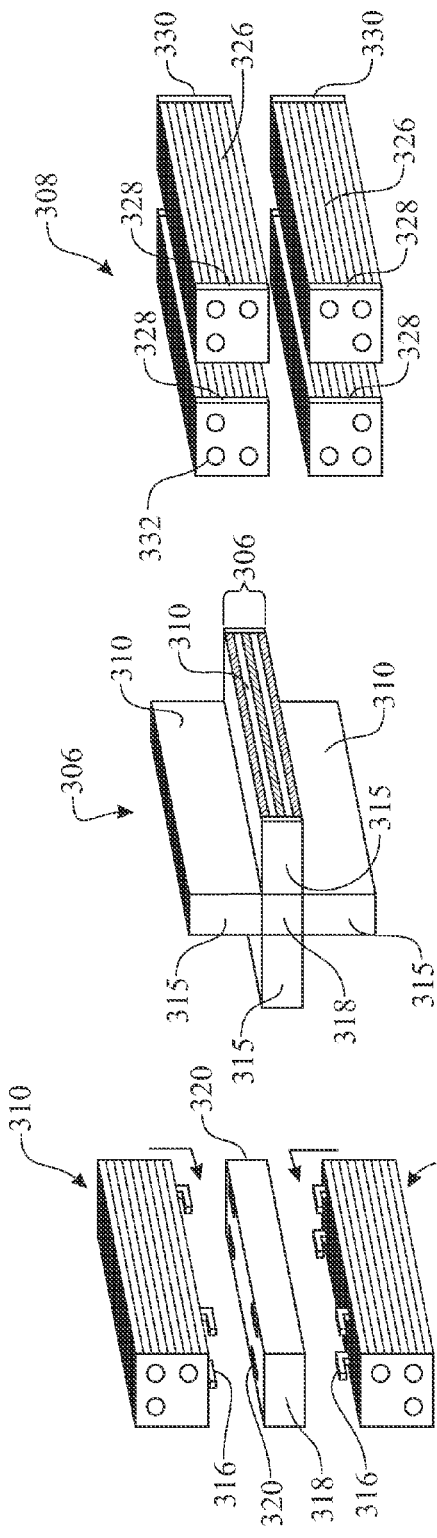

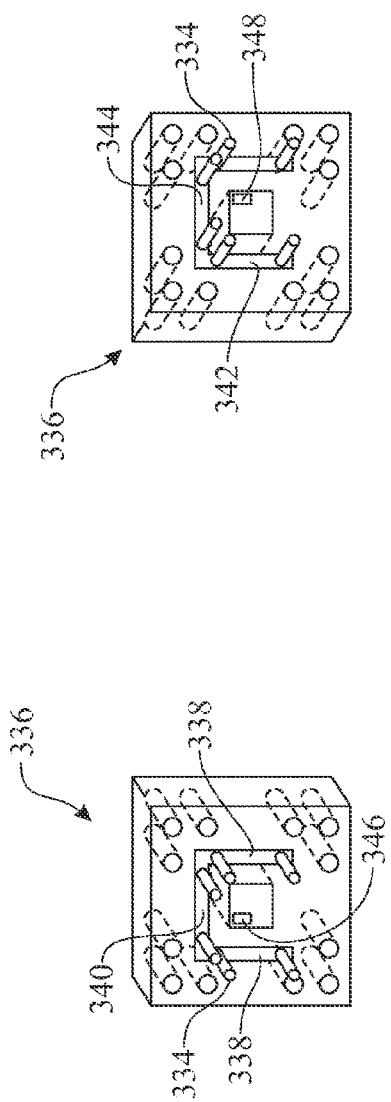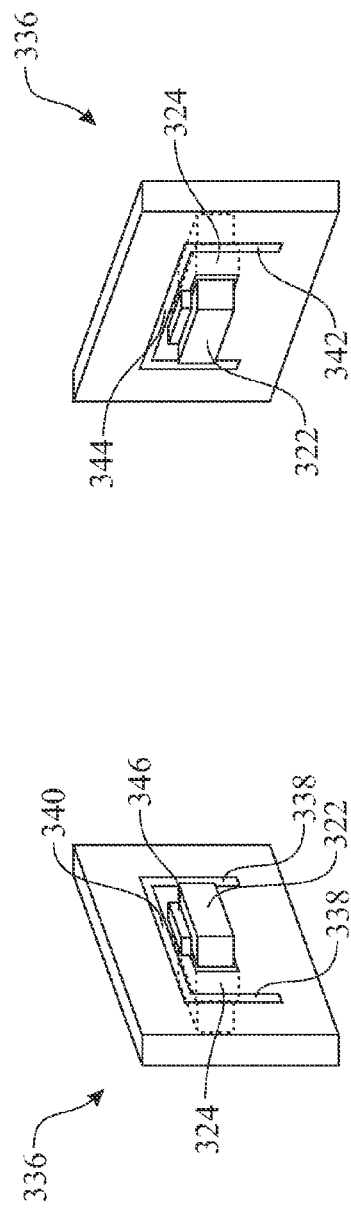

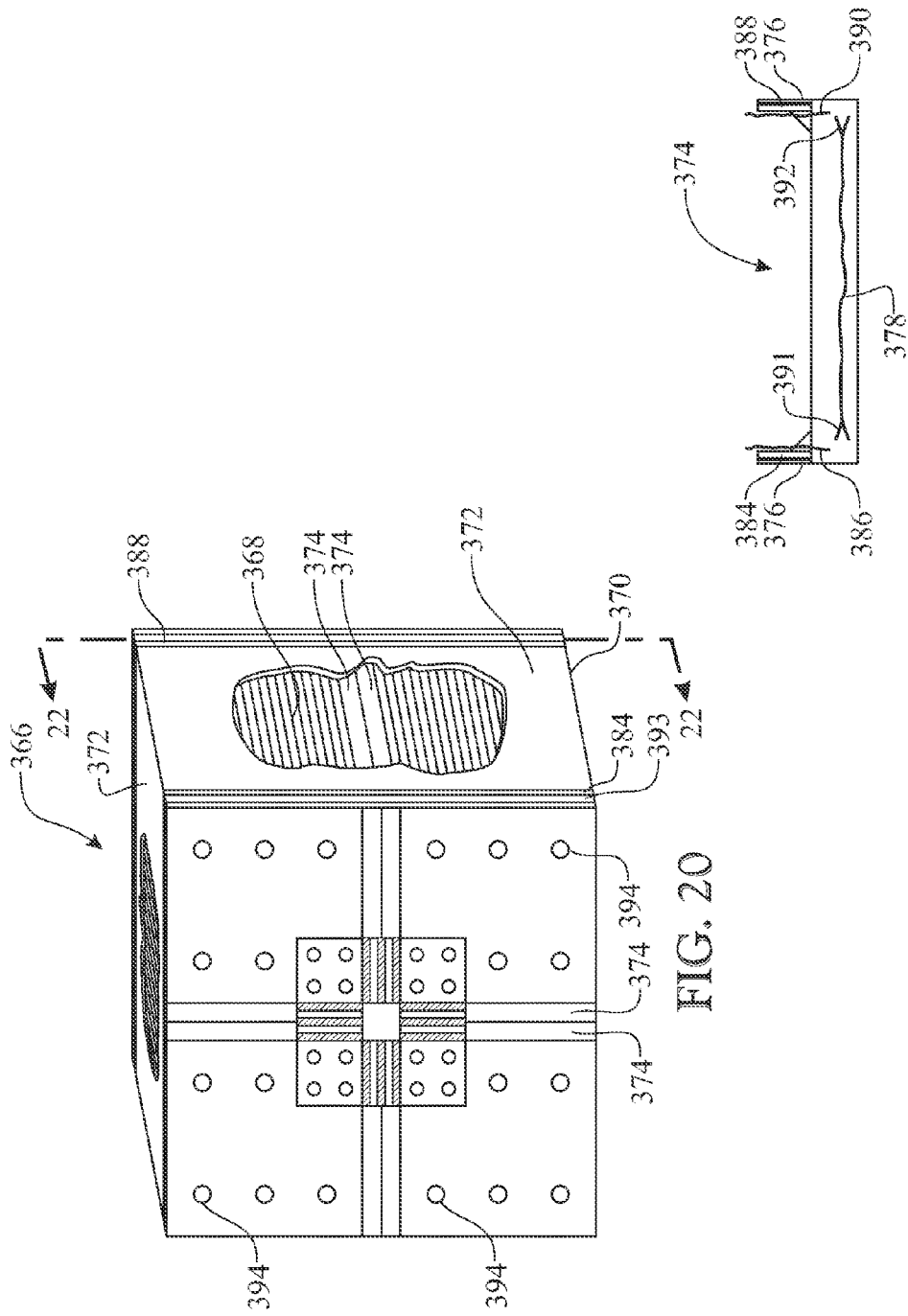

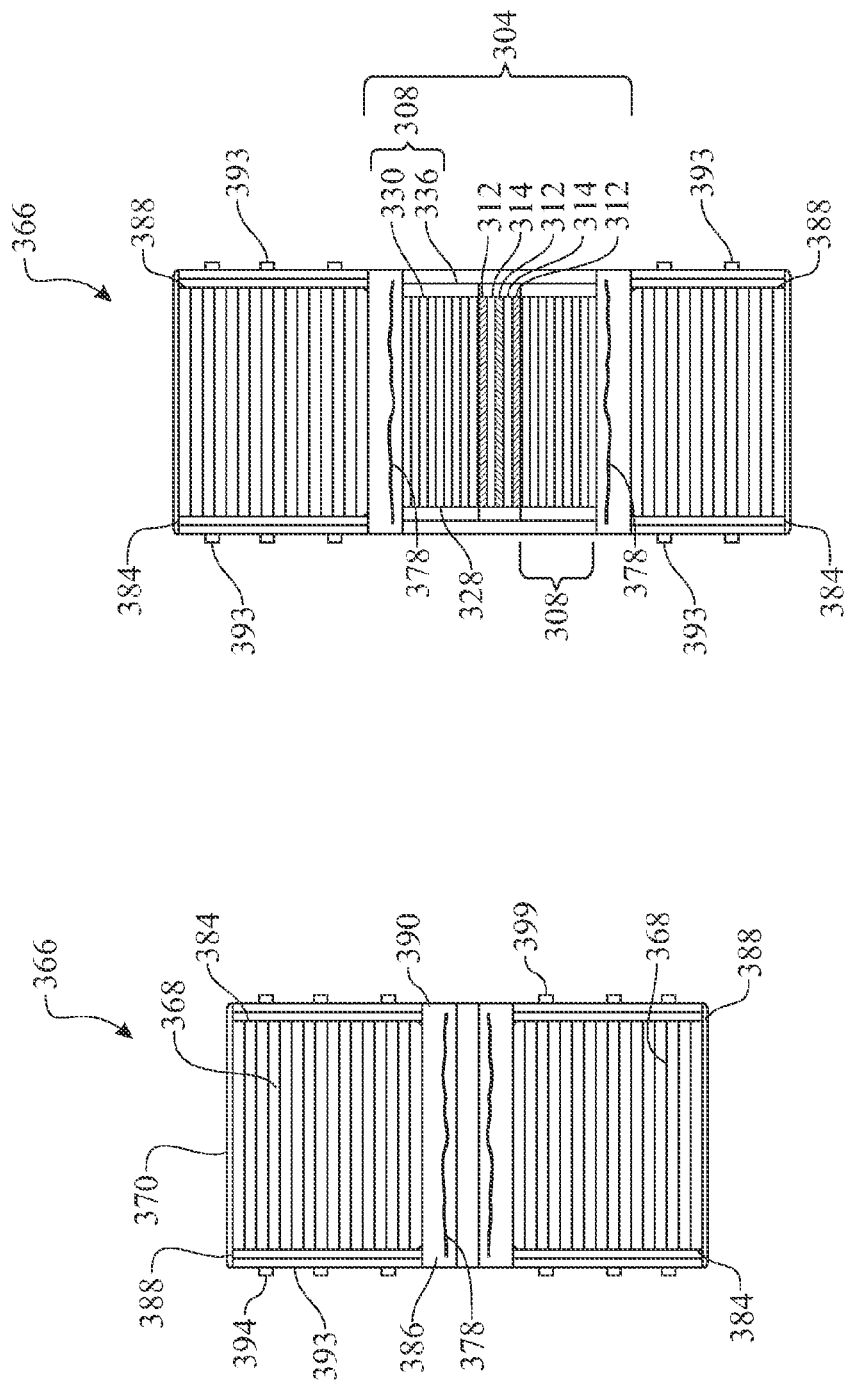

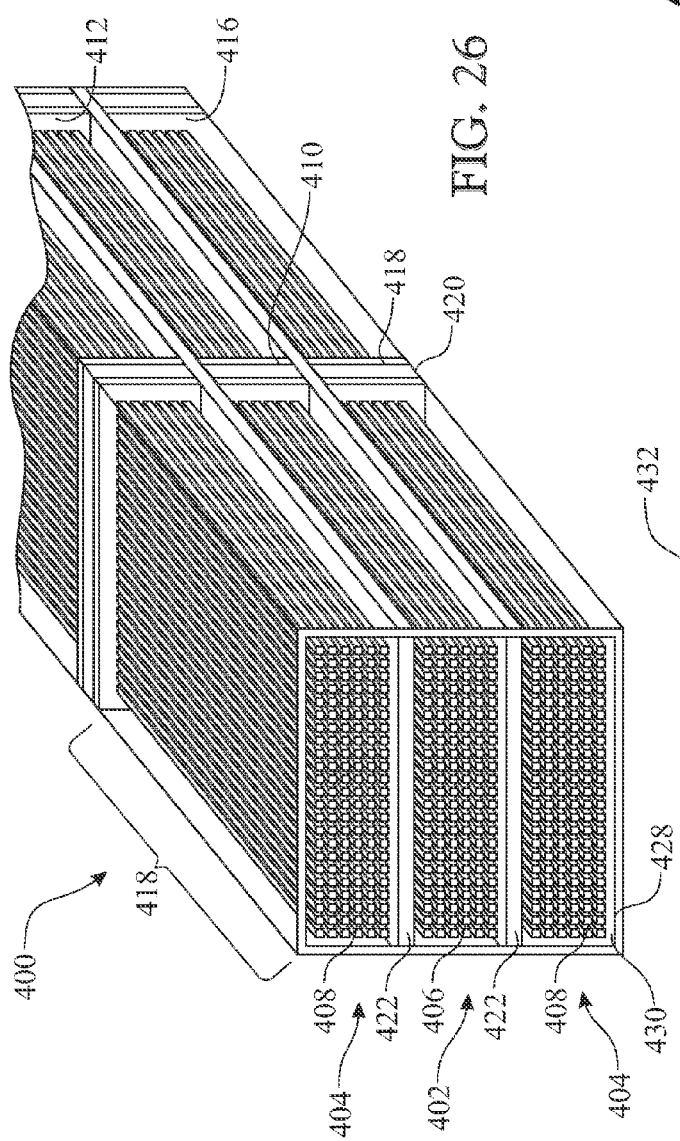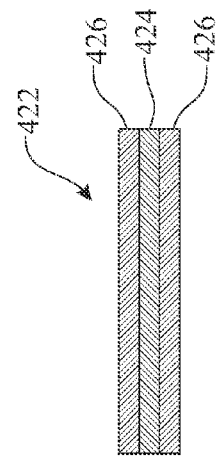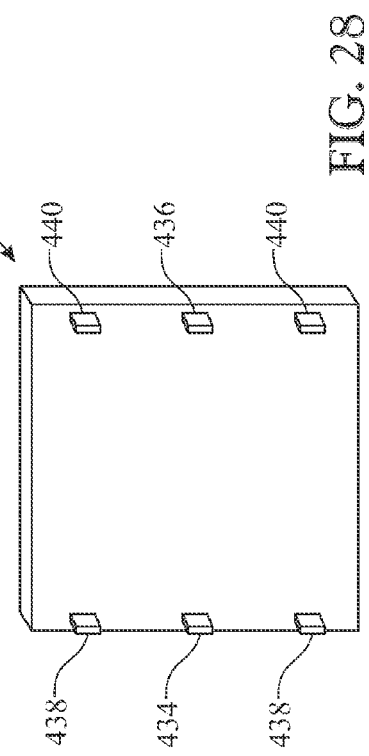

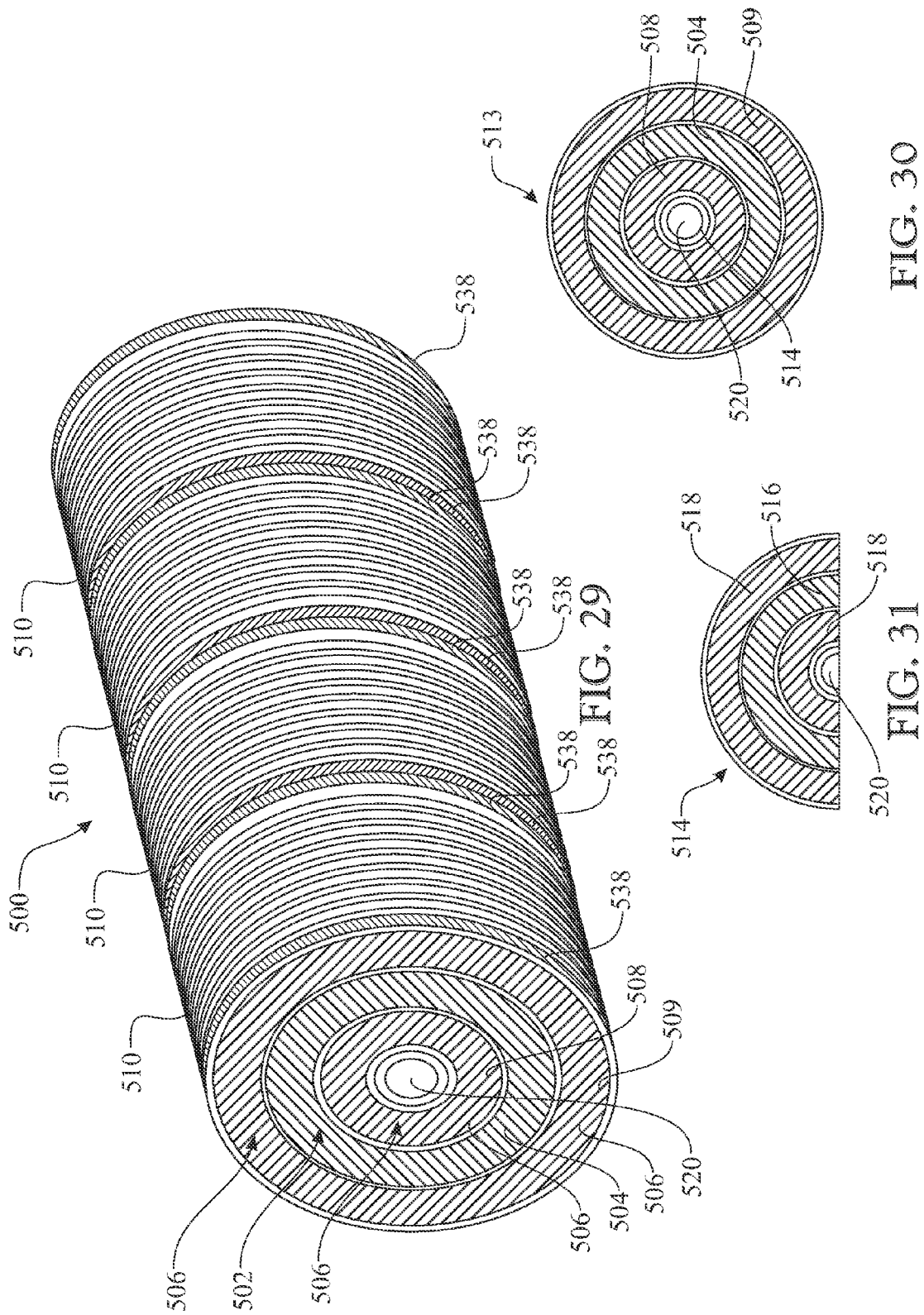

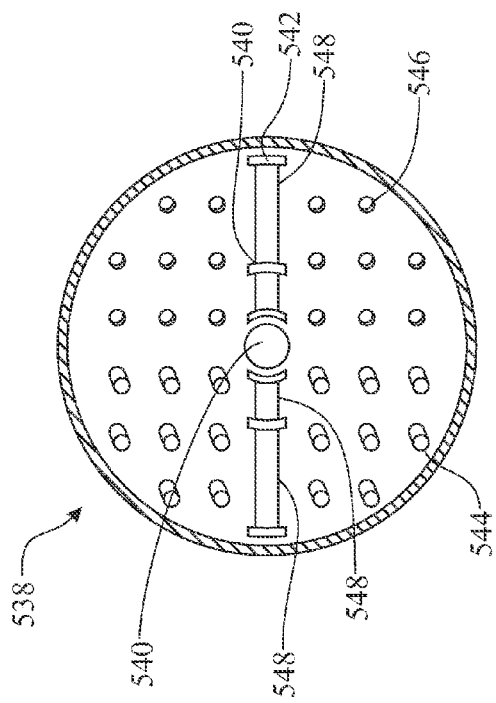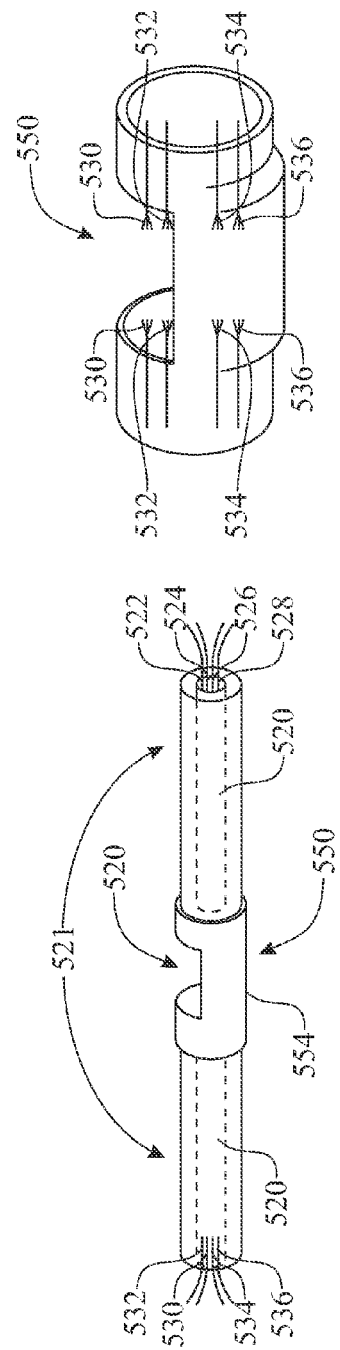
FIG. 32
FIG. 34
FIG. 33

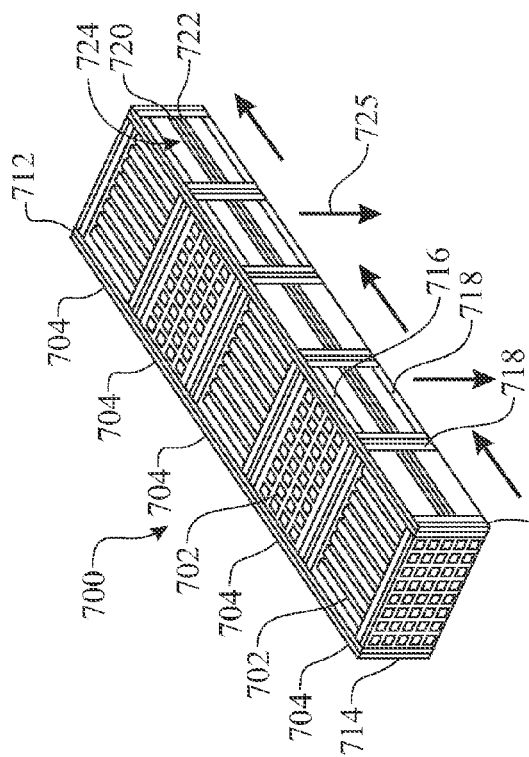
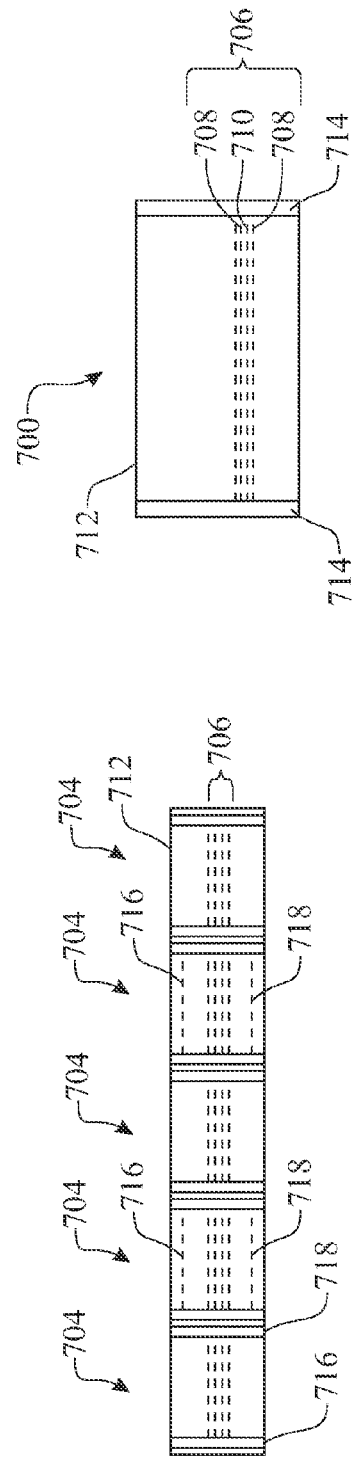
FIG. 38
FIG. 39
FIG. 40

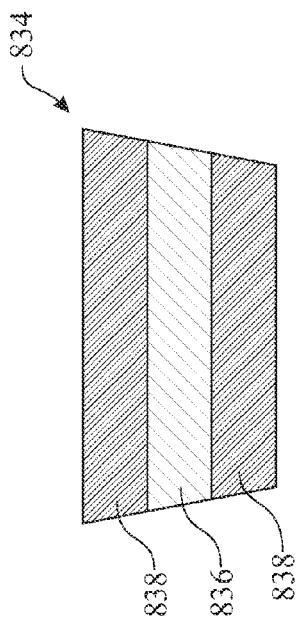
FIG. 47
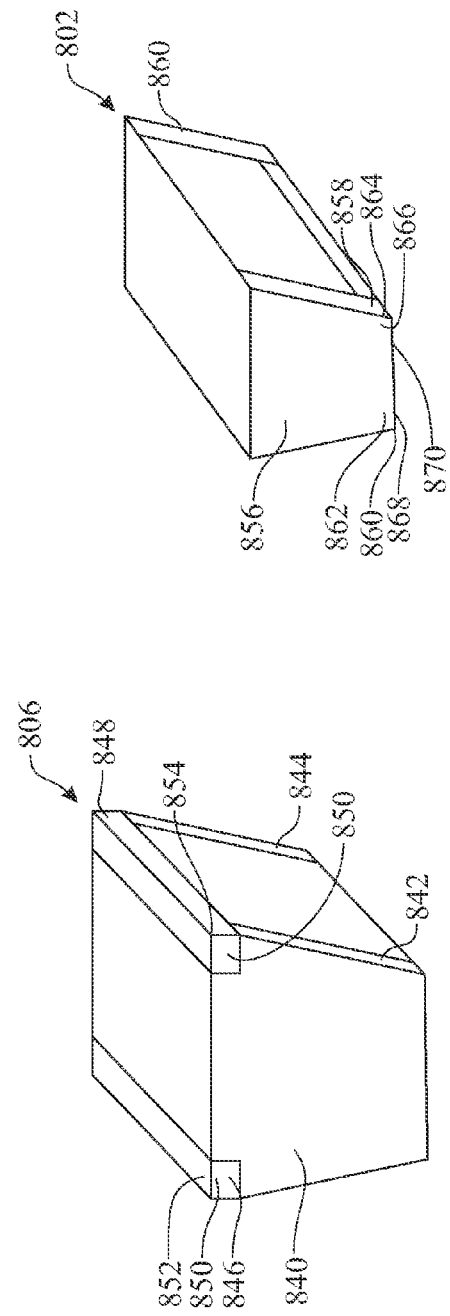
FIG. 49
FIG. 48

ELECTROMAGNETIC INDUCTION DEVICE FOR GENERATION OF ELECTRICAL POWER

CROSS REFERENCE TO RELATED APPLICATIONS

This United States Non-Provisional patent application claims the benefit of U.S. Provisional Patent Application Ser. No. 61/555,862, filed on Nov. 4, 2011, which is incorporated in its entirety herein by reference.

FIELD OF THE INVENTION

The present disclosure relates to electromagnetic devices in general and more particularly to electromagnetic induction devices having straight wires interfaced in a parallel electric circuit, and applications of such a device in embodiments such as an induction device, an electricity generator having no moving parts whose voltage and current is induced by magnetic phenomena.

BACKGROUND OF THE INVENTION

Many devices utilize magnetic phenomena in their utilization of electricity, most of which devices utilize solenoids or coils. Among these devices are electromagnets and electromagnetic induction devices. Stationary electromagnetic induction devices include transformers and "chargers" for portable devices. "Chargers" are necessary in devices that are not directly linked to an electric outlet; in such chargers, an induction coil is linked to an electric source and inductively transfers electric energy to an inductee. Current-art induction devices, comprising solenoids and coils, efficiently utilize volumes that are cylindrical but are not well suited in devices having a parallelepiped volume. Further, current-art induction devices are inherently inefficient, as only a part of the magnetic field of the inductor is utilized. A Halbach Array is a device that concentrates its magnetic field in a particular manner, and the template herein disclosed is utilized in electromagnetic Halbach Array configurations. Other well-known devices that utilize magnetic phenomena include generators, which transform some type of energy into electric energy. It is well known that a voltage, and a current, can be induced in a wire by the movement of a magnetic field relative to that wire. Electricity generators that depend on magnetic phenomena require an external energy source to generate electricity by the movement of a magnet (the rotor), which induces a voltage and current into a coil (the stator). Generating stations usually require a costly infrastructure whatever the external energy source. Natural and inexhaustible energy sources such as falling water, wind and tidal currents generate electricity by employing that external source in a direct manner to turn turbines or to move magnets. Geothermal generation is also natural and inexhaustible; it is indirect, using the earth's heat where relatively easily accessible, to generate steam which is used to turn turbines. Non-renewable fossil fuels such as coal, petroleum and natural gas are sources of energy that are employed in an indirect method to produce electricity; the fuels are burned to create steam which turn turbines, and the burning of any such fuel is known to create environmental problems. Some sources of petroleum, such as shale oil and offshore oil deposits, require considerable resources to develop and their extraction may entail significant undesirable environmental consequences. The recovered oil requires refinement, which also requires significant resources and also may entail significant undesirable environmental consequences. Further, the sites of such energy sources (falling water, wind, tidal currents and geothermal) may be distant from the sites of consumption, requiring transmission facilities from the generating station. Such transmission facilities not only also require significant infrastructure and land, but also are thought to create environmental problems. Not only do fossil fuel-based generating systems generally require significant energy for extraction, but also there are generally intrinsic inefficiencies in their use for electricity generation. Coal-based generating systems produce approximately 50% of the electricity produced in the US, and only 33% of the energy units in mined coal end up at the point of use; 65% is lost in generation and 2% is lost in transmission. Further, when coal burns to produce electricity, undesirable elements are released into the atmosphere: for every 1 Kvah of electricity generated by coal-fired plants, 0.0234 mg of mercury, as well as carbon dioxide, sulfur dioxide and nitrogen oxide, are released. Natural gas is currently a cheap source of fuel for generating stations. Inexhaustible nuclear energy employs the indirect method, requires the most significant infrastructure, and appears to be subject to far-reaching and possibly dangerous consequences for the environment and populations. Most terrestrial vehicles, marine propulsion systems and aircraft use petroleum-based sources of energy. Recently, propulsion systems for automobiles have been developed using large batteries as the energy source, and some naval propulsion systems use nuclear power.

Thus, what is desired is an electromagnetic device, configurable as an induction device, that is efficient in and parallelepiped volumes and a variant of which is efficient in cylindrical volumes; that is configurable in such manner that it enables an electromagnetic Halbach Array as well as an electricity generator which utilizes inexhaustible magnetic phenomena in a direct manner to generate electricity.

SUMMARY OF THE INVENTION

The electromagnetic induction device presently disclosed serves as a template for other electromagnetic devices, embodiments and configurations thereof, as will be disclosed hereinafter. Whereas current-art electromagnetic devices generally are comprised of solenoids and/or coils, and efficiently utilize the space of volumes that are cylindrical, the electromagnetic induction device of the present disclosure efficiently utilizes the space of volumes that are generally parallelepiped. The device includes at least one inductor and at least one inductee, each including a number of coated straight wires preferably having a square cross-section and sharp corners, that are closely assembled in at least one layer in the height and in the width and along the length of the device between the hereinafter-described conductor plates, and in such manner that at least one straight wire of at least one layer is parallel both to at least one other straight wire of that same layer and at least one straight wire of at least one other layer, and preferably that all said wires of both the at least one inductor and at least one inductee are mutually parallel. Conductor plates, preferably fabricated of a material that is a good conductor of electricity such as copper, are situated at the ends of both the at least one inductor and at least one inductee, enabling both a parallel circuit interface with the ends of the straight wires thereof as well as providing an interface for power and output leads. At least one magnetically-permeable core is preferably included in the at least one inductor; such a core increases the strength of the magnetic field generated in and about the aforesaid device by a factor of up to thousands, compared to an air core. While certainly a round wire may be utilized in such a device, a square cross-sectioned wire is preferable, as it has a greater area in the same lateral and vertical space as would be occupied by a round wire. Greater area means not only that a square cross-sectioned wire can carry a higher amperage for a given voltage, but also that the wire offers less resistance to current flow. The straight wires are preferably fabricated of a material that is a good conductor of electricity and has a low magnetic permeability such as copper. The coating of an aforesaid wire has characteristics which preferably include good electric insulation, thinness, high-temperature tolerance, magnetically impermeability and resistance to fraying; it is important that no electric contact be established between the wires of the device, for then the effective number of wires (discussed hereinafter) would be reduced, which is an undesirable effect. In an induction device, it is preferable that there be no air gap between the at least one inductor and the inductee, as it is known that a magnetic field is weakened by a traverse through an air gap. That is an undesirable characteristic, as the strongest moving magnetic field possible is desirable in and around the at least one inductor. However, there obviously could be an air gap if the functioning of the device, such as a charger, would require that the inductee must be removable from the inductor, for example. It is desirable that the colors of the coatings of the wires of the inductors be different from that of the inductees, and that the various electrical components of each have different color-coding, to avoid cross circuiting in the assembly of a device. It may be desirable to use resonant inductive coupling of the inductor and inductee, as this would allow a greater air gap without the normal attendant loss of field strength.

One obvious utilization of the template disclosed herein is an electromagnet that efficiently utilizes volumes that are parallelepiped, comprised of square wires instead of a solenoid. The advantage of square wires in an electromagnet is that square wires, having a greater area in the same cross-section, can carry a higher amperage than a round wire, thus enabling a stronger electromagnet. Another utilization is as a "charger" in volumes that are parallelepiped. Other embodiments and variants are disclosed hereinafter.

Another device that employs the template disclosed herein is an electromagnetic induction device including subassemblies among which are at least one "inductor" and at least one "inductee". An inductor is defined as an electromagnetic element comprised of wires in and around which a moving magnetic field comprised of concentric circles is created when a cyclic current flows through the said the at least one inductor's wires. An inductee is defined as an electromagnetic element comprised of wires in which a voltage and current is induced by a magnetic field traversing (cutting) its wires. The operating principles of induction devices are well known: when a cyclic current flows through the wires of an inductor, it induces a voltage and a current flow in the inductee with which it is inductively coupled. Whereas current-art induction devices using solenoids or coils are efficient in devices whose form-factor is cylindrical, a first preferred embodiment of an induction device is an induction device that is more efficient in spaces that are parallelepiped, which could be a magnet or a "charger". A second embodiment disclosed hereinafter is an electricity generator, which exists in two variants: one that is efficient in parallelepiped volumes, and another that is efficient in cylindrical volumes. A third embodiment is an electromagnetic Halbach Array and its derivative, an electromagnetic Halbach Array Induction Device.

In the presently-disclosed electromagnetic induction device, both the at least one inductor and the at least one inductee are preferably include straight wires preferably having a square cross-section and sharp edges closely assembled in the height and in the width and along the length of the device between the hereinafter-described conductor plates, and in such manner that: (1) at least one straight wire of at least one layer of an inductor is parallel both to at least one other straight wire of that same layer and to at least one other straight wire of another layer in the said inductor and (2) at least one straight wire of at least one layer of an inductee is parallel both to at least one other straight wire of that same layer and to at one straight wire of at least one other layer in the said inductee and (3) at least one straight wire of an inductor is parallel to at least one straight wire of an inductee. Preferably, all straight wires of both the inductors and inductees are mutually parallel. Square cross-sectioned wires are preferable as they have a greater area in the same space as would be occupied by a round wire, and thus can carry current of a higher-amperage. It is preferable that the inductee includes a greater number of straight wires than the inductor, as thereby a greater voltage is induced in the wires of the inductee for the same frequency of inducing current. Conductor plates, preferably fabricated of a material that is a good conductor of electricity such as copper, are situated at the ends of both the at least one inductor and at least one inductee, enabling both a parallel circuit interface with the ends of the straight wires thereof as well as providing an interface for power and output leads. At least one magnetically-permeable core is preferably included in the at least one inductor; such a core increases the strength of the magnetic field generated in and about the aforesaid device by a factor of up to thousands, compared to an air core. The said at least one magnetically-permeable core, is preferably fabricated of a magnetically-permeable material preferably comprised of metal sheets having a high relative permeability and low coercion, such as laminated mu-metal or sheet silicon steel, with an insulation between the metal sheets. The said metal sheets preferably have a uniform grain orientation and are uniformly scribed, to reduce hysteresis loss. Such a core increases the strength of the magnetic field generated in and about the aforesaid inductor by a factor of up to thousands, compared to an air core. The cases of both the inductor and the inductee are preferably fabricated of a magnetically impermeable material, whose object is not only to contain the at least one inductor and at least one inductee, but also to concentrate the concentric circles of the moving magnetic field that has traversed the wires of the at least one inductee such that they do not escape to the exterior of the case, as well as to protect the device from external magnetic fields. An inductor and inductee include conductor plates at their ends, said plates not only enabling a parallel circuit interface with the straight wires thereof, but also enabling an interface with power leads for the at least one inductor and output leads for the at least one inductee. The said leads are interfaced in a parallel circuit linking all said inductors and all said inductees. Whatever the thickness of the said conductor plates it is obvious that, were they to be configured along the major dimension of the device, they would occupy a greater volume of space, reducing that available for the straight wires, which is undesirable. Thus, it is preferable that the conductor plates of any straight-wire device be situated at those ends having the minor dimension. It is important that the conductor plates of an inductor not be in electrical contact with those of the inductee; if they were, the device would not function, as the current flowing in the inductor's wires would flow directly into those of the inductee without causing any induced current in the inductees. The coatings of the wires of the inductors and inductees are preferably differently color-coded, and the various electrical components of each in all devices preferably have different color-coding in order to avoid cross circuiting in the assembly of a device.

The electromagnetic induction device previously disclosed may be configured as an electricity generator, which generates useable electricity by the direct conversion of inexhaustible potential magnetic energy. Whereas current-art electricity generators move wires through a magnetic field to generate electricity, requiring external energy to do so, the novel generator disclosed herein moves a magnetic field through wires, and only the cyclic reversal of an AC inducing current or a switched or pulsed DC inducing current, is required to do so. An electricity generator, comprising a number of assemblies and subassemblies that include a number of the aforesaid electromagnetic induction devices, exists in a number of variants. Each variant includes at least two volumes: at least one "primary" volume including a number of inductors and at least one "secondary" volume including a number of inductees, which said secondary volume(s) preferably surround or enclose the primary volume(s). This configuration is a key element in the optimal functioning of all variants of a generator of the present disclosure, as it not only enables the most efficient use of the moving magnetic field generated in and around the at least one inductor when a cyclic current flows through their wires, but also it enables there to be a greater number of wires, or a greater length of wire, in the inductees than in the inductors, thus generating a higher voltage in the inductees for the same frequency of current in the inductors.

It is desirable at this juncture to describe how the configuration of an electricity generator of the present disclosure is determined by the very volume in which the generator is configured. If that volume is parallelepiped, a first or second preferred variant of a generator of the present disclosure is efficiently configured therein; it includes inductors and inductees having straight wires described here in before. If that volume is cylindrical, a third or fourth preferred variant of a generator of the present disclosure is efficiently configured therein. The third variant has a toroidal form-factor utilizing straight wires; the fourth includes solenoid inductors and a coil inductees. In all preferred variants of an electricity-generator embodiment, an inductor includes at least one magnetically permeable core that may also serve other functions. The inductors and inductees are physically configured in length in their respective volumes in such manner that their wires are mutually parallel, and that their adjacent ends have complementary polarities when a cyclic current flows through the parallel circuit of their wires. Thus, the number of inductors in the primary volume acts like a long electromagnet, with magnetically permeable cores enhancing the magnetic field. In a preferred variant of an electricity-generator, the wires comprising an inductor and an inductee are electrically interfaced in their respective parallel circuit, and all inductors and inductees are electrically interfaced in their respective parallel circuit. The (straight wire) variants of an electricity generator configured in a parallelepiped, flat or toroidal volume have an inherent advantage over the cylindrical variant having solenoids and coils, which is related to resistance of the circuits. As the wires of any straight wire generator variant are shorter than those of a cylindrical variant, it follows that in any given volume; there will be more straight wires than there could be "turns" of the solenoid inductors and "loops" of the coil inductees. Thus, there will be a greater number of parallel circuits of wires in the inductors and inductees, and thus a reduced resistance of the circuits. This subject of resistance is discussed hereinafter.

In a preferred variant of an electricity generator variant configured in a parallelepiped, flat or toroidal volume, both the at least one inductor and the at least one inductee include a number of preferably square cross-sectioned coated straight wires having sharp corners closely assembled in the height and in the width and along the length of the device between the hereinafter—described conductor plates, and in such manner that: (1) at least one straight wire of at least one layer of an inductor is parallel both to at least one other straight wire of that same layer and to at least one other straight wire of another layer in the said inductor and (2) at least one straight wire of at least one layer in an inductee is parallel both to at least one other straight wire of that same layer and to at one straight wire of at least one other layer in the said inductee and (3) at least one straight wire of an inductor is parallel to at least one straight wire of an inductee; that preferably all straight wires of both inductors and inductees are mutually parallel. Conductor plates, preferably fabricated of a material that is a good conductor of electricity such as copper, are situated at the ends of both the at least one inductor and at least one inductee, enabling both a parallel circuit interface with the ends of the straight wires thereof as well as providing an interface for power and output leads. At least one magnetically-permeable core is preferably included in the at least one inductor; such a core increases the strength of the magnetic field generated in and about the aforesaid device by a factor of up to thousands, compared to an air core. In a preferred embodiment of an electricity generator variant configured in a cylindrical volume, an inductor is a solenoid defined as a device preferably having many turns of preferably square cross-sectioned coated wires having sharp corners, tightly wound in many layers in the same direction around a magnetically permeable core, and preferably between at least two magnetically-permeable cores. An inductee is defined as a coil defined as a device preferably comprised of square cross-sectioned coated wires having sharp corners tightly wound in the same direction in many layers of loops along the length of the coil. Whatever the circumference of a layer, it remains one "loop" or "turn", as one straight wire of a herein-disclosed inductor or inductee is a "turn-equivalent" irrespective of its length. The number of "turns" or "turn-equivalents" of an inductor directly affects the density of the magnetic field that traverses the wires of the inductees of a generator variant of the present disclosure. The number of "loops" or "turn-equivalents" of an inductee directly affects the voltage output of a generator of the present disclosure: for a given frequency of inducing current, a greater number of loops or turn equivalents in the inductee compared to that of the inductor, induces a higher voltage in the inductee.

It is desirable at this juncture to provide a summary description of the how the electromagnetic induction device of the present disclosure enables an electricity generator. There are a number of inductors in a primary volume surrounded by, and inductively coupled with, a number of inductees in a secondary volume, the two volumes preferably being concentric. In any preferred variant of an electricity generator, there are a greater number of wires (or a greater length of wires) in the inductees configured in the secondary volume(s) than there are wires (or lengths of wires) of the inductors configured in the primary volume(s). The wires of each inductor and each inductee are electrically interfaced in a parallel circuit of that respective component, and all said inductors and inductees are electrically interfaced in their respective parallel circuits. A battery, which is the only external energy source required, supplies current for the initial cycle(s) to the control module, where it is regulated by electronic apparatus, then supplied as current of a certain frequency and amperage to the parallel circuit of inductors. In a preferred variant of a generator, the inductors are physically configured end to end in the primary volume such that their adjacent ends have complementary polarities when a cyclic current flows through the parallel circuit of their wires. It is known that, when a cyclic current flows through a wire, the wire acts as an electromagnet, creating a moving magnetic field comprised of concentric lines of force in and around itself.

Thus, the number of inductors in the primary volume acts like an electromagnet, with a magnetically permeable core in each inductor enhancing the moving magnetic field of the number of inductors so configured. The inductors and the inductees are physically configured in their respective volumes such that their wires are mutually parallel. The aforesaid concentric lines of force of the moving magnetic field created in and around the inductors traverse the wires of all inductees in a perpendicular manner, propagating then collapsing according to the frequency of the cyclic current, thereby inducing a cyclic voltage across the leads of the wires of the inductees. The propagating magnetic field induces a voltage of one polarity, and the collapsing magnetic field induces a voltage of the opposite polarity. The voltage will cause a current to flow in the aforesaid wires of the parallel circuit of the inductees if there is a completed circuit, of one polarity caused by the propagation of the field, and of the opposite polarity caused by the collapse of the field. The generator's output in the parallel circuit of the inductee's wires is either AC or FWDC, depending upon which type of current was supplied to the inductors as the inducing current. A part of the induced current output is supplied through a feedback circuit in the control module, to become the current subsequent to the initial cycle(s) in the parallel circuit of the wires of the inductors, and the battery is thereupon removed from the circuit. The major part of the induced current is supplied to a load.

One aspect of the present disclosure of a preferred variant of an electricity generator configured in a parallelepiped volume is that it includes at least one "primary" volume. A "primary" volume is defined as preferably including a number of inductors joined in interlocking sections; each said section is further defined as an assembly preferably including a number of quadrant subassemblies. A quadrant subassembly comprises a number of the previously disclosed electromagnetic devices. It is the object of the aforesaid quadrant subassembly inductors to generate a moving magnetic field therein and there-around when a cyclic current flows their wires. The aforesaid subassembly preferably includes a number of coated straight wires having sharp corners closely assembled in the height and in the width and along the length of the device between the hereinafter-described conductor plates, and in such manner that: (1) at least one straight wire of at least one layer of the said subassembly is parallel both to at least one other straight wire of that same layer and to at least one other straight wire of another layer in the said subassembly and (2) at least one straight wire of an inductor is parallel to at least one straight wire of an inductee; that preferably all straight wires of both the inductors and inductees are mutually parallel. An inductor is, in effect, a subassembly of the previously disclosed electromagnetic device. Conductor plates, preferably fabricated of a material that is a good conductor of electricity such as copper, are situated at the ends of both the at least one inductor, enabling both a parallel circuit interface with the ends of the straight wires thereof as well as providing an interface for power leads. At least one magnetically-permeable core is preferably included in the at least one inductor; such a core increases the strength of the magnetic field generated in and about the aforesaid device by a factor of up to thousands, compared to an air core. When current flows through each inductor, their polarity is the same, such that their polarities when assembled end-to-end in the primary volume, are complementary. It is known that parallel wires carrying current flowing in the same direction, attract each other. Thus, the bundle of straight wires in the inductor will remain closely assembled. The coating of an aforesaid wire has characteristics which preferably include thinness, high-temperature tolerance, resistance to fraying, good electric insulation and non-magnetically permeable; the color of the coating is different from that of the inductee. It is desirable that no electric contact be established between the wires of an inductor, for then the effective number of inductor turn-equivalents would be reduced, which is an undesirable effect. The aforesaid wires preferably have a square cross-section and sharp corners, and are preferably fabricated of a material having a low magnetic permeability and good conductivity, such as copper. While certainly a round wire may be utilized, a square cross-sectioned wire is preferable, as it has a greater area in the same lateral and vertical space as would be occupied by a round wire. Greater area means not only that a square cross-sectioned wire can carry a higher amperage for a given voltage, but also that the wire offers less resistance to a current flow. However, the smallest cross-section adequate to carry the amperage supplied to the aforesaid straight wires in the inductors is preferred, resulting in the greatest number of wires in the volume occupied by the aforesaid inductors. It is obvious that any generator variant could have inductor and inductee configurations different from those configurations described herein.

A further aspect of the present disclosure of a preferred variant of an electricity generator configured in a parallelepiped, flat or toroidal volume is that it includes at least one "secondary" volume. A "secondary" volume is further defined as preferably surrounding or enclosing a "primary" volume and being concentric with it. The said secondary volume includes a number of inductee assembly interlocking sections, each such section defined herein as preferably including a number of coated straight wires closely assembled in the height and in the width and along the length of the device between the hereinafter-described conductor plates, and in such manner that: (1) at least one straight wire of at least one layer of the inductee is parallel both to at least one other straight wire of that same layer and to at least one other straight wire of another layer in the said inductee and (2) at least one straight wire of an inductee is parallel to at least one straight wire of an inductor; that preferably all straight wires of both the inductors and inductees are mutually parallel. An inductee is, in effect, a subassembly of the previously disclosed electromagnetic device. Conductor plates, preferably fabricated of a material that is a good conductor of electricity such as copper, are situated at the ends of both the at least one inductee, enabling both a parallel circuit interface with the ends of the straight wires thereof as well as providing an interface for output leads. At least one magnetically-permeable core is preferably included in the at least one inductor; such a core increases the strength of the magnetic field generated in and about the aforesaid device by a factor of up to thousands, compared to an air core. When a current flow is induced in the inductees, as the orientation of all wires is the same, the polarity of all inductees is the same. It is known that parallel wires carrying current flowing in the same direction, attract each other. Thus, the bundle of straight wires in the inductees will remain closely assembled. In preferred embodiments, while the number of inductees is the same as the number of inductors, surrounding the inductors as the do, the inductees are larger than the inductors such that the total number of wires (or loops of wires) of the inductees, and thus their area, is multiples of that of the inductors. This is another key characteristic in the efficient functioning of a generator of the present disclosure: the moving magnetic field generated in and around the wires of the inductors traverses a greater number of wires of the inductees; the higher the ratio of the number of inductee's wires compared to that of the inductors, the higher is the voltage induced for a given frequency of inducing current. This subject is discussed in further detail hereinafter.

In any electricity generator variant, it is the object of the inductors to generate a moving magnetic field that propagates in and therefrom and collapses therein and thereto according to the frequency of the cyclic current flowing in their wires. It is the object of the inductees to have a voltage and current induced in their wires when the said wires are traversed (cut) by the aforesaid moving magnetic field generated in and around the wires of the aforesaid inductors. The coating of an aforesaid wires has characteristics which preferably include thinness, high-temperature tolerance, resistance to fraying, good electric insulation and non-magnetically permeable; the color of the inductee's coating is different from that of the inductors. It is desirable that no electric contact be established between the wires of an inductee, for then the effective number of the inductee's wires ("turn-equivalents") would be reduced, which is an undesirable effect. The aforesaid wires preferably have a square cross-section and sharp corners, and are preferably fabricated of a material having a low magnetic permeability and good conductivity, such as copper. While certainly a round wire may be utilized, a square cross-sectioned wire is preferable, as it has a greater area in the same lateral and vertical space as would be occupied by a round wire. This means not only that a square cross-sectioned wire can carry a higher amperage for a given voltage, but also that the wire offers less resistance to a current flow. Further, the smallest square cross-section wire adequate to carry the amperage induced in the wires of the inductees is preferred. Small cross-sectioned wires in an aforesaid inductee achieve three objectives: (1) reduction to a minimum the section of the inductees, thus reducing to a minimum the distance that the magnetic field, generated in and around the inductors, must traverse; (2) presentation of the minimum sections that must be penetrated by the inducing current, enabling higher frequencies of current to be utilized, as described hereinafter; (3) enabling a greater number of wires in a given cross-sectioned inductee. It is important that the ratio of wires in an inductee compared to an inductor, or that the ratio of the length of wires of the inductee compared to the inductor be as great as possible, as the greater is the ratio, the higher is the voltage induced for a given frequency of inducing current.

A further aspect of the present disclosure of a preferred variant of an electricity generator configured in a parallelepiped volume is that the interlocking inductor assembly sections also preferably include common-core subassemblies including vanes mounted onto a preferably square hollow spine fabricated of the same materials as the vanes. The common-core subassembly functions both as a core and as a structural beam. The vanes and hollow spine are preferably comprised of metal sheets having a high relative permeability and low coercion, a uniform grain orientation and uniform scribing to reduce hysteresis loss, such as laminated mu-metal or sheet silicon steel, with non-conducting insulation sheets between the metal sheets, the said sheets being joined adhesively. The exterior metal sheets have hooks extending therefrom in an offset pattern along the length thereof. The hollow spine has slots perforated therein in an offset pattern generally corresponding to the offset pattern of the aforesaid hooks, into which the said hooks are force-fit, enabling the configuration of the common core subassembly. Such a core increases the strength of the magnetic field generated in and about the aforesaid inductors by a factor of up to thousands, compared to an air core. While there is preferably no "separator" between the wires of an inductor and the wires of an inductee (as this would create an undesirable air gap between them) it may be necessary in some embodiments to have a thin separator to prevent any electrical contact between the wires of the inductors and inductees in the contact zone. The female-configured hollow spine is configured to accept a force-fit male hollow-spine connector that: (1) joins the aforesaid interlocking section; (2) through an opening, allows male blade connectors extending from the conductor plates (described hereinafter), to interface with magnetically-shielded two-conductor cable sections housed in the hollow spine. The two-conductor cable sections have color-coded negative and positive male blade connector terminals which, by means of FFF female blade connectors (described hereinafter) housed in the aforesaid male hollow-spine connector, interface with male blade connectors of the conductor plates (described hereinafter), thus enabling completion of the parallel electrical interfaces of all quadrant subassemblies of all inductors. The aforesaid insulation sheets are configured not only between the aforesaid metal sheets, but also on the outsides of the vanes. Further, insulation strips are affixed adhesively to the ends of the aforesaid vanes. The object of the "outside" insulation sheets is to assure that the metal vanes are not in electrical contact with the aforesaid conductor plates; the object of the insulation strips is to assure that the vanes are not in electrical contact with the vertical or lateral interface bands (described hereinafter) as, in either case, an electrical contact between those elements would cause a current to flow in the vanes, which current flow would diminish the current flow in the straight wires of the inductors, an undesirable effect.

In all straight-wire generator variants, a negative and a positive conductor plate is preferably situated at each end of an inductor assembly interlocking section having the minor dimension. The said conductor plates are preferably fabricated of a material that is a good conductor of electricity, such as copper, and enable both a parallel circuit interface with all the straight wires included in each inductor subassembly, as well as providing a parallel electrical interface for the input leads to the said subassemblies. At each end of a said inductor assembly interlocking section is situated an insulator plate, preferably fabricated of a material whose characteristics include high electrical insulation, magnetic impermeability, good mechanical resistance and rigidity, and thermal stability, and which insulator plate includes projections and channels on both its sides. In the parallelepiped variant, these channels accept force-fit color-coded vertical interface bands providing a parallel electrical interface for the inductor's conductor plates, and a force-fit color-coded lateral interface band that provides a parallel electrical interface for the quadrant subassemblies. Each aforesaid lateral interface band includes a male color-coded blade connector, laterally offset from its center, which fits through an opening in the aforesaid hollow-spine connector. The insulator plate has an opening at the position of a hollow spine-connector to allow the said hollow spine-connector to be configured therein. The projections on both sides of the insulator plate enable it to be clipped into the said conductor plates, separating the negative and positive conductor plates from each other at the end of an aforesaid interlocking inductor assembly section, and joining them. It is important that no electrical contact be established between the conductor plates of the inductors and those of the inductees, as this would cause the current in the inductors to flow into the inductee's conductor plates and thus through the wires of the inductees, without generating any inducing magnetic field; this would effectively shut down the generator.

Negative and positive leads, connectors and interfaces, have like color codes to insure against cross circuitry in assembling the interlocking sections. It may also be advisable to provide electrical connectors that have different forms, for additional protection against cross circuitry.

Yet another aspect of the present disclosure of a preferred variant of an electricity generator configured in a parallelepiped volume is that the inductees are also configured in interlocking sections, each interlocking section preferably partially enclosed by a magnetically impermeable case having a hollow portion, which hollow case-portion includes a partially-evacuated portion at the ends of the said interlocking sections. The hollow portion of the case houses a magnetically impermeable color-coded two-conductor output cable section. At the ends of each inductee are situated negative and positive conductor plates, the said plates are preferably fabricated of a material that is a good conductor of electricity, such as copper, and enable both a parallel circuit interface with all the straight wires included in each inductee subassembly, as well as providing an parallel electrical interface for the output leads from the subassemblies. Male blade connectors, or the like, extend from each said conductor plate, which blade connectors fit through the aforesaid partially evacuated parts of the hollow portions of the walls, and interface with their respective negative or positive female blade connector of FFF female color-coded blade connectors or the like. The remaining two FF female color-coded connectors interface with the male color-coded blade-connectors of a color-coded magnetically shielded two-conductor output cable section housed in the hollow portion of the aforesaid case. The said cable section enables completion of the parallel electrical interfaces of all inductees. An insulator plate having projections on both sides, preferably fabricated of a material whose characteristics include high electrical insulation, magnetic impermeability, good mechanical resistance, rigidity, thermal stability, is configured on each side of the said inductee interlocking section. The projections on both sides of the insulator plate enable it to be clipped into the aforesaid conductor plates of adjoining inductee interlocking sections, separating the negative and positive conductor plates of those adjoining sections from each other at the ends of the inductee interlocking sections, and joining the sections. Negative and positive leads, connectors and interfaces, have like color codes to insure against cross circuitry in assembling the interlocking sections. It may also be advisable to provide electrical connectors that have different forms, for additional protection against cross circuitry.

The case of a parallelepiped, flat or toroidal generator is preferably fabricated of a material whose characteristics include good mechanical resistance and rigidity, high electric insulation, thermal stability, and magnetic impermeability. This last characteristic is preferable in order to concentrate any part of the magnetic field that has completely traversed the wires of the inductees, acting to prevent the magnetic field from exiting the generator. The outermost layer of wires of the inductors is preferably in physical but not electrical contact with the innermost layer of wires of the inductees. Thus, there is no air gap between them; this is preferable, as an air gap decreases the strength of the magnetic field traversing it. However, there obviously could be an air gap if it were desirable to include a thin separator between the said wires, to protect the wires of an inductor from establishing an electrical connection with the wires of an inductee in the "contact area" as will be described hereinafter. It is important that no electric contact be established between the straight wires of an inductor, for then the effective number of straight wires ("turn equivalents") would be reduced, which is an undesirable effect.

The aforesaid case is preferably completely enclosed by an outer casing and two end caps. The outer casing preferably includes a lining having the characteristics of good electric insulation and high magnetic impermeability, and which is hermetically sealed to prevent its interior from being fouled by environmental elements. The primary object of the magnetic impermeability of the lining and the outer casing is magnetic shielding: to concentrate the lines of force of the magnetic field that may have propagated through the magnetically impermeable case enclosing the inductees, so that the magnetic field may collapse there-through, not allowing the field to be wasted by leaking to the exterior. A secondary object of the magnetic impermeability of the lining and outer casing is to protect the generator from external magnetic fields. The outer casing is preferably hermetically sealed and fabricated of plastic; if it is of metal, it is preferably grounded. One of the two end caps includes power and output terminals having color-coded female blade connectors for the male color-coded blade connectors of the ultimate magnetically-shielded two-conductor cable section (a negative and positive connector for both the inductor section's and inductee section's parallel circuits), and the electrical interface to the generator's control module (not shown). Both end caps enable the fixed attachment of the hollow spine sections and the insulator plates of both the final inductor and inductee interlocking sections.

Another variant of an electricity generator employing the herein-before described straight-wire template has a generally flat form-factor, wherein the secondary volume(s) including the inductees also surrounds or encloses the primary volume(s) including the inductors, and are concentrically configured. There is preferably a greater number of inductees than of inductors, and a greater total number of wires in the inductees than in the inductors. This variant is another version of the template herein-before disclosed, and may comprise a lesser number of interlocking inductor and inductee sections than the larger-dimensioned variants, as well as a lesser number of square cross-section sharp-edged straight wires in the inductors and inductees. The operating principle is the same as all variants of an electricity generator: a cyclic current of a certain frequency is supplied to the inductors configured in a parallel circuit, which generates a moving magnetic field in and around the said inductors also configured in a parallel circuit, which said field traverses (cuts) the wires of the inductees in a perpendicular manner, creating a cyclic propagating and collapsing magnetic field therein. The said field creates a voltage across the leads of the said inductee's wires, and a current flow is the circuit is completed. A small battery, of the type usually found in hearing aids, etc., may supply 16 Ma at 3 DC volts, regulated to PDC preferably at least 400 Hz by devices in the control module for the initial cycle(s) of current in the inductors. The battery is thereupon removed from the circuit. A major part of the inductee's output is supplied to a load, and a minor part is supplied to the inductors through a feedback circuit in the control module. Although small, this variant would still be capable of supplying a high wattage (see [104]). The output of this variant would be FWDC. The FWDC would be regulated to DC, as this variant would generally be configured in small devices utilizing DC.

Apart from the obvious advantage of its ability to fit in spaces where other variants could not be configured, a flat variant is fabricated with materials that render it somewhat bendable and, as such, may be partially or wholly wrapped around an object. This capability is attained by utilizing a flexible conducting material, such as graphene, which is high-strength, flexible and highly-conductive, for the conducting elements (the wires, conductor plates and cabling (having a non-conducting rubber-like material for the coating). Insulator plates, the components of the magnetically permeable core as well as the case, would be fabricated with the rubber-like material. Obviously, it is possible that, in bending the device, the concentric circles of the magnetic field generated in and around the inductors would not be totally coherent as they traverse the wires of the inductees, leading to a reduction in efficiency of the device.

Another variant of an electricity-generator utilizes solenoids in the primary volume as inductors and coils in the secondary volume as inductees. As stated hereinbefore, solenoids and coils are well suited to a space that is cylindrical. While the form-factors of the generator variants disclosed herein are different, and thus also the forms of their inductors and inductees, the physical concept of both is unifying and identical: the primary volume(s) including the inductors is (are) concentric and are configured within the secondary volume(s) including the inductees; the wires of the inductees are parallel to those of the inductors; inductors and inductees are interfaced in their respective parallel electric circuit; the number of wires, or the total length of wires, in the inductees is greater than that of the inductors. The operating principles are identical as well: a current of a certain cyclic frequency is supplied to the parallel circuit of the inductors in the primary volume, which current creates a moving magnetic field comprised of concentric lines of force therein and there-around; the concentric lines of force traverse the wires of the surrounding inductees in a perpendicular manner, propagating then collapsing cyclically through the said coil inductees, thereby inducing a cyclic voltage across the leads of the said inductees, and inducing a cyclic flow of current therein if a complete circuit is provided.

A cylindrical variant of an electricity generator comprises at least one "primary" volume which preferably includes a number of solenoid inductors, whose object is to generate a moving magnetic field therein and there-around when a cyclic current flows through their wires, and which volumes are concentric with the generator's surrounding preferably at least two "secondary" volumes. A solenoid inductor is herein defined as a device including "turns" of wire tightly wound in the same direction and in more than one layer around and along the length of a magnetically-permeable cylindrical core section, with a second said cylindrical magnetically-permeable core section configured on top of the said turns. Thus, the said cylindrical magnetically permeable core sections physically enclose the turns of the solenoid inductors. It is preferable that the aforesaid core section be comprised of at least one sheet of a material having a high relative permeability and low coercion, such as laminated mu-metal or sheet silicon steel, with an insulation sheet between the metal sheets. The said metal sheets preferably have a uniform grain orientation and are uniformly scribed, to reduce hysteresis loss. A magnetically permeable core increases the strength of the magnetic field generated in and about the said primary solenoids by a factor of up to thousands, compared to an air core. As the turn directionality of the wires of each of the number of solenoid inductors is the same, the polarities of the solenoid inductors assembled end-to-end in the generator are complementary; as each solenoid inductor is interfaced in a common parallel circuit, they form a long electromagnet in the primary volume.

The secondary volumes of a cylindrical variant of an electricity generator comprise interior and exterior coils as inductees, each such coil defined as including "loops" of wire tightly wound in the same direction in more than one layer. The object of a coil inductee is to have a voltage induced in the wires thereof when the "loops" are traversed (cut) by the aforesaid moving magnetic field generated in and around the aforesaid solenoid inductors, and to have a current induced therein if a complete circuit is provided. The wires of the coil inductees of the secondary volumes of each interlocking combined-assembly section are thus preferably configured directly under and over the cylindrical magnetically-permeable cores of the solenoid inductors, their wires being wound in the same direction, and the solenoid inductors being concentric with the coil inductees. The loops of an interior coil inductee are wound around a hollow magnetically-impermeable section which houses two sets of conductor cables, one of two-conductors for the solenoid inductors, and one of four-conductors, for the two coil inductees. The diameter of the loops of the interior coil is less than that of the windings of the solenoid inductor while the diameter of the loops of an exterior coil inductee is greater. Thus, the total length of the wires of both an interior and exterior coil inductee is multiples of the length of wire of a solenoid inductor, and the total length of wires in the coil inductees is multiples of that of the solenoid inductors. This is another key characteristic in the efficient functioning of a generator of the present disclosure: the moving magnetic field generated in and around the wires of the solenoid inductors traverses a greater length of wires of the coil inductees; the greater the length of wires, the higher is the voltage induced in the wires of the coil inductees for a given frequency of inducing current.

A terminal-disc is situated at each end of an interlocking combined assembly section. The disc is preferably fabricated of a material whose characteristics include magnetic impermeability, good mechanical resistance and rigidity, high electric insulation, and thermal stability. One side of a terminal-disc is smooth, (that facing the solenoid and coils when assembled); the other side of the terminal-disc, herein defined as the "assembly side", includes: (1) channels for the leads from the solenoid inductor and coil inductees; (2) projections and depressions configured in mirror images of each other, in such manner that these sides of the terminal-discs of adjacent combined assemblies clip into each other, allowing the formation of interlocking sections of combined assemblies; (3) arcuate perforations allowing the leads of the solenoid inductors and the coil inductees to pass through the terminal-disc to the "assembly side" of the disc and into the aforesaid channels. The terminal-disc has an opening situated in its central portion to allow the positioning of the female magnetically impermeable hollow core as well as for the passage of the magnetically impermeable male hollow-core connector. This connector is inserted into the female ends of the aforesaid magnetically impermeable hollow cores of the combined assembly sections. The male hollow-core connector has an opening which allows passage of male color-coded blade connectors, or the like, situated at the ends of the leads from the solenoid inductors and coil inductees. These male blade connectors interface with the aforesaid (magnetically-shielded) two- and four-conductor cable sections having male blade connectors, which is housed in the aforesaid hollow core sections, and which cable sections enable completion of the parallel electrical interface of all solenoid inductors and coil inductees. The male blade connectors of the solenoid inductors and the coil inductees interface with the male blade connectors of the two- and four-conductor cable sections by means of FFF color-coded female blade connectors which are also housed in the male hollow core connector. Like leads, connectors and interfaces have like color codes, to insure against cross circuitry in assembling the generator. It may also be advisable to provide electrical connectors that have different forms, for additional protection against cross circuitry. It is important that no electric contact be established between the wires of a solenoid inductor or coil inductee, for then the effective number of "turns" and "loops" would be reduced, which is undesirable.

Another aspect of an electricity generator variant configured in a cylindrical volume is that an interlocking combined assembly is preferably enclosed by a circumferential outer casing and by two end caps. The outer casing preferably includes a lining having the characteristics of good electric insulation and highly magnetic impermeability, and which is hermetically sealed to prevent its interior from being fouled by environmental elements. The primary object of the magnetic impermeability of the lining and outer casing is that of magnetic shielding: to concentrate the lines of force of the magnetic field that may have propagated through the magnetically impermeable walls enclosing the inductees, so that they may collapse there-through, not allowing the field to be wasted by leaking to the exterior. A secondary object of the magnetic impermeability of the lining and outer casing is to protect the generator from external magnetic fields. The circumferential outer casing is preferably fabricated of plastic; if it is of metal, it is preferably grounded. At least one of the two end caps includes power and output terminal boxes having color-coded female blade connectors (or the like) for the male blade connectors (or the like) of the ultimate magnetically-shielded four-conductor cable section of the parallel circuits of inductors and inductees (negative and positive male blade connectors for both the solenoid inductors and the coil inductees), and the electrical interface to the control module (not shown) of the generator. Both end caps enable the fixed attachment of the hollow cores and the terminal discs of the ultimate combined assemblies.

The aforesaid wires of both the solenoids and the coils preferably have a square cross-section and sharp corners, and are preferably fabricated of a material having a low magnetic permeability and good conductivity, such as copper. While certainly a round wire may be utilized, a square cross-sectioned wire with sharp corners is preferable, as it has a greater area in the same lateral and vertical space as would be occupied by a round wire. This means not only that a square cross-sectioned wire can carry a higher amperage for a given voltage, but also that the wire offers less resistance to a current flow. The smallest square cross-section wire adequate to carry the amperage supplied to the inductors and that induced in the wires of the inductees is preferred. Small cross-sectioned wires in an aforesaid coil inductees achieve three objectives: (1) reduction to a minimum the section of the coil inductees, thus reducing to a minimum the distance that the magnetic field, generated in and around the solenoid inductors, must traverse; (2) presentation of the minimum sections that must be penetrated by the inducing current, enabling higher frequencies of inducing current to be utilized; (3) enabling a greater number of wires in a given cross-sectioned coil inductee translates into more "loops" and, for a given frequency of inducing current, a higher induced voltage. The coating of an aforesaid wire has characteristics which preferably include thinness, high-temperature tolerance, resistance to fraying, good electric insulation and non-magnetically permeable. The color code of the solenoid inductor's wires coating is different from that of the coil inductees. It is desirable that no electric contact be established between the wires of an inductee, for then the effective number of inductee turn-equivalents would be reduced, which is an undesirable effect. It is important that the number of loops of the coil inductees, and thus the length of the coil's wires, be greater the number of turns of the solenoid's wires and thus the length of its wires; this is the case, as the coils are preferably configured on both sides of the solenoids. A greater number of "loops" of the coils relative to the "turns" of the solenoid results in a higher induced voltage for a given frequency of inducing current.

A further aspect of a variant of an electricity generator configured in a cylindrical volume is that the orientation of the wires of the coil inductees is parallel to the orientation of the wires of the solenoid inductors (or the turns of the solenoid inductors is parallel to the windings of the coil inductees) such that, when a cyclical inducing current flows through the wires of the solenoid inductors, concentric lines of force of a moving magnetic field are generated in and around the wires of the solenoid inductors, which lines of force traverse the wires of the coil inductees in a perpendicular manner. It is known that a perpendicular traverse of the wires by the magnetic field's lines of force induces the maximum voltage and current therein. Thus, in each propagation of the moving magnetic field in and around the solenoid inductors, the field's moving concentric lines of force traverse (cut) the wires of all coil inductees, inducing a voltage of a certain polarity across the leads of the said wires and inducing therein a current flow of a certain polarity if a complete circuit is provided. Each collapse of the field's concentric lines of force induces a voltage of the opposite polarity to that of the propagation, and induces a current flow of an opposite polarity to that of the propagation if a complete circuit is provided. Thus, there is always a cyclic voltage across the output leads of the coil inductees, and an alternating current will flow in the wires of the inductees if a full path is provided (as described hereinafter, this is always the case). The induced current in all wires of the parallel circuit of the coil inductees is of the same phase. One part of the aforesaid alternating current output is filtered and regulated by electronic components (not shown) in the control module (not shown) before it is supplied to a load, as described hereinafter.

Another aspect of a variant of an electricity generator configured in a cylindrical volume is that the primary volume and the secondary volumes are preferably concentric; preferably the primary volume(s) being physically configured within the secondary volume(s). The primary and secondary volumes are differentiated in diameter in an interlocking combined assembly, wherein the inductee coil's loops are wound under and over the turns of the solenoids wires. As the solenoid inductors are interfaced in a parallel circuit, and are configured in the primary volume end-to-end such that they have complementary polarities when electrified forming a long electromagnet, the concentric lines of force of the moving magnetic field created in and around the wires of the solenoid inductors have the same directionality at the same point in the frequency cycle of the inducing current. Thus, the voltage induced in the wires of the coil inductees, as well as the current flowing in them, have the same polarity at the same point in the frequency cycle. As this is an electromagnetic induction device, an air gap between an inductor and an inductee weakens the strength of the inducer's magnetic field as it propagates; thus, it is desirable that the aforesaid be closely assembled with no air gap between the volumes, and that the outermost layers of wires of the solenoid inductors be in physical, but not electrical, contact with the innermost layers of wires of the coil inductees.

As indicated hereinbefore, there may be spatial restrictions controlling the volume in which a variant of a generator of the present disclosure may be configured, and a toroidal or cylindrical variant may be the only configurations possible. A straight-wire toroidal electricity generator is able to utilize very high inducing frequencies, because of the short lengths of its straight wires. As discussed hereinafter relative to resistance, circuit resistance is systemically reduced in all variants through the utilization of square wires, but principally through the use of parallel circuitry. However, while high inducing current frequency is desirable (as discussed hereinafter), high frequencies are known to create high resistance, even in short wires. It is possible to mitigate the effects of this phenomenon by shortening the length of the generator's wires. In any given length of a parallelepiped or flat generator variants, this may be achieved by reducing the lengths of the interlocking sections, and thus the lengths of their straight wires, and compensating for this reduction by increasing the number of the said sections. While this would obviously maintain the total volume of straight wires, each wire would be shorter (able to accept a higher frequency) and there would be a greater number of parallel circuits of wires (further reducing the resistance of the circuits). The toroidal variant of an electricity generator inherently provides very short wire lengths and a high number of parallel circuits; thus it has very low circuit resistance, making it especially adapted to very high inducing frequencies. It employs the hereinbefore described straight-wire template as the basic unit of the device; its overall form-factor is also quasi-cylindrical, comprised of toroidal interlocking sections and thus may be configured in a cylindrical volume. It operates in the same manner as other generator variants. This variant is scalable and its output, as are all variants of a generator of the present disclosure, could either be AC or Full Wave DC (FWDC).

A straight-wire toroidal electricity generator includes at least one secondary volume each including at least one toroidal inductee configured surrounding the at least one primary volume including at least one toroidal inductor, all volumes being concentric. Each toroidal inductee includes inductee square-sectioned sharp-edged coated straight wires closely assembled in the width and at least one layer in the height along the length of each said toroidal inductee, and in such manner that (1) at least one straight wire of at least one layer of a said toroidal inductee is parallel to at least one straight wire of at least one other layer of the said toroidal inductee and that preferably all said straight wires are mutually parallel. Between said toroidal inductees are configured a number of toroidal inductors, each including inductor square-sectioned sharp-edged coated straight wires closely assembled in the width and at least one layer in the height along the length of each said toroidal inductor, and in such manner that (1) at least one straight wire of at least one layer of a said toroidal inductor is parallel to at least one straight wire of at least one other layer of the said toroidal inductor and that preferably all said straight wires are mutually parallel, as well as being parallel to aforesaid inductee square-sectioned sharp-edged coated straight wires of toroidal inductees. Thus, there are more inductees than inductors, and the total number of wires included in the inductees is multiples of that of the wires included in the inductors. Although obviously the width and height dimensions of the inductors and inductees are different, each aforesaid inductor and inductee preferably have a uniform length such that their respective straight wires have a uniform length, and thus the strength of the inducing and induced magnetic fields are uniform. A negative conductor plate is situated on one end of both the inductors and inductees and a positive conductor plate is situated on the other end. The said conductor plates are preferably fabricated of a material that is a good conductor of electricity, such as copper, and enable both a parallel circuit interface with all the straight wires included in each inductor and inductee; the said conductor plates also provide a parallel electrical interface for the input leads to the said inductors and the output leads from the said inductees. Each inductor and inductee is contained in a rigid magnetically impermeable compartmental case. The said case includes a hollow portion housing electrical interfaces enabling parallel circuits of the respective inductors and inductees, and allows the said inductors and inductees to be configured in interlocking sections. Magnetically permeable cores having hollow portions are configured between the inductor and the inductees, serving respectively as a top and a bottom for the said inductors. Said cores are comprised of at least one sheet of a material having a high relative permeability and low coercion, such as laminated mu-metal or sheet silicon steel, with an insulation sheet between the metal sheets. The said metal sheets preferably have a uniform grain orientation and are uniformly scribed, to reduce hysteresis loss. The generator is enclosed in a magnetically impermeable hermetically sealed case having a magnetically impermeable lining, the object of which is not only to concentrate the magnetic field which has traversed the wires of the exterior inductees, not allowing it to be wasted by escaping to the exterior of the device, but also to protect the generator from external magnetic fields. End caps provide the respective electrical power input and output interfaces with the exterior of the generator.

The operating principle of a toroidal generator variant is the same as all variants of an electricity generator: a cyclic current of a certain frequency (discussed hereinafter) is supplied to the inductors configured in a parallel circuit, which cyclic current flow generates a moving magnetic field in and around the said inductors also configured in a parallel circuit, which said field traverses (cuts) the wires of the inductees in a perpendicular manner, creating a cyclic propagating and collapsing magnetic field therein. The said moving magnetic field creates a voltage across the leads of the said inductees' wires, and a current flow if the circuit is completed. If the input current is AC, the said induced voltage and current is of one polarity when the said magnetic field is propagating and of an opposite polarity when the said field is collapsing, and the output is AC. If the input current is Pulsed DC, the said induced voltage and current is of uniform polarity when the said magnetic field is propagating and collapsing, and the output is Full Wave DC (FWDC). A battery (not shown) supplies the current, regulated by devices in the control module, for the initial cycle(s) of current in the inductors and it is thereupon removed from the circuit. A major part of the inductees' output is supplied to a load, and a minor part is supplied to the inductors through a feedback circuit (not shown) in the control module (not shown).

Another aspect of variants of an electricity generator concerns the output of the inductees. One part of the aforesaid current output is regulated by electronic components (not shown) in the control module (not shown) before it is supplied to a load. Another part of the aforesaid current output is supplied to the inductors through a "feedback" circuit, as current for cycles subsequent to that (those) cycles of initial current cycle(s), in the wires of the. To insure consistent voltage and current of the desired frequency and amperage to the wires of the solenoid inductors, this part of the alternating current output is preferably filtered through dedicated electronic components that may include a voltage and current regulator (not shown) included in the aforesaid feedback circuit (not shown) in the control module (not shown). Should the system shut down for any reason, the battery will be brought on-line again automatically for a re-start cycle, which is programmed in the CPU in the control module (not shown). The voltage, amperage and frequency of the current supplied to the parallel circuit of solenoid inductors are of critical importance.

A further aspect of an electricity generator variant concerns parallel circuitry. All inductors and inductees of all interlocking sections are wired in their respective parallel circuit. Thus, the same flow of current in the parallel circuit of the wires of the solenoid inductors generates an identical moving magnetic field of concentric circles at the same time in and around all the wires of all said inductees. The concentric circles of the magnetic field propagates, then collapses, in the same manner and with the same directionality, through the wires of all inductees at the same time, inducing a cyclic voltage across the leads of the aforesaid inductees and inducing a cyclic current flow therein if a complete circuit is provided. There are two significant advantages that accrue from parallel circuitry in the present disclosure: (1) redundancy, and (2) reduction of resistance.

The aspect of redundancy allows an electricity generator to continue functioning even if one or more of the wires of an inductor, or an entire inductor, and/or one or more of the wires of an inductee, or an entire inductee, becomes defective or is damaged, albeit at a level of efficiency that is more or less reduced. Obviously, the redundancy aspect of a generator is increased the more inductors and inductees it includes.

The aspect of reduction of resistance is important for the efficiency of the circuits of both the inductors and inductees of the present disclosure of all variants of an electricity generator. The resistance of a parallel circuit to current flow is an inverse function of the total of each resistance in the circuit: the greater the number of resistances in a parallel circuit, the less is the resistance to current flow of the whole circuit. Less resistance in a circuit means that a higher current flow is possible for a given voltage. Less resistance also means that there is less heat loss in the circuit, which subject will be discussed hereinafter. It is expected that the resistances of wires of the circuits of both inductors and inductees should be quite low, as: (1) the wires in both the aforesaid elements are connected in a parallel circuit and (2) all such elements are connected in their respective parallel circuit and (3) there are many inductors and inductees having many square wires each providing a greater area than would a round wire in that same section, resulting in an appreciable total area for all the wires; greater total area in the wires means less resistance. As will be discussed hereinafter, it is desirable that the inducing current has the highest possible cyclical frequency, as this will provide the highest induced voltage for a given ratio of wires (or the lengths thereof) of inductees to inductors. However, increasing the frequency of the inducing current creates the undesirable phenomenon of increased resistance in the inductee's wires, even if they are short. Thus, one solution is the shortest possible length of inductee's wires (as is the case of the toroidal variant of a generator, discussed hereinafter). A straight-wire configuration easily allows for the shortest possible length of wires in the inductees whereas, on the contrary, the wires of the coil inductees, surrounding the solenoid inductors as they do, are necessarily long. A further consideration relates to the resistance of the inductee circuit compared to that of the inductor circuit: it is not desirable that the resistance of the inductee circuit be less than that of the inductor circuit, as described hereinafter. However, as the voltage and number of wires in the inductees preferably will always be multiples of the voltage and the number of wires in the inductors, the resistance of the inductee circuit will always be significantly less than the resistance of the inductor's circuit. Thus, for the reason stated above, it is advisable that a resistance be included in the inductee circuit.

A further aspect of an electricity generator variant concerns that part of the inductee's current output that is supplied through a "feedback" circuit, defined herein as the circuit from the control module to the parallel circuit of inductors, supplying the current for cycles subsequent to that (those) cycles of initial current cycle(s). As the circuit of the feedback circuit is always completed, it always provides a path for part of the current output of the inductees, even if there is no load on the other part of the current output. Thus, there is always current flowing in the wires of the parallel circuit of the inductees. As this current is filtered through the aforesaid electronic components, the resistance of the parallel circuit of the wires of the inductees is expected always to be higher than the resistance of the parallel circuit of the wires of the inductors. As will be described hereinafter, the wires at the exterior of the inductors are in physical contact with wires on the interiors of the inductees, such that the higher resistance of the circuit of inductees has a positive ramification in the event that wires become frayed in that "contact" area. A magnetic field exerts a force on wires situated in its field: the force of the moving magnetic field of the inductors is different from the force exerted on the wires of the inductees by the current induced therein. As the wires situated in the interiors of those components would move in unison in response to that force, there would be little chance of fraying, and they are protected by their coatings. If fraying were to occur in the coating of one or more of those wires in their interior, and there were electric contact between the wires, it could reduce the effective number of wires in the element, but the effect would be minimal. But if the wires in the "contact" area were to become frayed by a friction caused by the different magnetic forces exerted upon them, a wire or wires of an inductor could come into electric contact with a wire or wires of an inductee. In such a case, if the resistance of the parallel circuit of the inductors were greater than the resistance of the parallel circuit of the inductees, the inducing current flowing in the wires of the inductors would choose the path of least resistance, and flow into the wires of the inductees, causing a short circuit. This would cause the generator to shut down, as the two parallel circuits would be joined; thus there would be no voltage induced in the wires of the inductees. However, as the resistance of the parallel circuit of the inductees is expected to be greater than that of the resistance of the parallel circuit of the inductors such fraying, if it were to occur, would have no effect: the current in the parallel circuit of wires of the inductors would not flow into the parallel circuit of wires of the inductees. If the total resistance of the parallel circuit of the inductees were not greater, a resistance should be added, in the control module.

As described herein-before, the only external source of energy required for the functioning of an electricity generator of the present disclosure, for the initial cycle(s) only, is preferably at least one rechargeable-type battery (not shown). The battery or batteries is (are) selected according to the voltage and ampere ratings to ensure the capability of supplying the amperage to the inductors for the initial cycle(s), enabling the creation of a moving magnetic field of sufficient density and strength to traverse completely the wires of the inductees. An automobile battery, for example, may supply 300 amps at 12 v or 550 amps at 24 v. Small batteries, AA's for example, supply 2.5 amps at 1.5 volts, and are usually linked in series. Small round batteries, usually found in hearing aids, etc., may supply 16 Ma at 3 volts. In some smaller configurations, the battery may occupy more space than the generator. This may be an inconvenience, which it is possible to remove by having a "staged" initial power supply, wherein a small battery supplies the "starting" power for a small generator, whose output is the starting power for a larger generator, continuing until the required starting power of the final-stage generator is achieved. The power outputs of these intermediate generators obviously continues even after the final-stage generator is on-line and, while neither their voltage of amperage is that of the final-stage generator, they may be either transformed or used for ancillary circuits. The amperage and frequency of the current supplied to the parallel circuit of inductors of the final-stage generator is of critical importance, and this subject is discussed hereinafter.

Two further aspects of the present disclosure of variants of an electricity generator concern the density and the strength (intensity) of the moving magnetic field created in and about the inductors. It is important that the aforesaid moving magnetic field be of such density that the desired voltage and current be induced in the wires of the inductees. The "density" is the number of flux lines per square inch, known as the "B" field. The number of wires ("turn-equivalents") in an inductee, multiplied by the amperage in the wires, is the "ampere-turn"; the greater the number of turn-equivalents and the higher the amperage, the denser the field. As indicated herein-before, the reason square wires are preferable to round ones is that a square cross-sectioned wire has a greater area for the same lateral and vertical dimension as round wire, and greater area means that a wire can carry a higher-amperage current.

The density of the "B" field is affected by the magnetic permeability of the cores of the inductors of an electricity-generator embodiment: when enhanced by the relative permeability of those cores, it becomes the "H" field. Relative permeability is a multiplying factor: the higher the relative permeability, the greater the enhancement of the magnetic field, the stronger the "H" field. A strong "H" field, having the densest flux lines possible, is desirable in the present disclosure of a generator embodiment. It is important that the density and strength of the field be such that it may propagate with sufficient density, in and around the inductors, and through to the outermost wires of the inductees. As the concentric circles of a magnetic field propagate, each flux line of the field stretches to cover a greater arc, such that the line's density is reduced. In a like manner, as a propagating field expands to cover a greater area, the distance between the flux lines increases, diminishing its density over said greater area. The fields strength is inversely proportional to the square of the distance from the center of the inductors to the outermost wires of the inductees. Thus, the stronger the moving magnetic field and the less distance it must traverse to the said outermost wires, the more effective it is. The distances involved obviously vary in differently sized generators, such that the desired strength of the magnetic field will vary.

There are a number of aspects relative to the power output of the inductees of all embodiments and variants of the induction devices of the present disclosure: (1) the type of current input to the inductors determines the type of current output of the inductees; (2) for all straight-wire embodiments and variants, the number of inductee's current output if a complete circuit is provided is quantified by the following formulas (where F=the frequency of the current supplied to the number of inductors, N=number of wires, prim=primary, sec=secondary, I=the amperage of the current supplied to the number of inductors: (a) the voltage induced in the number of inductees is quantified by the formula: $V_{sec}=(N_{sec})/N_{prim}(F_{prim})$; (b) the current induced in the number of inductees if a complete circuit is provided is quantified by the formula: $I_{sec}=N_{prim}/N_{sec}(I_{prim})$; (3) For all embodiments and variants having solenoids as inductors and coils as inductees, the inductee's output if a complete circuit is provided is quantified by the following formulas, where L=total length of the wires: (a) the voltage induced in the number of solenoid inductees is quantified by the formula $V_{sec}=L_{sec}/L_{prim}(F_{prim})$; (b) the current induced therein if a complete circuit is provided is expressed by the formula: $I_{sec}=L_{prim}/L_{sec}(I_{prim})$.

Thus, the inductee's wattage output is quantified by the reduced formula $W_{sec}=(F_{prim})(I_{prim})$. It is evident that, for any given generator: (1) the induced voltage may be increased by (a) increasing the number of wires in the number of straight-wire inductees, or the length of the wires of the number of coil inductees. This leads to a reduction of the amperage as the wire ratio becomes the reciprocal, and there is always greater number of wires in the inductees than the inductors. Increasing the frequency of the inducing current is the easiest manner by which to increase the output of the inductees, as this frequency is the multiplier for the voltage formula, and increasing it does not decrease the amperage of the current output; (b) increasing the amperage of the current supplied to the number of inductors. This will generally require increasing the cross-section of the inductor's wires, and would be utilized in large-scale installations. (2) the strength and intensity of the magnetic field (the "H" field) must be such that it attains the outermost wires of the number of inductees and, the utilization of a highly permeable core for the inductors will generally insure that this is the case. It may be that the "H" field's strength is sufficient to add layers to the number of inductees; (4) as discussed hereinafter, the current for the initial pulse(s) is supplied from a battery: it may remain pulsed DC if the desired inductee output is Full Wave Direct Current (FWDC). Obviously, the battery's supply may be converted to AC if the desired output is AC. The succeeding current supply from the feedback circuit to the control module and therefrom to the inductors is thus either FWDC or AC. DC is the preferable output for small generators, since the apparatus to which they would supply electricity would generally be small (requiring DC at a low amperage), whereas AC is the preferable output for larger apparatus (requiring higher wattage).

While the current induced in the wires of the number of inductees of a variant of an electricity generator is a function of variables, which depend upon the configuration of the generator, the formulas given above provide some generalities. Also, Faraday's law states that a current is equal to voltage divided by resistance. The induced voltage in the number of inductees of the preferred configuration of generators herein described is a function of: (1) the ratio of the number of wires ("turn-equivalents") of the number of inductees that are traversed by the concentric circles of the moving magnetic field, compared to the number of wires of the number of inductors and; (2) the frequency of the inducing current in the inductors (both as expressed in the formulas given herein-before); (3) amperage of the inducing current; (4) the density and strength of the magnetic field. This last element has been discussed hereinbefore, and resistance will be discussed hereinafter.

As concerns the number of wires ("turn-equivalents") of the inductees of variants of an electricity generator: it is obvious that the smaller the cross-section of the wires therein, the wider and higher is the inductee containing the wires, the higher is the ratio, and thus the higher the voltage induced in the inductees for a given inducing frequency. The number of wires in a generator may be increased by decreasing the lengths of the inductors and decreasing the corresponding lengths of the inductees, but increasing their volume, such that there would be a greater number of wires in the secondary volume. Obviously, the number of layers of wire of an inductee should be the maximum consistent with the strength of the magnetic field generated, the objective being that the field should at least traverse the outermost layer of wires of the inductees. For a given amperage in the wires of the circuit of inductors, a greater number of wires or "loops" in the inductees translates into a higher induced voltage in the wires of the inductees.

As concerns the frequency of the cyclic current in the wires of the parallel circuit of the inductors of an electricity generator variant, there are a number of considerations, among which are: (1) penetration depth of the magnetic field lines into and through the wires of the inductee, and (2) power output.

As to (1), the penetration depth of the magnetic field lines into and through the wires of the inductors, the frequency of the inducing current must be such that the magnetic field lines, whose movement is at a relativistic speed, would have the time to penetrate and traverse the wires of the inductees and collapse therefrom, before the initiation of a following cycle. Higher frequencies penetrate a lesser distance into wires than lower frequencies simply because there may not be enough time in one half cycle of high-frequency alternating current or one pulse of high-frequency pulsed direct current, to penetrate the wires. Obviously, the cross-section of the wires of the inductees is a major determinant of the dimension of a generator. As concerns copper wire, current at a frequency of 50-60 Hz penetrates approximately 8.6 mm; at 300 Hz approximately 7 mm; at 1.2 KHz approximately 5 mm; at 300 KHz, approximately 0.12 mm. Copper wire having a square cross-section of 5 mm is the equivalent of an approximately 8-9 US gauge round wire, capable of carrying 64-73 amps of current, and accepts a frequency between 1.65 and 2.05 Kilohertz with no skin effect. If there is a skin effect problem, there are solutions that may be appropriate, either individually or in combination: (1) reduce the section of the wires of the inductors, making them compatible with the penetration factor of the desired frequency. Thus, the wires of the inductees could have a flat cross-section instead of square, while retaining the area of the wire; (2) choose a different material for the wires. If frequencies of 300 KHz (which is classified as Medium-Frequency) or higher, are utilized as the inducing current, then wires fabricated of magnesium-zinc may be preferable in either or both aforesaid components of the induction device. The penetration depth characteristic of such wires is sufficient even for the thickest wires at frequencies even exceeding 1.2 MHz. Such wires have the lowest core loss and high saturation characteristics (up to 60 amps); (3) choose a different type of wire for the wires of the inductees, such as braided wires. Such wires are known as "Litz" wires, and consist of several smaller strands of wire that are insulated from each other and wound in a braid. The braid pattern ensures that each wire stand spends the same amount of its length on the outside of the braid, so any skin effect distributes the high-frequency induced current equally between the strands, resulting in a larger cross-sectional conduction area than an equivalent single wire.

As to (2), the power output of a generator of the present disclosure, the frequency of the current supplied to the parallel circuit of the inductors is the major determinant of the induced voltage and most easily controllable. The formula for the induced voltage is [V secondary=N number of wires of secondary/N number of wires of primary×(frequency of the induced current in the primary)]. For a given frequency, a high ratio of wires (sec/prim) is advantageous. However, the opposite is true for the induced current, according to the formula for induced current [Is=Np/Ns(Ip)]. Thus, while larger generators could have larger cross-sectioned wires, capable of higher ampacity, the amperage in the inductees will always be relatively low, because of the inverse ratio of wires. Whereas current-art electricity generators move wires through a magnetic field, the novel generator disclosed herein moves a magnetic field through wires. While the movement of the wires is subject to significant limiting factors, the only limiting factor to the frequency of the inducing current is the "skin effect" (discussed herein-before), such that the inducing frequency may be extremely high. The frequency utilized in the US and Canada is 60 Hz, and generally 50 Hz in other countries and, while such a frequency could theoretically be utilized as the frequency of the inducing current, such frequencies will not induce sufficiently high voltage in the inductees, even with a high ratio of inductee wires to inductor wires (described herein-before). Thus, a common higher multiple of those frequencies is preferred, such as 300 Hz or 600 Hz (considered "Medium Frequency") and from which either aforesaid currently used frequency may be derived easily. But higher frequencies are even more preferable, as they produce higher voltages (thus a higher wattage for a given generator). Thus, as permitted by the cross-sections of the inductees' wires, frequencies between 600 Hertz and 300 Kilohertz, and frequencies exceeding 300 KHz could be utilized. Solid-state frequency converters capable of supplying up 800 KHz are currently available, and frequency converters capable of supplying higher frequencies could be developed. Thus, the frequency ranges of the inducing current preferred for use in a generator embodiment are: (1) 50 Hz to 300 Hz; (2) (preferred) 300 Hz to 300 KHz; (3) (more preferred) exceeding 300 KHz. Electronic apparatus in the control module (not shown) would permit the voltage and current induced in the parallel circuit of inductees to be regulated or transformed, and any frequency to be converted to another. Computer addressable devices would permit separate parallel circuits of inductees, thus enabling any number of phases of current to be output. It must be borne in mind that higher frequencies of inducing current generate higher resistance in the inductee's wires, which is offset by the lower resistance of the parallel circuit and the high number of wires. This subject is discussed hereinafter.

There are three possibilities for the types of cyclic current supplied to the parallel circuit of inductors of variants of an electricity generator: (1) that all cyclic current be Alternating Current; (2) that all cyclic current be Pulsed Direct Current (PDC); (3) that the cyclic current be composed of a hybrid of pulsed direct and alternating current. If a hybrid cyclic current were utilized, it would consist partly of PDC (either as the initial pulse or as subsequent pulses) and partly of AC (either as the initial current or the current subsequent to the initial pulse of DC). This possibility does not present any apparent advantage, and thus it is not preferred.

The preferred possibility for the cyclic current supplied to the parallel circuit of inductees is that it be all alternating current. It is known that a reversal of the polarity (a characteristic of AC) of an inducing current in an inductor will generate a moving magnetic field in and around the inductor. As described herein-before, for the initial cycle(s) of current to the parallel circuit of wires of the inductors, a battery (in the control module (not shown) supplies direct current to other electronic components (not shown) in the control module, including an inverter, a capacitor, a voltage regulator and a frequency regulator and controller (programmed to supply the desired frequency of current as the "starting cycle(s)"), This (these) starting cycles(s) of current would create the first propagation(s) and collapse(s) cycles of the moving magnetic field in and around the wires of the inductors. For the subsequent current supply, a part of the current induced in the wires of the inductees is fed back to the parallel circuit of wires of the inductors through a feed-back circuit, as described herein-before.

If all direct current is utilized for the inducing current, it must obviously be pulsed DC (PDC), which is a cyclic current having only a positive waveform, and would induce Full Wave DC (FWDC) in the inductees. This may be smoothed and regulated to DC, and is the preferable output for small generators, since the apparatus to which they would supply electricity would generally be small (requiring DC at a low amperage). Each pulse in the inductors creates a propagating magnetic field and a collapsing field in the inductees, each of which induces a DC voltage pulse in the inductee's wires, a Full Wave DC. The succeeding current supply through feedback circuit to the control module and therefrom to the inductors is Full Wave DC. The initial DC pulse(s) is (are) supplied from a battery (not shown) preferably through a capacitor in the control module (not shown). This current is treated by electronic apparatus (not shown) in the control module (not shown), to regulate the frequency of the PDC to that frequency desired. While all DC pulses could be supplied by means of a computer-controlled solid-state on/off switch, the utilization of such a switch for all pulses has a disadvantage. When such a switch is opened to end a pulse, a "switching surge" effect is caused, which surge would cause arcing damage and the possibility of failure over time. Thus the use of such a switch is not preferred; a capacitor or the like is preferred for the initial pulse(s) and such a switch is obviously not necessary with FWDC inductee output.

An important aspect of a generator variant of the present disclosure is that it is capable of delivering electricity "on demand". As there is no fuel cost involved, in times of lower demand, a generator may simply be taken "off line". Alternatively, a generator may be shut down, to be started again when demand requires it.

Additional aspects of the present disclosure of variants of electricity generator are that: (1) its principal elements (the inductors and the inductees) are configured in interlocking sections, of which there may be any number and which sections may be of any size. A generator may be large, small, or very small, or may be composed of a number of generators, the parallel circuits of which are interconnected. Thus, a generator has inherent modularity and scalability: each generator may be thought of as a module of a larger-dimensioned generator. A module may be removed from the circuit, or added thereto, forming yet a higher-powered generator. Even the largest generators would require minimal infrastructure and operating costs. A generator not only may they be sited in or near the sites of consumption, but they may also be used in propulsion systems for all types of vehicles; (2) elements of a generator may vary from one configuration to another, For example, the dimensions of a both inductors and inductees, their volumes, the sections of their wires, the material of which the wires are fabricated, as well as their respective number of wires (turns or turn-equivalents) may be different. The magnetically permeable core of the inductor may have a different number of layers, or be fabricated of a different material, or have a different form. Obviously, differently sized generators of the present disclosure will have different power outputs. However, the current induced in the wires of the inductees of any generator is without significant variations in its voltage, amperage or frequency, as it is modulated by apparatus in the control module; it is of grid quality.

Further aspects of the present disclosure generator variants are that they: (1) are characterized by their universality: as magnetism is a universal phenomenon, a generator of the present disclosure will function anywhere; (2) scalable (3) have significant inherent redundancies, allowing them to continue functioning even if many elements become unusable; (4) preferably include no moving parts; (5) inherently safe.

One of the reasons a generator of the present disclosure is efficient is because its output is derived from conversion of potential magnetic energy to electric energy, which conversion requires no fuel or energy input, although it consumes a part of the current output from inductees to provide current to the inductors for cycles subsequent to the initial cycle(s), as described herein-before. A generator having no moving parts is, by definition, more dependable (less likely to break down) than one having moving parts. Accessibility is another aspect: a generator may be more or less accessible for maintenance and/or repair and it follows therefore that accessibility is of less importance for a generator that has no moving parts; not only does movement require energy, it also creates friction which consumes energy dissipated as heat, which is undesirable. Obviously, a generator of the present disclosure may have moving parts but as that would serve no useful purpose it is not preferred.

Cost through life cycle is another aspect to consider: devices having moving parts generally require at least preventive maintenance at some intervals if proper functioning is to be assured; they may require repair(s) at some intervals and, as they are subject to wear, certain replacement either totally or partially at some point(s) in their life cycle. On the contrary, a generator of the present disclosure, having no moving parts, is less likely to be subject to those requirements.

As a generator of the present disclosure requires no fuel, there is no fuel tank and thus no possibility of a fuel tank leakage, rupture, fire or explosion, and there is no carbon footprint. As there are no moving parts in a generator, there is no energy component in a part, which, in the event of the part's failure, could result in a catastrophic failure of the generator. Any event, internal or external, which would cause a partial failure, would simply cause a part of the generator to cease functioning, as described hereinbefore. A large-scale external event could cause the generator to simply cease functioning, in a "shut down" having no external consequences.

A further aspect of the disclosure of variants of an electricity generator is that systemic losses are reduced to a minimum. The current flowing in the wires of the inductors, as well as the movement of the magnetic field there-around, will inevitably cause undesirable effects, such as hysteresis, vibrations thereof, and eddy currents. Eddy currents and coercion are reduced by the use of an insulated laminated scribed core in the inductors; vibrations are reduced by the use of rigid walls and enclosures for the aforesaid elements. Further, in spite of the parallel circuitry of the inductors and relatively low resistivity due to the total area of the wires thereof, certain generators could have current flows that could generate considerable heat. Where considerable heat is produced in a generator by any phenomenon, it flows towards thermistors (not shown) to create electricity, which current flows to an ancillary circuit (not shown).

Another aspect of the present disclosure of variants of an electricity generator is that an ancillary circuit (not shown) preferably provides current to sensor circuits and other circuits (not shown), which current is another small part of the current induced in the inductees. The control module (not shown) includes at least one of the following apparatus: battery, capacitor, inverter, voltage rectifier, voltage and current regulators, CPU, DSP, sensor controller, phase controller, master on/off switch, secondary solenoid-equivalent device output controller (none of which are shown). Reliance on sensors and computer control is necessary for the proper functioning of the generator described herein. Methods and embodiments to perform such functions are well known in the art, and thus are not shown herein. Circuitry, cabling and wiring connectors and electric interfaces and sensors are not shown, ancillary and/or electronic devices well known in the art are not shown in the drawings herein. It may be desirable in certain induction devices, notably the generator configurations, to have computer-addressable switches, sensors and controllers located in strategic locations.

Other aspects of the present disclosure of variants of an electricity generator are the relationships of the magnetic fields of the inductors and the inductees, as well as the creation of a phenomenon in the wires of the inductors known as "back emf". The current flowing in the inductors is slightly out of phase with the current induced in the inductees; thus, even though their magnetic fields are complementary there is no repulsion as the fields are not in phase. However, back emf is produced. Back emf is the self-inductance of the wires of the said inductor, which is function of the number of its turn-equivalents and the current frequency therein. When cyclic current flows through the wires of the inductors, it creates a propagating magnetic field of concentric circles that first traverses the inductor's wires and then traverses the wires of the inductees. As the magnetic field traverses the wires of the inductors, a voltage and a current surge is created therein. This is the back-emf, or counter emf, which is of a polarity opposite to the polarity of the current that created the magnetic field, thus temporarily reducing the voltage across the leads of the wires of the inductors. When the concentric circles of the magnetic field collapse, they collapse not only through the wires of the number of inductees, but also back through the wires of the number of inductors, wherein a second back emf is produced. These effects are not material in the functioning of any induction device of any configuration disclosed herein.

There is a further aspect somewhat analogous to the movement of the wires of the inductors and inductees in response to the magnetic field in which they are situated, described hereinbefore. In a preferred variant of a generator, the number of inductors forms a long electromagnet, as described hereinbefore. However, the number of inductees also forms an electromagnet when the inducing current flows through their wires. Although they are not exactly in phase, the polarities of both the inductors and inductees are the same throughout the cyclic pattern of current flow, such that they constantly repel each other. However, as the secondary volume(s) surround(s) the primary volume(s) in all preferred variants of an electricity generator, the repelling forces are exerted equally on all sides of the inductors, and should thus cancel out. In any case, as the preferred frequency of the inducing current is relatively high, if vibrations do occur because of inequalities in the magnetic fields, they should be small.

It is informative to view the calculations relative to a nominal electricity generator of the present disclosure, given in the section entitled Calculations for a Nominal electricity generator presented below.

As has been mentioned herein-before, induction devices are generally inefficient, as they utilize only a part of the magnetic field generated by the inductor, which is that part of the moving magnetic field facing the inductee. As the Halbach Array concentrates its magnetic field in a particular manner, they have found uses that take advantage of this particularity. There are a number of patents relating to Halbach Arrays having different configurations and uses, all using permanent magnets, which appears to have limited its use somewhat. In all single-layer current-art Halbach Arrays, adjacent magnets have polarities at 90 degrees of each other; in multilayer arrays, and an adjacent magnet of an adjacent layer may have the same polarity. U.S. Pat. No. 5,6312,618 discloses an electromagnetic Halbach Array comprising coils, and its use in a levitation device. As indicated hereinbefore, coils and solenoids are efficient in volumes that are cylindrical, but not in volumes that are parallelepiped. Further, it is evident that an electromagnet offers distinct advantages over a permanent magnet in many electromagnetic devices.

Thus, a third preferred embodiment using the template herein-before disclosed, is a straight-wire electromagnetic Halbach Array and its derivations, an electromagnetic Halbach-Array Induction Device and an electromagnetic Halbach-Array electromagnet. As in current art, an electromagnetic Halbach-Array may exist in different form-factors: flat single layer, flat multilayer, toroidal having a single ring or toroidal having multiple concentric rings, all of which function on the same operating principle. These novel electromagnetic Halbach Arrays provide an advantage over current-art permanent-magnet Halbach Arrays in that being electromagnets, the magnetism of the electromagnetic array not only may be temporary, but the strength of the fields may be enhanced with magnetically permeable cores configured in each electromagnetic inductor or element of an electromagnet. The individual electromagnets in such an array must be physically constrained; the polarities of the adjacent electromagnets are such that the electromagnets would repel each other when a current flows through their wires.

The electromagnetic Halbach Array utilizing straight wires herein-before disclosed may be configured as the first stage of an electromagnetic Halbach Array Induction Device, defined as a configuration of Halbach-Array electromagnets in an embodiment having inductors and inductees both comprised of straight wires. The physical orientation of the adjacent inductors is such that, when a current flows through their wires, the adjacent inductors become electromagnets having polarities that may be neither opposite nor alike such that, as in a current-art Halbach Array, the magnetic field of the inductors is concentrated in one direction, towards the inductees. Further, as the straight wires of the inductees are preferably parallel to the straight wires of the inductors, the polarity of adjacent individual inductees may be neither opposite nor alike when a current is induced in the wires thereof, but is the same as the inductor with which the inductee is coupled. Both the inductor and inductee are comprised of straight wires preferably having a square cross-section and sharp corners, and are closely assembled in the width and at least one layer in the height along the length of both the inductor and inductee and in such manner that: (1) at least one straight wire of at least one layer of at least one inductor is parallel to at least one straight wire of at least one other layer of the said at least one inductor and (2) at least one straight wire of at least one layer of the at least one inductor is parallel to at least one straight wire of at least one layer of the at least one inductee.

Whatever the form-factor of an electromagnetic Halbach Array or an electromagnetic Halbach-Array Induction Device, be it flat single layer or multilayer, single-ring toroid or a toroid having more than one ring, the dimensions of both the inductors and the inductees are preferably substantially the same. In all configurations of an electromagnetic Halbach-Array Induction Device, the inductors become bar electromagnets when a Pulsed Direct cyclical current flows through their wires, and a moving magnetic field comprised of concentric circles is generated in and about their wires, inducing a voltage in the inductees, and a current therein (if a complete circuit is provided). In all embodiments and configurations of an electromagnetic Halbach Array, the operating principle is the same: (1) the individual inductors of the device are interfaced in a parallel electric circuit such that all said individual inductors are electrified at the same time, and the same phase of the current is induced in the wires of all said individual inductees at the same time; (2) the individual inductors of the device are configured in a specific manner such that: (a) when PDC current flows through the individual inductors, the polarities of adjacent individual inductors may be neither opposite nor alike; (b) each individual inductor is inductively coupled with an individual inductee which has the polarity of its coupled individual inductor when a cyclic inducing current flows through the inductor's wires; (c) the individual inductees of the device are interfaced in a parallel electric circuit. Preferably, both inductor and inductee have the same dimensions and the inductee has at least the same number of straight wires having a particular physical orientation as the inductor has straight wires having that physical orientation. It is known that, for the same frequency of inducing current, the greater the number of straight wires traversed by the said magnetic field, the higher the induced voltage in the inductees.

When a PDC current flows through the parallel electrical circuit of the wires of each individual Halbach-Array inductor, a moving magnetic field is created in and around each wire of the said inductor (and thus in and around the said inductor), which said magnetic field is concentrated towards the inductee with which it is coupled. The inducing current must be Pulsed DC, otherwise the side of the device on which the magnetic field is concentrated would be switched. In an electromagnetic Halbach Induction Device, the inductors must be physically constrained or their polarities would cause them to be repelled from each other when a cyclic current flows through their wires. The inductees must also be physically constrained as, when a current is induced in their wires, their polarities would be such that the inductees would repel each other. Both the inductors and inductees are, in effect, the electromagnetic device previously disclosed herein. Both include conductor plates at their ends enabling a parallel circuit interface with the straight wires thereof. The conductor plates are electrically interfaced with cable sections and other electrical interfaces (not shown), enabling a parallel circuit of all inductors and inductees. Inductors and inductees of all configurations are physically contained in a constraining case, preferably fabricated of a material that is magnetically impermeable, that both separates each individual inductor and inductee and provides a housing in a hollow part of the case's wall for a color-coded magnetically-shielded two-conductor cable interface (not shown) that enables completion of the parallel circuits of both the inductors and inductees. The coating of the inductor's wires is preferably of a different color than that of the inductee's coating, and leads, connectors and interfaces of the inductors and inductees have respective like color codes to insure against cross circuitry in assembling the induction device.

As with the Halbach inductors described previously, each magnetic subassembly of the toroidal form-factor preferably includes a magnetically-permeable core preferably comprised of a number of metal sheets having a high relative permeability and low coercion, such as laminated mu-metal or sheet silicon steel, with insulation sheets between the metal sheets. Said metal sheets preferably have a uniform grain orientation and are uniformly scribed, to reduce hysteresis loss. A magnetically permeable core increases the strength of the magnetic field generated in and around the aforesaid elements of the array by a factor of up to thousands compared to an air core, when a current flows through its wires. The individual magnetic subassemblies of the toroidal form-factor: (1) are interfaced in a parallel electric circuit such that all said magnetic subassemblies are electrified at the same time; (2) are configured in a specific manner such that when a current flows through the individual magnetic subassemblies, the polarities of adjacent individual magnetic sub-assembles may be neither opposite nor alike; (3) preferably have the same dimensions and the same number of straight wires. All magnetic subassemblies include conductor plates at their ends enabling a parallel circuit interface with the straight wires thereof. The conductor plates are electrically interfaced with cable sections and other electrical interfaces (not shown), enabling a parallel circuit of all magnetic subassemblies of the toroidal electromagnet. All magnetic subassemblies of the toroidal form-factor are physically contained in a case, preferably fabricated of a material that is magnetically impermeable, that both separates each magnetic subassembly of the toroidal electromagnet and provides a housing in a hollow wall for a magnetically-shielded two-conductor cable interface (not shown) that enables completion of the parallel circuits of all magnetic subassemblies of the toroidal form-factor. When the magnetic subassemblies are electrified, the magnetic field of the toroidal Halbach Array is directed to one side of the said electromagnet, where it is a concentrated coherent field.

To form an electromagnet, a magnetically permeable plate is configured directly adjacent the array in the zone of concentration of its magnetic field, to protect the magnetic subassemblies from damage; this plate obviously becomes an electromagnet. Such an electromagnet may have either a flat or toroidal form-factor whose configuration, while somewhat more complex than current-art solenoid electromagnets, offers a significant advantage: that its magnetic field is directed towards the object to be attracted (whereas the magnetic field of a current-art electromagnet utilizing solenoids, is not). This concentrated directionality provides a more efficient electromagnet, by allowing a given current to generate a more powerful magnetic field on the side towards which it is directed. Each magnetic subassembly of the electromagnet is, in effect, the electromagnetic device disclosed hereinbefore. The preferred form-factor for such a Halbach-Array electromagnet is toroidal, having at least one ring, wherein while no adjacent magnetic subassembly has a polarity that is complementary or alike when electrified. If the configuration comprises more than one ring, said rings are concentric; adjacent magnetic subassemblies of an adjacent concentric ring may have polarities that are complementary or alike. The electric interfaces in the hollow-wall portions are not shown.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 1 presents a side elevation view of a first exemplary electromagnetic induction device;

FIG. 2 presents a sectioned end elevation view of the electromagnetic induction device originally introduced in FIG. 1, the section being taken along section lines 2-2 of FIG. 1;

FIG. 5 presents an isometric side view of an exemplary inductor assembly interlocking section of a parallelepiped variant of a generator;

FIG. 6 presents an sectioned end view of the inductor assembly interlocking section of FIG. 5, the section being taken along section lines 6-6 of FIG. 5;

FIG. 7 presents a side elevation view of the inductor assembly interlocking section originally introduced in FIG. 5;

FIG. 8 presents an isometric side view of two vane sections of the inductor assembly interlocking section, illustrating an assembly interface for joining vanes to the hollow core;

FIG. 9 presents an isometric side view of a common core subassembly of the inductor assembly interlocking section originally introduced in FIG. 5;

FIG. 10 presents an isometric side view of the quadrant subassembly of the inductor assembly interlocking section originally introduced in FIG. 5;

FIG. 14 presents an isometric front view of negative vertical and lateral interface bands assembled within channels of the insulator plate;

FIG. 15 presents an isometric front view of positive vertical and lateral interface bands assembled within channels of the insulator plate;

FIG. 16 presents an isometric front view of a negative male blade connector extending from the lateral interface band into an opening of the male hollow-spine connector;

FIG. 17 presents an isometric front view of a positive male blade connector extending from the lateral interface band into the opening of the male hollow-spine connector;

FIG. 20 presents an isometric front view of an exemplary inductee assembly section, illustrating an inductor subassembly assembled within an inductee subassembly section;

FIG. 21 presents a side view of a hollow wall portion, illustrating a cable section;

FIG. 22 presents an end view of the inductee assembly interlocking-section originally introduced in FIG. 20, the section taken along section line 22-22 of FIG. 20;

FIG. 23 presents a cut-away view of an inductee assembly interlocking section of FIG. 22, showing an inductor assembly interlocking-section, particularly illustrating the non-coincident relationship of their respective conductor plates;

FIG. 26 presents an isometric view of an exemplary flat electricity generator embodiment;

FIG. 27 presents an end view of a magnetically-permeable core integrated in the flat electricity generator originally introduced in FIG. 26;

FIG. 28 presents a front view of an end cap integrated into the flat electricity generator originally introduced in FIG. 26;

FIG. 29 presents an isometric view of an exemplary cylindrical electricity generator embodiment;

FIG. 30 presents an end view of a central portion of the cylindrical electricity generator embodiment originally introduced in FIG. 29;

FIG. 31 presents a partial detail end view of a magnetically-permeable cylinder of the cylindrical electricity generator embodiment originally introduced in FIG. 29;

FIG. 32 presents a front view of a terminal disc of the cylindrical electricity generator embodiment originally introduced in FIG. 29;

FIG. 33 presents a side view of a hollow magnetically impermeable core integrated into the cylindrical electricity generator embodiment originally introduced in FIG. 29, illustrating a female hollow spine, a male hollow-core connector and a four-conductor cable;

FIG. 34 presents a side view of the male hollow-core connector of the cylindrical electricity generator embodiment originally introduced in FIG. 29, introducing four FFF female blade connectors on each side;

FIG. 38 presents an isometric side view of the straight-wire parallelepiped electromagnetic Halbach Array originally introduced in FIG. 36;

FIG. 39 presents a side elevation view of the straight-wire parallelepiped electromagnetic Halbach Array originally introduced in FIG. 36;

FIG. 40 presents an end view of the straight-wire parallelepiped electromagnetic Halbach Array originally introduced in FIG. 36;

FIG. 47 presents a front elevation view of a magnetically permeable core that is utilized within the Toroidal Electricity Generator originally introduced in FIG. 44;

FIG. 48 presents an isometric front view of an external toroidal inductor that is utilized within the Toroidal Electricity Generator originally introduced in FIG. 44;

FIG. 49 presents an isometric front view of an internal toroidal inductor that is utilized within the Toroidal Electricity Generator originally introduced in FIG. 44;

DETAILED DESCRIPTION OF THE PREFERRED EMBODIMENT

Figure 3:
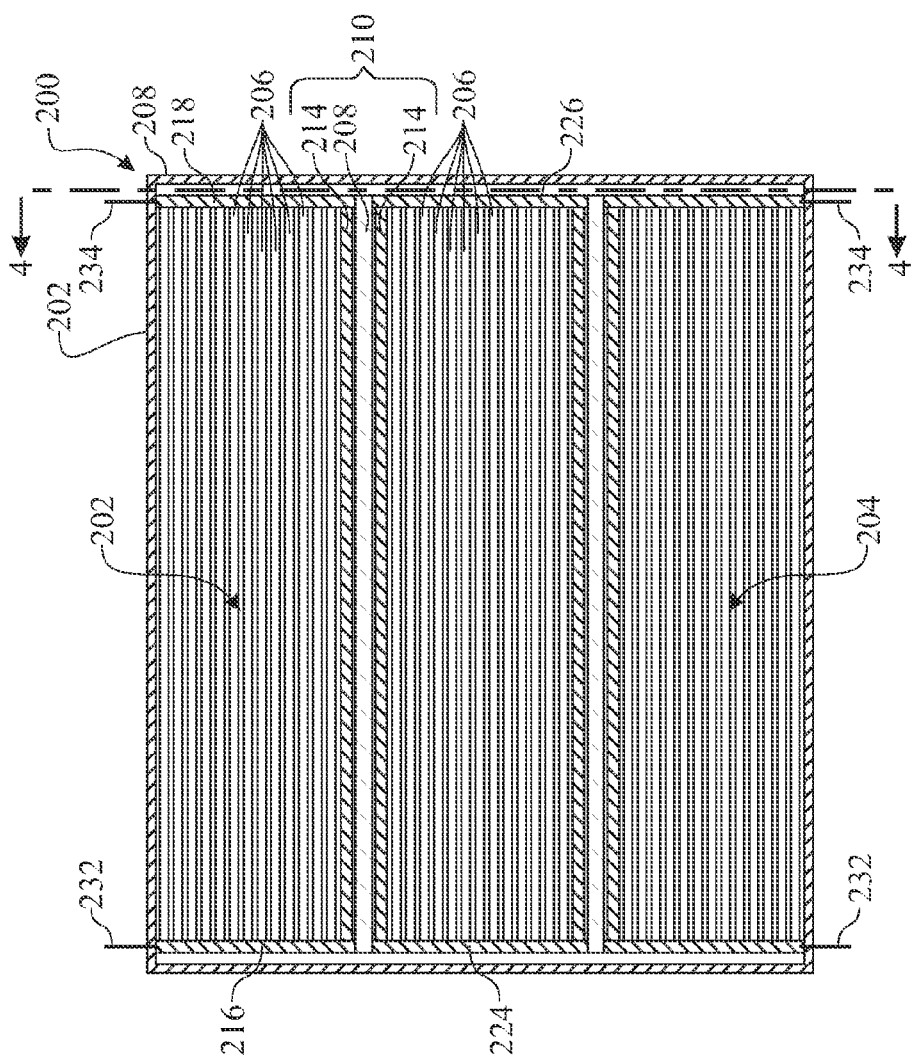
FIG. 3 presents a side elevation view of a second exemplary electromagnetic induction device, illustrating inductor and inductee subassemblies in position of inductive coupling.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 illustrates straight-wire electromagnetic induction device 100 in its simplest embodiment, comprising at least one inductor 102 and at least one inductee 104. While such a configuration will induce a voltage and a current in inductee 104 when a cyclic current flows through the wires of inductor 102, it is inherently inefficient. This is so because the moving magnetic field created in and around inductor 102 traverses (cuts) the wires of only one inductee 104. Notwithstanding, it is sufficient for tasking as a charger or a magnet, and is the straight-wire counterpart of a current-art induction device comprising a solenoid inductor and a coil inductee. To increase its inductive power, it is therefore preferable that inductees 104 be configured in such manner that they completely surround or enclose inductors 102. Each inductor 102 and each inductee 104 include a number of preferably square cross-sectioned sharp-edged straight wires 106 closely assembled in at least one layer in its height and its width, said wires 106 having a length hereinafter-described, in such manner that all said straight wires 106 of straight-wire electromagnetic induction device 100 are parallel to each other. Said inductor 102 also preferably includes magnetically-permeable core 110 preferably comprised of metal sheets 112 having a high relative permeability and low coercion, such as laminated mu-metal or sheet silicon steel, with insulation sheets 114 between metal sheets 112. Said metal sheets 112 preferably have a uniform grain orientation and are uniformly scribed, to reduce hysteresis loss. Magnetically permeable core 110 increases the strength of the magnetic field generated in and around aforesaid inductor 102 by a factor of up to thousands compared to an air core, when a current flows through its wires. Magnetically impermeable case 108 concentrates the moving magnetic field generated in and around aforesaid inductor 102, preventing the said magnetic field from exiting said electromagnetic induction device 100. At one end of straight wires 106 of inductor 102 is situated negative inductor conductor plate 116 and, at the other end is situated positive inductor conductor plate 118. Aforesaid square cross-sectioned sharp-edged straight wires 106 have the length existing between said plates 116 and 118, as well as plates 124 and 126. Both aforesaid plates 116, 118 are preferably fabricated of a material that is a good conductor of electricity, such as copper, and provide both a parallel electrical interface for all aforesaid straight wires 106 of inductor 102 as well as an electrical interface to the exterior of the device for current input by means of negative color-coded input lead 120 and positive color-coded input lead 122. At one end of straight wires 106 of inductee 104 is situated negative inductee conductor plate 124 and, at the other end is situated positive inductee conductor plate 126. Both aforesaid plates 124, 126 are preferably fabricated of a material that is a good conductor of electricity, such as copper, and provide both a parallel electrical interface for all aforesaid straight wires 106 of inductee 104 as well as an electrical interface to the exterior of the device for its current output, by means of negative color-coded output lead 128 and positive color-coded output lead 130. Inductor conductor plates 116, 118 are not in physical or electrical contact with inductee conductor plates 124, 126.

FIG. 2 illustrates straight-wire electromagnetic device 100, along the line 2-2 of FIG. 1, illustrating the same components.

FIG. 3 illustrates electromagnetic induction device 200, which, comprising more than one inductee for each inductor, is more efficient than electromagnetic induction device 100 previously described. This is so, as the moving magnetic field created in and around an inductor traverses (cuts) the wires of more than one inductee. An inductor subassembly 202 is preferably enclosed by more than one inductee subassembly 222. Inductor subassembly 202 includes a number of preferably square cross-sectioned sharp-edged straight wires 204 closely assembled in at least one layer in its height and its width, said wires 204 having a length hereinafter-described, in such manner that at least one straight wire 204 of at least one layer is parallel to at least one straight wire 204 of another layer of straight wires 204 of inductor subassembly 202. Said inductor subassembly 202 also includes at least one magnetically-permeable core 208 preferably comprised of metal sheets 210 having a high relative permeability and low coercion, such as laminated mu-metal or sheet silicon steel, with insulation 212 between metal sheets 210. Said metal sheets 210 preferably have a uniform grain orientation and are uniformly scribed, to reduce hysteresis loss. Magnetically permeable core 208 increases the strength of the magnetic field generated in and around the aforesaid inductor 202 by a factor of up to thousands. Magnetically impermeable case 206 concentrates the moving magnetic field generated in and around inductor subassembly 202 when a cyclic current flows through the straight wires 204 thereof, and which said field has completely traversed the aforesaid wires, preventing the said magnetic field from escaping to the exterior of case 206 (where it would be wasted); thus, the said field may collapse through inductee subassembly 222. At one end of inductor subassembly 202 is situated negative conductor plate 214 and, at the other end is situated positive conductor plate 216, both aforesaid plates 214,216 are preferably fabricated of a material being a good conductor of electricity, such as copper; aforesaid square cross-sectioned sharp-edged straight wires 204 have the length existing between said plates 214 and 216. Said conductor plates 214, 216 provide both a parallel electrical interface for all aforesaid straight wires 204 of inductor subassembly 202, as well as the respective interfaces with negative color-coded input lead 218 and positive color-coded input lead 220. Enclosing inductor subassembly 202 are preferably more than one inductee subassembly 222, which also include a number of preferably square cross-sectioned sharp-edged straight wires 224 closely assembled in at least one layer in its height and its width, said wires 224 having a length hereinafter-described, in such manner that at least one straight wire 224 of one layer is parallel to at least one straight wire 224 of another layer of inductee subassembly 222. The object of magnetically impermeable case 226 is to prevent the magnetic field that has traversed said inductee's straight wires 224 from escaping to the exterior of case 226. At one end of inductee subassembly 222 is situated negative conductor plate 228 and at the other end is positive conductor plate 230; aforesaid square cross-sectioned sharp-edged straight wires 224 have the length existing between said plates 228 and 230. Said conductor plates 228, 230 are preferably fabricated of a material being a good conductor of electricity such as copper, and provide both a parallel electrical interface for all aforesaid straight wires 224 of inductee subassembly 222, as well as an interface with negative color-coded output lead 232 and positive color-coded output lead 234. The orientation of square cross-sectioned straight wires 204 of inductor subassembly 202 is parallel to the orientation of square cross-sectioned straight wires 224 of inductee subassembly 222 such that, when a cyclic current flows through aforesaid straight wires 204 of inductor subassembly 202, they are inductively coupled with straight wires 224 of inductee subassembly 222, allowing said straight wires 224 to be traversed in a perpendicular manner by the concentric lines of force of the moving magnetic field generated in and around straight wires 204 of inductor subassembly 202, inducing a cyclical voltage and current in straight wires 224 of inductee subassembly 222. Inductor subassembly 202 is configured such that its conductor plates 214, 216 are not in physical or electrical contact with inductee conductor plates 228, 230.

Figure 4:
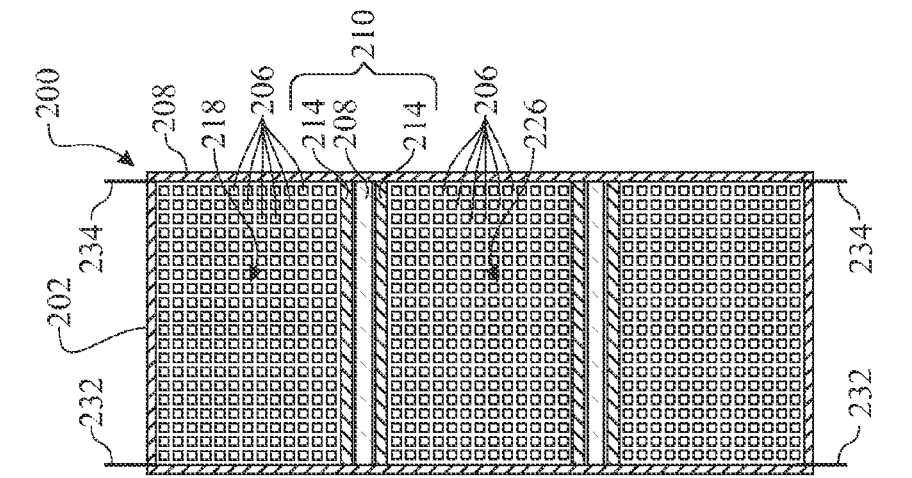
FIG. 4 presents a sectioned end elevation view of electromagnetic induction device originally introduced in FIG. 1, the section being taken along section lines 4-4 of FIG. 3.

FIG. 4 illustrates induction device 200, along the line 4-4 of FIG. 3, and illustrates the same components.

FIG. 5 illustrates inductor assembly interlocking section 304 of parallelepiped variant of a generator 300, illustrating common-core subassembly 306 and quadrant subassembly sections 308. Common-core subassembly 306 comprises laminated magnetically-permeable vane section 310 said vane section 310 comprising more than one metal sheet 312 having a high relative permeability and low coercion, such as laminated mu-metal or sheet silicon steel and preferably have a uniform grain orientation and uniform scribing, to reduce hysteresis loss. Insulation sheet 314 is configured between and on the outsides of metal sheets 312. Insulation strips 315 are affixed to ends of said vane sections 310. Said vane sections 310 are affixed to rigid square magnetically permeable female hollow-spine sections 318. Quadrant subassembly sections 308 include inductor square cross-sectioned straight wires 326 electrically interfaced with both negative-conductor plate 328 and positive-conductor plate 330, providing a parallel electrical circuit for said inductor square cross-sectioned straight wires 326. Said conductor plates 328, 330 include depressions 332.

FIG. 6 illustrates inductor assembly interlocking section 304 along the line 6-6 of FIG. 5, illustrating substantially the same elements as FIG. 5.

FIG. 7 illustrates inductor assembly interlocking section 304, illustrating substantially the same elements as FIG. 5, as well as insulator plate 336 having insulator plate opening 362.

FIG. 8 illustrates two vane sections 310 of inductor assembly interlocking section 304, illustrating the mechanism of fixation of said vane sections 310 to rigid square magnetically permeable female hollow-spine section 318. Metal sheets 312 of vane section 310 include a number of hooks 316 extending from said metal sheets 312 in an offset configuration along the length thereof. Said hooks 316 enable physical mating of said vane section 310 with rigid square magnetically-permeable female hollow-spine section 318, said female hollow-spine section 318 having a number of slots 320 perforated along the length thereof in an offset configuration generally corresponding to the offset configuration of hooks 316. Said hooks 316 are forcibly received in, and cooperate with said slots 320 to accomplish the physical mating of said vane section 310 with said female hollow-spine section 318, forming common-core subassembly section 306. Also shown are outer insulation sheet 314 insulation strips 315.

FIG. 9 illustrates common core subassembly 306, illustrating vane sections 310 comprising more than one metal sheet 312 having a high relative permeability and low coercion, such as laminated mu-metal or sheet silicon steel and preferably have a uniform grain orientation and uniform scribing, to reduce hysteresis loss. Insulation sheet 314 is configured between and on the outsides of metal sheets 312. Insulation strips 315 are affixed to ends of said vane sections 310. Said vane sections 310 are affixed to rigid square magnetically permeable female hollow-spine sections 318.

FIG. 10 illustrates quadrant subassembly section 308, illustrating inductor square cross-sectioned straight wires 326 electrically interfaced with both negative color-coded conductor plate 328 and positive color-coded conductor plate 330, each including depressions 332. Said plates 328, 330 provide a parallel electrical circuit for said inductor square cross-sectioned straight wires 326. Inductor square cross-sectioned straight wires 326 are closely assembled in the width and at least one layer in the height, along the length of each said quadrant subassembly section 308. Inductor assembly interlocking sections 304 are configured in primary volume 302 in such manner that all like color-coded conductor plates 328, 330 are facing in the same direction.

Figure 11:
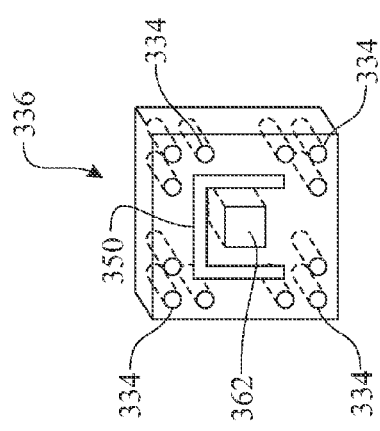
FIG. 11 presents an isometric front view of an exemplary insulator plate of an inductor assembly interlocking section.

FIG. 11 illustrates insulator plates 336 having projections 334 on both sides of said insulator plate 336, which said projections 334 cooperate with depressions 332 of conductor plates 328, 330 allowing said projections 334 to be force-fit therein. Also illustrated are channels 350 as well as insulator plate opening 362. Said insulator plate 336 separates respective negative and positive color-coded conductor plates 328, 330 of adjoining inductor assembly interlocking sections 304, enabling the interlocking thereof and thus the formation of primary volume 302.

Figure 12:
FIG. 12 presents an isometric top view of a male hollow spine connector.

FIG. 12 is a side perspective view of a male non-conducting hollow-spine connector 32 having opening 324.

Figure 13:
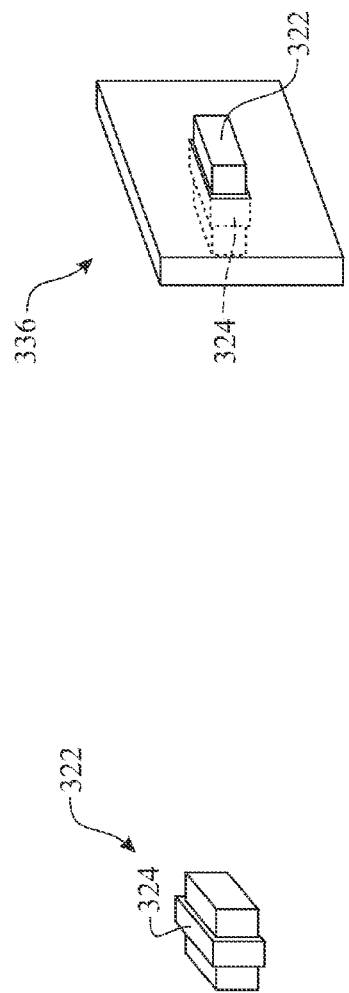
FIG. 13 presents an isometric side view of the male hollow-spine connector assembled within the insulator plate.

FIG. 13 illustrates male non-conducting hollow-spine connector configured in opening 324 of insulator plate 336.

FIG. 14 illustrates insulator plate 336 illustrating negative color-coded conducting vertical interface band 338 and negative color-coded lateral conducting interface band 340 force-fit in aforementioned channels 350 of insulator plate 336.

Said interface bands 338, 340 include projections 334, which are force-fit into depressions 332 of aforesaid negative conductor plate 328, thus providing an electrical interface between said interface bands 338, 340 and said negative conductor plate 328.

FIG. 15 illustrates insulator plate 336 illustrating positive color-coded conducting vertical interface band 342 and positive color-coded conducting lateral interface band 344 force-fit in aforementioned channels 350 of insulator plate 336. Said positive interface bands 342, 344 include projections 334, which are force-fit into depressions 332 of aforesaid positive conductor plate 330, thus providing an electrical interface between said interface bands 342, 344 and said positive conductor plate 330.

FIG. 16 illustrates insulator plate 336 illustrating negative color-coded conducting vertical interface band 340 and laterally offset negative color-coded male blade connector 346 extending therefrom into opening 324 of male non-conducting hollow-spine connector 322.

FIG. 17 illustrates insulator plate 336 illustrating positive color-coded conducting vertical 9 interface band 342 and laterally-offset positive color-coded male blade connector 348 extending therefrom into opening 324 of male non-conducting hollow-spine connector 322.

Figure 18:
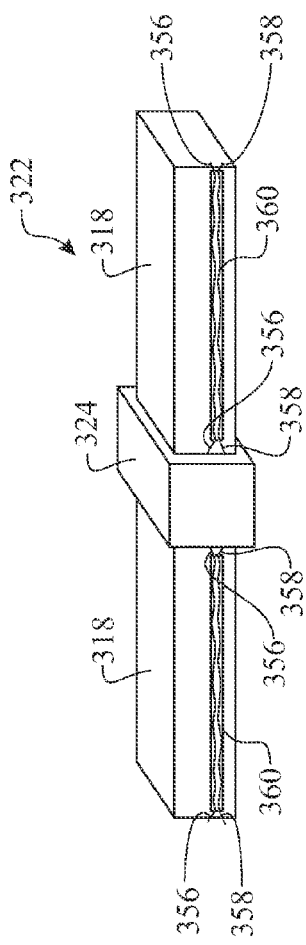
FIG. 18 presents an isometric side view of two female hollow-core sections having a male hollow-spine connector inserted therein, further illustrating a pair of two-conductor cable sections with their male blade connectors configured in the hollow spine sections.

FIG. 18 illustrates two female hollow core sections 318 into which are configured male hollow-spine connectors 322 having opening 324, illustrating also two magnetically-shielded two-conductor cable sections 360 having negative and positive male blade connectors 356, 358 configured in said female hollow spine sections 318 and male hollow-spine connector 322. A negative color-coded FFF female blade connector 352 and a positive color-coded FFF female blade connector 354 are also illustrated. Aforementioned laterally offset negative and positive color-coded male blade connectors 346, 348 are respectively interfaced into one of FFF negative and positive color-coded female blade connector 352,354. The two remaining FF negative and positive color-coded female blade connectors 352, 354 interface respectively with male negative color-coded blade connector 356 and male positive color-coded blade connector 358 of magnetically-shielded two-conductor color-coded cable sections 360, which cable sections 360. Said cable sections 360 enable the parallel electrical circuit of all quadrant subassemblies sections 308. Thus, when they are cyclically electrified, said inductor assembly interlocking-sections 304 form a bar electromagnet in primary volume 302. Sensor cabling (not shown) may be housed in aforesaid hollow-spine sections 318 as well.

Figure 19:
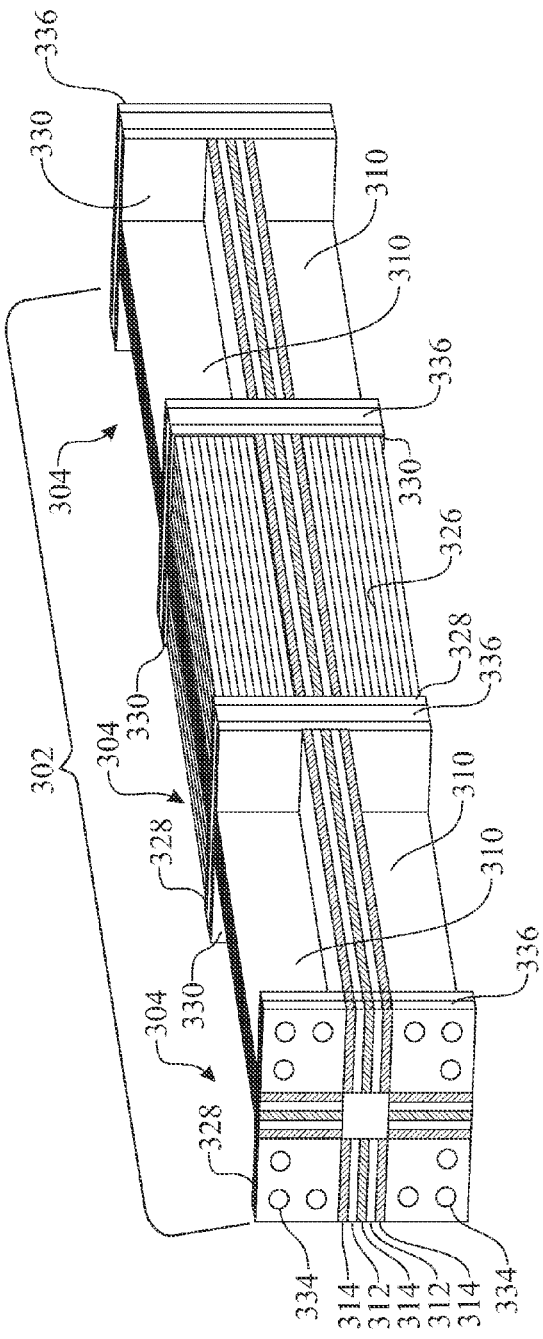
FIG. 19 presents a partially assembled isometric view of a plurality of inductor assembly interlocking sections assembled in length in a primary volume.

FIG. 19 illustrates inductor assembly interlocking-sections 304 configured in length in primary volume 302.

FIG. 20 illustrates inductee assembly interlocking-section 366 illustrating inductor subassembly 304 configured therewithin. Said inductee assembly interlocking-section 366 includes square cross-sectioned straight wires 368 closely assembled in the width and at least one layer in the height along the length of case section 370. Said case section 370 substantially encloses inductee subassembly 366, and has magnetically permeable walls 372, one of which walls 372 has hollow-wall portion 374 with an evacuated section 376. Hollow-wall portion 374 houses square magnetically shielded two-conductor output cable section 378 terminating in negative and positive color-coded male blade connectors 380, 382. All straight wires 326 at one end of case section 370 are electrically interfaced with negative color-coded conductor plate 384 extending to negative color-coded male blade connector 386; those at other end are electrically interfaced with positive color-coded conductor plate 388 extending to positive color-coded male blade connector 390. Said negative and positive male blade connectors 388, 390 extend through evacuated section 376 to interface with one of negative FFF female color-coded blade connectors 391 and positive FFF female color-coded blade connectors 392, which are also housed in aforesaid hollow-wall portion 374. The other two FF negative and positive color-coded female blade connectors interface with aforesaid negative and positive male blade connectors 380, 382 of aforesaid two-conductor output cable section 378. In this manner, a parallel electrical circuit is established for all said straight wires 326 of all inductee assembly interlocking sections 366. Insulator plate 393 clips into both aforesaid negative and positive color-coded conductor plates 384, 388 by means of cooperating projections 394 on both sides of said negative and positive color-coded conductor plates 384, 388 as well as depressions 395 on both sides of aforesaid insulator plates 393 into which said cooperating projections 394 are force-fit. Insulator plates 393 both separate conductor plates 384, 388 at each end of aforesaid inductee assembly interlocking sections 366 and enable a number of inductee assembly interlocking-sections 366 to be configured in a lengthwise manner in secondary volume 364. In such a configuration, all like color-coded negative and positive conductor plates 384, 388 face the same direction. Sensor cabling (not shown) may be included in aforesaid hollow-wall portion 374.

FIG. 21 illustrates hollow-wall portion 374 illustrating, in addition to some of the same elements of FIG. 21, negative and positive color-coded male blade connectors 380, 382 that terminate two-conductor cable section 378. Hollow-wall portion 374 has evacuated section 376 into which extend negative and positive male blade connectors 386, 390. Said blade connectors 386, 390 interface with respective FFF female color-coded blade connectors 391, 392, with which also interface aforesaid negative and positive male blade connectors 380, 382 of aforesaid two-conductor cable section 378.

FIG. 22 illustrates inductee assembly interlocking-section 366 along the line 22-22 of FIG. 20 illustrating, in addition to those elements of FIG. 20, evacuated sections 376 of hollow-wall portion 374 into which extends negative male color-coded blade connector 386 and positive color-coded male blade connector 390, and magnetically-shielded two-conductor output cable section 378 in hollow-wall portion 374.

FIG. 23 illustrates an inductor assembly interlocking-section 304 configured within an inductee assembly interlocking-section 366, particularly illustrating the non-coincident relationship of conductor plates 328, 330 of inductor assembly interlocking-section 304 with conductor plates 384, 388 of inductee assembly interlocking-section 366.

Figure 24:
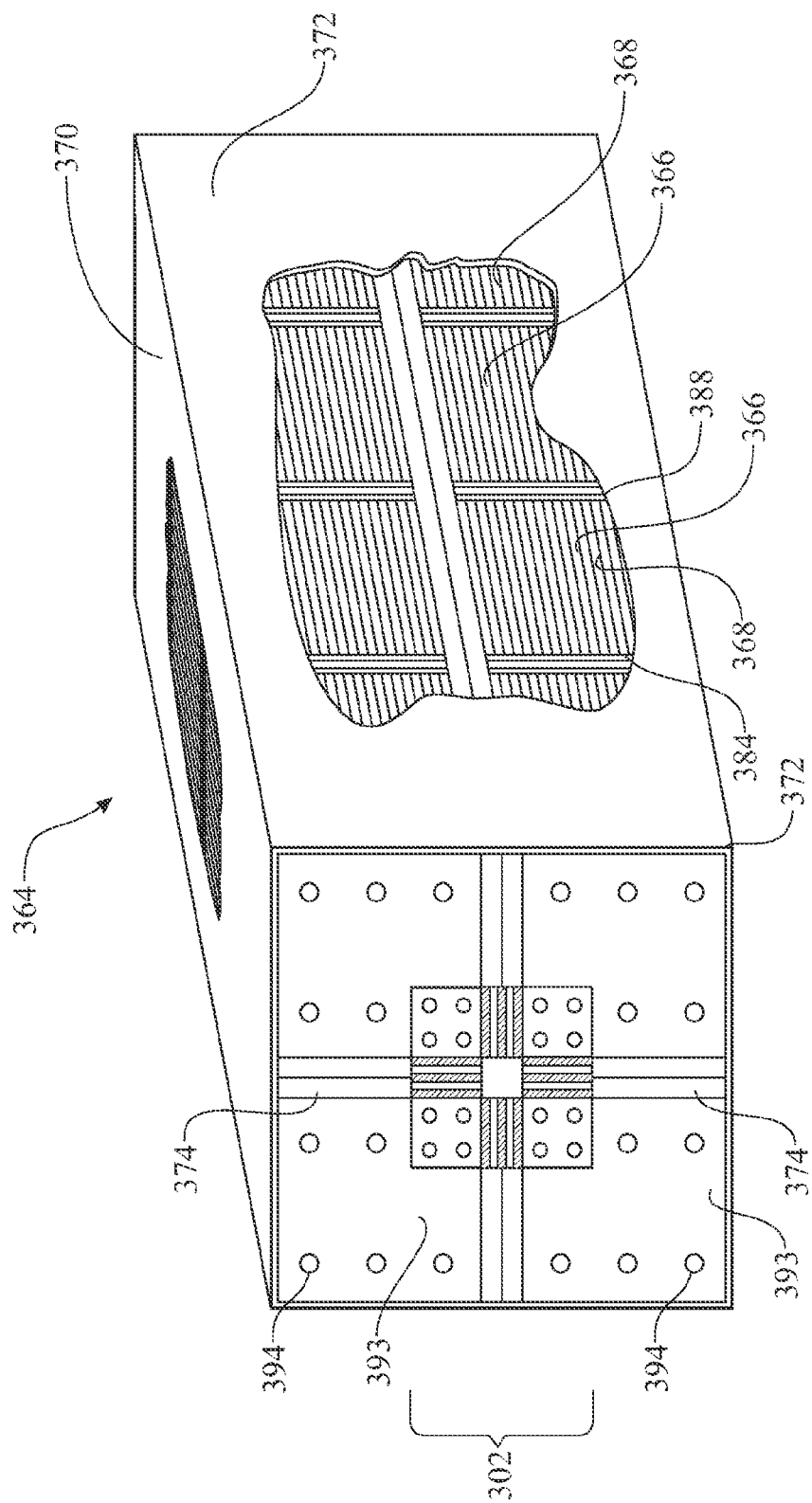
FIG. 24 presents a cut-away isometric front view illustrating a plurality of inductee assembly interlocking-sections configured end-to-end, forming a secondary volume of a parallelepiped generator variant surrounding the primary volume.

FIG. 24 illustrates a number of inductee assembly interlocking-sections 366 configured end-to-end, forming secondary volume 364 of parallelepiped generator variant 300.

Figure 25:
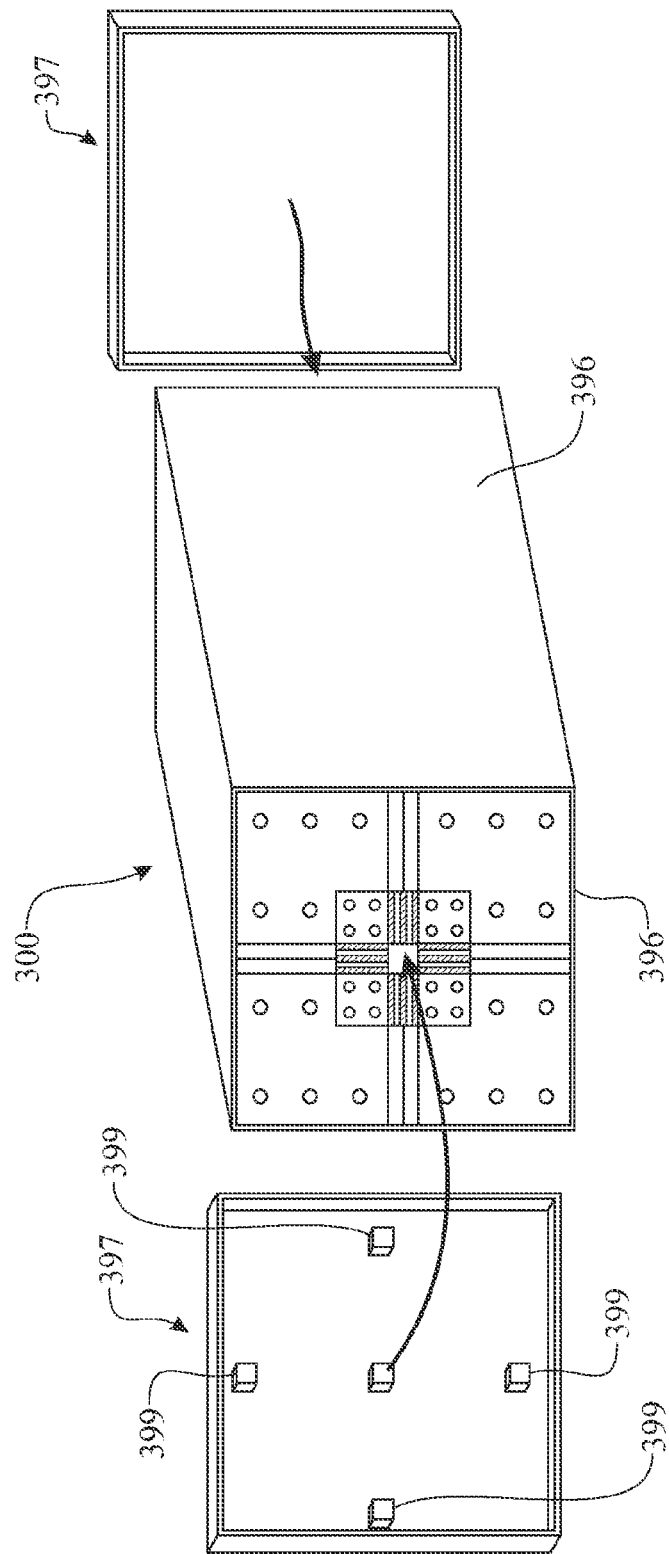
FIG. 25 presents an exploded isometric view of the parallelepiped generator embodiment, illustrating assembly of a pair of end caps.

FIG. 25 illustrates inductor assembly interlocking-sections 304 forming primary volume 302 configured within inductee assembly interlocking-sections 366 forming secondary volume 364. Magnetically impermeable outer casing 396 encloses said secondary volume 364, with end caps 397 completing the enclosure at both ends, thus forming parallelepiped generator variant 300. The object of outer casing 396 is also to concentrate the concentric circles of the moving magnetic field that has traversed the wires of the at least one inductee such that they do not escape to the exterior of the case, as well as to protect the device from external magnetic fields. One end cap 397 provides power-input terminal 398 from control module (not shown) to color-coded magnetically-shielded two-conductor cable section 360 of parallel circuit of inductor assembly interlocking-sections 304, as well as providing power output terminal 399 for color-coded magnetically-shielded two-conductor cable section 378 of parallel circuit of inductee assembly interlocking-sections 366, which is the power output of or parallelepiped generator variant 300.

FIG. 26 illustrates a flat electricity generator variant 400, showing one inductor 402 and two inductees 404, configured in such manner that the said two inductees 404 enclose said inductor 402. Inductor 402 includes straight wires 406 as well as negative conductor plate 410 and positive conductor plate 412 which interface with said straight wires 406, also providing a parallel circuit interface for all said inductor straight wires 406 as well as a parallel circuit interface for inductors 402 of all interlocking sections 418. Inductees 404 include straight wires 408 as well as negative conductor plate 414 and positive conductor plate 416 which interface with said straight wires 408, also providing a parallel circuit interface for all said inductee straight wires 408 as well as a parallel circuit interface for inductees 404 of all interlocking sections 418. Insulator plate 420 separates the aforesaid positive and negative conductor plates 412, 410, 416, 414 of each interlocking section 418. Magnetically permeable core 422 is configured between inductor 402 and inductee 404. Magnetically impermeable case 428 having hollow walls 430 enclose the device on all sides. The object of magnetically impermeable case 428 is to concentrate the concentric circles of the moving magnetic field that has traversed the wires of the at least one inductee such that they do not escape to the exterior of the case, as well as to protect the device from external magnetic fields. Hollow walls allow passage of wiring (not shown) for inductors 402 and inductees 404, and cabling (not shown) for parallel circuits. Insulator plate 420 and conductor plates 410, 412, 414, 416 include cooperating projections and depressions (not shown, similar to 544, 546 of terminal-disc 538 of cylindrical electricity generator variant 500), allowing the aforesaid interlocking sections 418 to clip there with, forming a long flat generator variant 400.

FIG. 27 illustrates magnetically-permeable core 422 having at least one metal sheet 424 having a high relative permeability and low coercion, such as laminated mu-metal or sheet silicon-steel, with insulation sheets 426 between said metal sheets 424. Said metal sheets 424 preferably have a uniform grain orientation and are uniformly scribed, to reduce hysteresis loss. Insulating sheets 424 separate coincident negative conductor plates 410 and 414 of inductor 402 and inductee 404, and coincident positive conductor plates 412 and 416 of inductor 402 and inductee 404.

FIG. 28 illustrates end cap 432 having negative and positive input terminals 434, 436 for inductors 402, and negative and positive output terminals 438, 440 for inductees 404.

FIG. 29 illustrates cylindrical generator variant 500, including primary volume 502 comprising a number of solenoid inductor sections 504, and secondary volumes 506 comprising a number of interior coil inductee sections 508 configured under aforesaid solenoid inductor sections 504, and a number of external inductee sections 509 configured over aforesaid solenoid inductor section 504. A solenoid inductor section 504 preferably includes square cross-sectioned wires 512 configured between and along the length of two magnetically permeable cylinders 514. Said square cross-sectioned wires 512 are tightly wound in the same direction in many layers around and along the length of one aforesaid magnetically permeable cylinder 514 and under a second magnetically permeable cylinder 514, such that said square cross-sectioned wires 512 are configured between two aforesaid magnetically-permeable cylinders 514. An aforesaid magnetically-permeable cylinder 514 is constructed of at least one metal sheet 516 having a high relative permeability and low coercion, such as laminated mu-metal or sheet silicon-steel, with insulation sheets 518 between said metal sheets 516. Said metal sheets 516 preferably have a uniform grain orientation and are uniformly scribed, to reduce hysteresis loss. Coil inductee sections 508 include square cross-sectioned wires 512 tightly wound in the same direction in many layers below and above solenoid inductor section 504. Also shown is magnetically shielded two-conductor cable section 519 and magnetically-shielded four-conductor cable section 520 housed in hollow magnetically impermeable female hollow-core section 521, whose length generally corresponds to the width of interlocking combined assembly 510.

FIG. 30 illustrates some of the components of FIG. 29, and particularly solenoid inductor 504, interior and exterior coil inductees 508, 509, as well as magnetically permeable cylinder 514 and four-conductor cable section 520.

FIG. 31 illustrates a portion of magnetically permeable cylinder 514, constructed of at least one metal sheet 516 having a high relative permeability and low coercion, such as laminated mu-metal or sheet silicon-steel, with insulation sheets 518 between metal sheets 516.

FIG. 32 illustrates the front side, the "assembly side" of terminal-disc 538 of cylindrical electricity generator variant 500, showing terminal-disc opening 540, arcuate terminal-disc perforations 542, projections 544 and depressions 546, and channels 548.

FIG. 33 illustrates two female hollow-core sections 521 housing two-conductor cable 519 and four-conductor cable section 520. Said two-conductor cable 519 has negative and positive color-coded power input connectors 522, 524 for the parallel circuits of the solenoid inductors 504. Four-conductor cable section 520 has four male blade connectors on each end of said sections 520, two are negative and positive color-coded output connectors 526, 527 for the parallel circuits of the internal coil inductees 508 and the other two are negative and positive color-coded output connectors 528, 529 for the parallel circuits of the external coil inductees 509. The said female hollow-core sections 521 are connected by male hollow-core connector 550 having opening 552, through which pass aforesaid blade connectors.

FIG. 34 illustrates male hollow-core connector 550 of cylindrical electricity generator variant 500, illustrating the four FFF female blade connectors on each side of opening 552, negative color-coded FFF female blade power connector 530 and positive color-coded FFF female blade power connector 532; negative color-coded FFF female blade output connector 534 positive color-coded FFF female blade output connector 536. Female FFF power connectors 530, 532, 534, 536 enable the completion of electrical interfaces with negative and positive power leads 554, 556 to solenoid inductors 504 and negative and positive output leads 558, 560 from interior and exterior coil inductees 508, 509 and with male blade connectors 530, 532, 534, 536 (of cable sections 520 of FIG. 29), enabling the parallel circuitry of all solenoid inductors 504 and coil inductees 508, 509 of all interlocking combined assembly sections 510.

Figure 35:
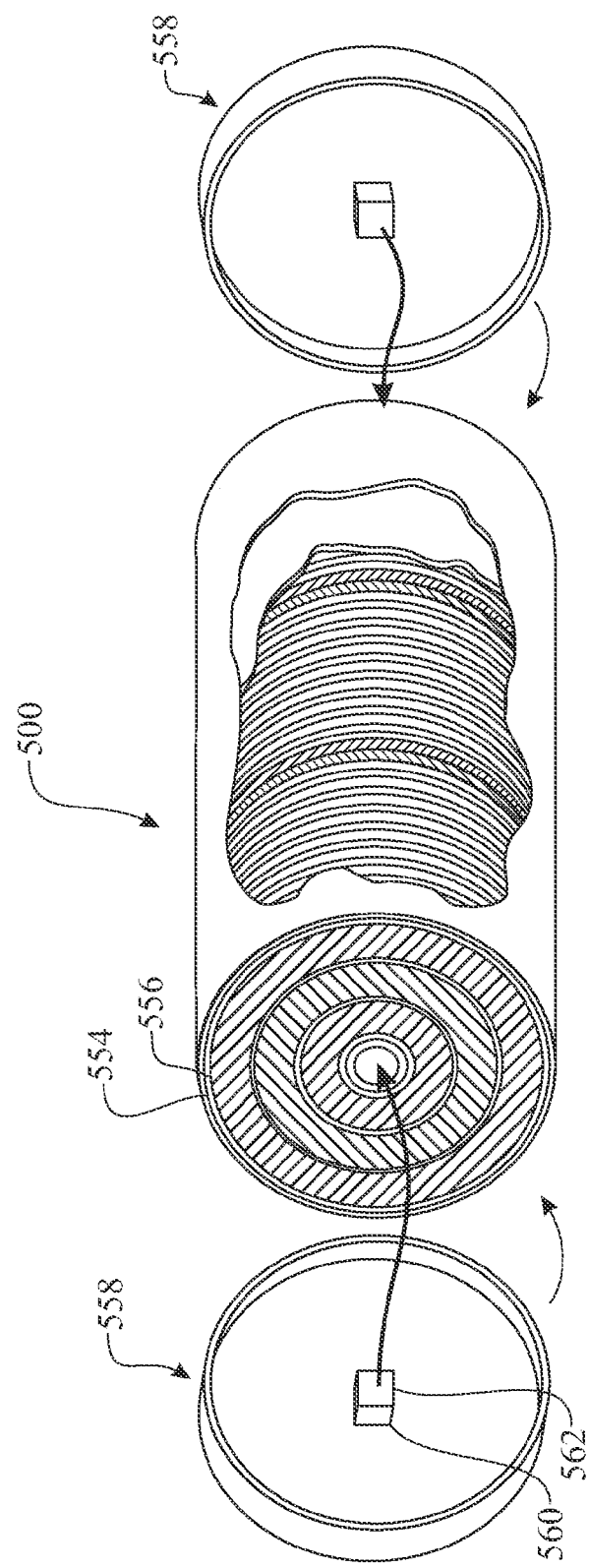
FIG. 35 presents an exploded isometric view of the cylindrical electricity generator embodiment originally introduced in FIG. 29, illustrating assembly of a pair of end caps.

FIG. 35 illustrates a cylindrical electricity generator variant 500 showing circumferential magnetically impermeable outer casing 554 having magnetically impermeable lining 556 enclosing generator variant 500. The object of magnetically impermeable outer casing 554 and magnetically impermeable lining 556 is to concentrate the concentric circles of the moving magnetic field that has traversed the wires of the at least one inductee such that they do not escape to the exterior of the case, as well as to protect the device from external magnetic fields. End caps 558 complete the closure at both ends thereof. One end cap 558 includes power input terminal 560 and power output terminal 562.

Figure 36:
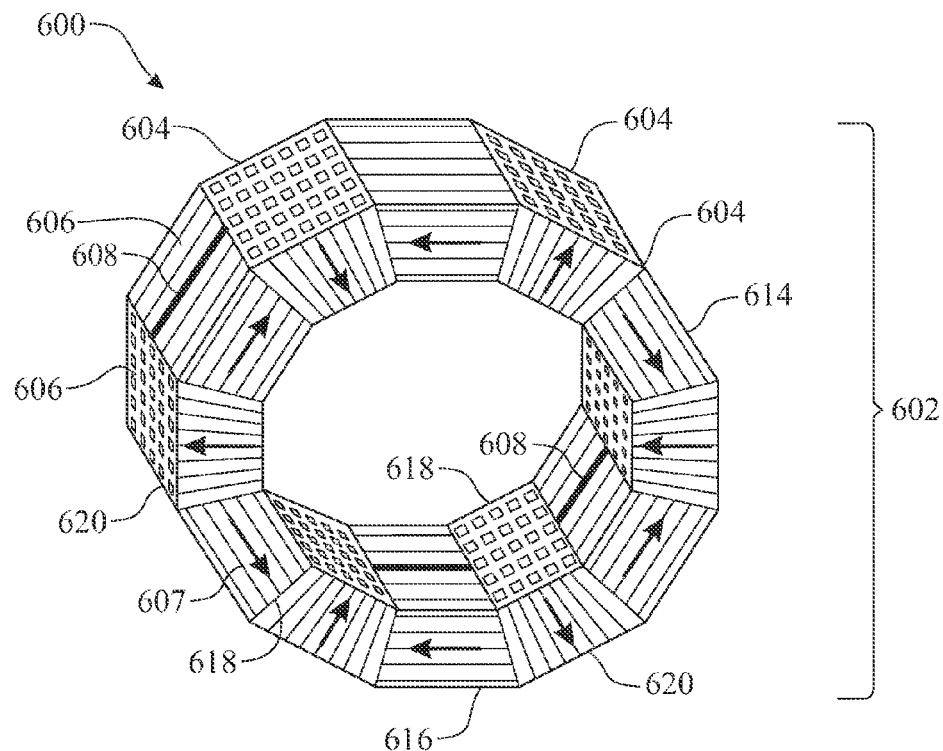
FIG. 36 presents an isometric view of an exemplary embodiment of a straight-wire parallelepiped electromagnetic Halbach Array.

FIG. 36 illustrates toroidal electromagnetic Halbach Array 600, comprised of at least one concentric ring 602 of magnetic subassemblies 604, all of which are of the same dimension, and each of which is, in effect, an electromagnetic device disclosed herein-before. Square cross-sectioned straight wires 606 are closely assembled in the height, width and length of said magnetic subassemblies 604, said straight wires 606 having the orientation indicated by arrows 607, said orientation being a property of a Halbach Array. Each said magnetic subassemblies 604 preferably has the same form-factor such that, whatever the orientation of straight wires 606 in rigid magnetically impermeable case 614, the number of wires and their length, and thus the strength of their magnetic field, is the same, forming a coherent magnetic field on one side of toroidal Halbach-Array 600. Magnetic subassemblies 604 are housed in rigid magnetically impermeable case 614 such that straight wires 606 of each magnetic subassembly 604 are aligned in a specific manner such that (1) the straight wires 606 of a magnetic subassembly 604 may not be parallel to the straight wires 606 of an adjacent magnetic subassembly 604 of the same ring 602 (but may be parallel to the straight wires 606 of an adjacent magnetic subassembly 604 of an adjacent ring 602 if the configuration comprises more than one ring 602) and; (2) when a Pulsed DC current flows through the wires of the said magnetic subassemblies 604, their polarities are those shown by arrows 607 in the figure, such that the magnetic field remains concentrated on the desired side of the device. Magnetically permeable core 608 is constructed of at least one metal sheet 610 having a high relative permeability and low coercion, such as laminated mu-metal or sheet silicon-steel, with insulation sheets 612 between said metal sheets 610. Said metal sheets 610 preferably have a uniform grain orientation and are uniformly scribed, to reduce hysteresis loss. On one end of each said array subassembly 604 is situated negative conductor plate 618 and positive conductor plate 620 is situated on the other end. Said conductor plates 618, 620 are preferably fabricated of a material being a good conductor of electricity such as copper, and provide a parallel electrical interface for said straight wires 606 of each said magnetic subassembly 604 as well as providing a parallel electrical interface for all said magnetic subassemblies 604 of said toroidal electromagnetic Halbach Array 600. Magnetically impermeable case 614 having hollow wall 616 encloses each said magnetic subassembly 604. The objects of said magnetically impermeable case 614 are: to concentrate the magnetic field that is created in and around said straight wires 606 of each said magnetic subassembly 604 when a current flows in the said wires 606; to contain and to restrain the said magnetic subassemblies 604 from movement caused by the non-complementary magnetic field of an adjacent magnetic subassembly 604. Hollow walls 616 allow passage of wiring and cabling (not shown).

Figure 37:
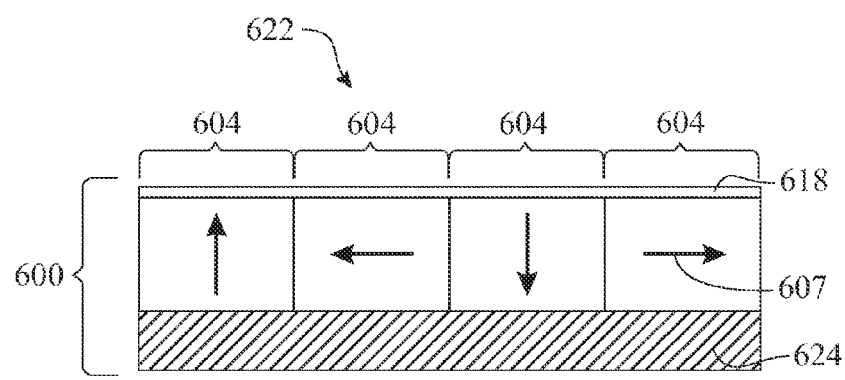
FIG. 37 presents a side elevation view of the straight-wire parallelepiped electromagnetic Halbach Array electromagnet originally introduced in FIG. 36.

FIG. 37 illustrates electromagnetic Halbach Array electromagnet 622 comprising a toroidal Halbach Array 600 having a magnetically permeable plate 624 configured directly adjacent the toroidal array 600, on the side of concentration of its magnetic field. The object of magnetically permeable plate 624 is to protect the ### from damage when the said electromagnet 622 is operating. Plate 624 obviously becomes an electromagnet when current flows through the wires 606 of magnetic subassemblies 604 of Toroidal Halbach-Array 600. Electrical interfaces for the parallel electrical circuit of all magnetic subassemblies 604 housed in hollow-wall 816, are not shown. When a Pulsed DC current flows through the wires of the said magnetic subassemblies 604, their polarities are those shown by arrows 607 in the figure, such that the magnetic field remains concentrated on the desired side of the device.

FIG. 38 illustrates parallelepiped electromagnetic Halbach-Array 700 having square-sectioned sharp-edged coasted straight wires 702 closely assembled in the width and at least one layer in the height along the length of each of a number of array subassembly 704 which is, in effect, an electromagnetic device disclosed herein-before. Each said array subassembly 704 is enclosed in magnetically impermeable compartmental case 712 having a hollow wall 714. On one end of each said array subassembly 704 is situated negative conductor plate 716 and positive conductor plate 718 is situated on the other end. Said conductor plates 716, 718 are preferably fabricated of a material being a good conductor of electricity such as copper, and provide a parallel electrical interface for said straight wires 702 of each array subassembly 704 as well as a parallel electrical interface for all said array subassembly 704. Negative color-coded power lead 720 and positive color-coded power lead 722 of magnetically-shielded two-conductor color-coded power cable sections 724 housed in hollow wall 714 and other electrical interfaces (not shown) provide a parallel circuit for all array subassemblies 704. When a Pulsed DC current flows through the wires of the said magnetic array subassemblies 704, their polarities are those shown by arrows 726 in the figure, such that the magnetic field remains concentrated on the desired side of the device. Each said array subassembly 704 preferably has the same form-factor such that, whatever the orientation of straight wires 702 in compartmental case 712, the number of wires and their length, and thus the strength of their magnetic field, is the same, forming a coherent magnetic field on the side of parallelepiped electromagnetic Halbach Array 700.

FIG. 39 illustrates array subassemblies 704 of parallelepiped electromagnetic Halbach-Array 700 in magnetically impermeable compartmental case 712. Each said array subassembly 704 includes magnetically permeable core 706, as well as negative conductor plate 716 and positive conductor plate 718.

FIG. 40 illustrates magnetically impermeable compartmental case 712 of parallelepiped electromagnetic Halbach-Array 700 along the lines 39-39 of FIG. 39. Magnetically impermeable compartmental case 712 also includes hollow wall 714, into which negative power lead 720 and positive power lead 722 from negative conductor plate 716 and positive conductor plate 718 are fed. Magnetically permeable core 706 includes more than one metal sheet 708 having a high relative permeability and low coercion, such as laminated mu-metal or sheet silicon-steel, with insulation sheets 710 between metal sheets 708. Said metal sheets 708 preferably have a uniform grain orientation and are uniformly scribed, to reduce hysteresis loss.

Figure 41:
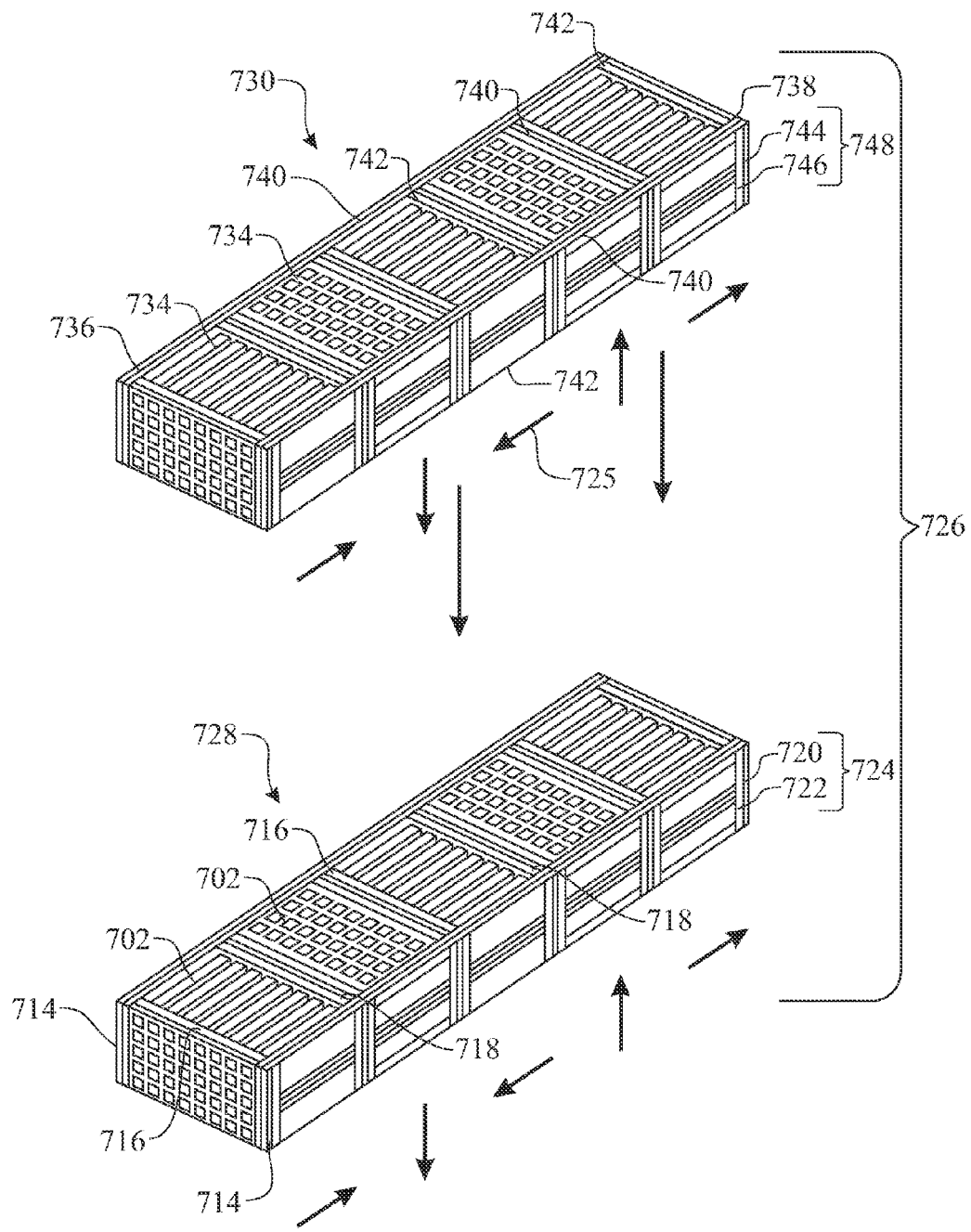
FIG. 41 presents an isometric exploded assembly view of the straight-wire parallelepiped electromagnetic Halbach-Array Induction device originally introduced in FIG. 36, illustrating both the inductors and inductees.

FIG. 41 illustrates electromagnetic Halbach-Array Induction device 726 of which inductor assembly 728 on the bottom of the figure is the Halbach Array 700 of FIG. 38 and having the same numbering sequence. Inductee assembly 730 is also a Halbach Array including magnetically impermeable compartmental-case 736 including hollow wall 738 and having individual inductees 732. Each said inductor subassembly 728 includes negative conductor plate 740 and positive conductor plate 742 providing parallel electrical interface for square cross-sectioned straight wires 734. Hollow wall 738 houses two-conductor output cable 748 having negative power lead 744 and positive power lead 746 and other electrical interfaces (not shown), providing a parallel electrical circuit for all inductee subassemblies 730. When a Pulsed DC current flows through the wires of the said inductor assemblies 728, their polarities are those shown by arrows 725 in the figure, such that the magnetic field remains concentrated on the desired side of the device. Inductee assemblies 730 are inductively coupled with said inductor assemblies 728, and thus have the polarities of said inductor assemblies 728. As induction device 726, inductee assembly 730 is positioned proximate to inductor assembly 728. Each said inductor assembly 728 preferably has the same form-factor such that, whatever the orientation of straight wires 702 in compartmental case 712, the number of wires and their length, and thus the strength of their magnetic field, is the same, forming a coherent magnetic field on the side of inductor assemblies 728 facing inductee assembly 730 and individual inductees 734.

Figure 42:
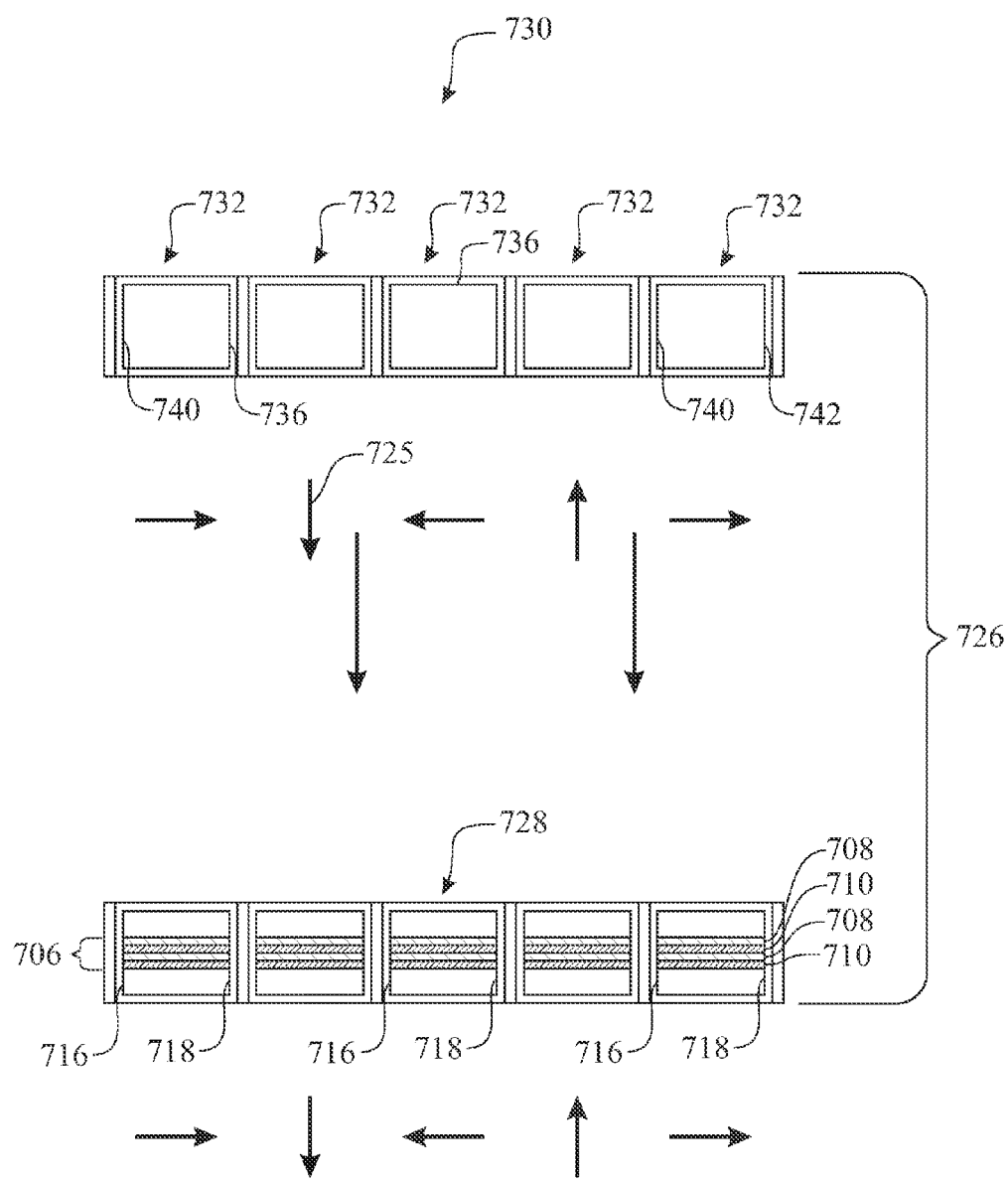
FIG. 42 presents an exploded assembly side view of a straight-wire parallelepiped electromagnetic Halbach-Array Induction device originally introduced in FIG. 36, illustrating both the inductors and inductees.

FIG. 42 illustrates straight-wire parallelepiped electromagnetic Halbach-Array Induction device 726 of which inductor assembly 728 on the bottom of the figure is the Halbach Array 700 of FIGS. 38 and 41, having the same numbering sequence. Inductee assembly 730 is also a Halbach Array having individual inductees 730 including magnetically impermeable compartmental-case 736. Each said inductee subassembly 730 includes negative conductor plate 740 and positive conductor plate 742. When a Pulsed DC current flows through the wires of the said inductor assemblies 728, their polarities are those shown by the arrows in the figure, such that the magnetic field remains concentrated on the desired side of the device. Inductee assemblies 730 are inductively coupled with said inductor assemblies 728, and thus have the polarities of said inductor assemblies 728. As induction device 726, inductee assembly 730 is positioned proximate to inductor assembly 728.

Figure 43:
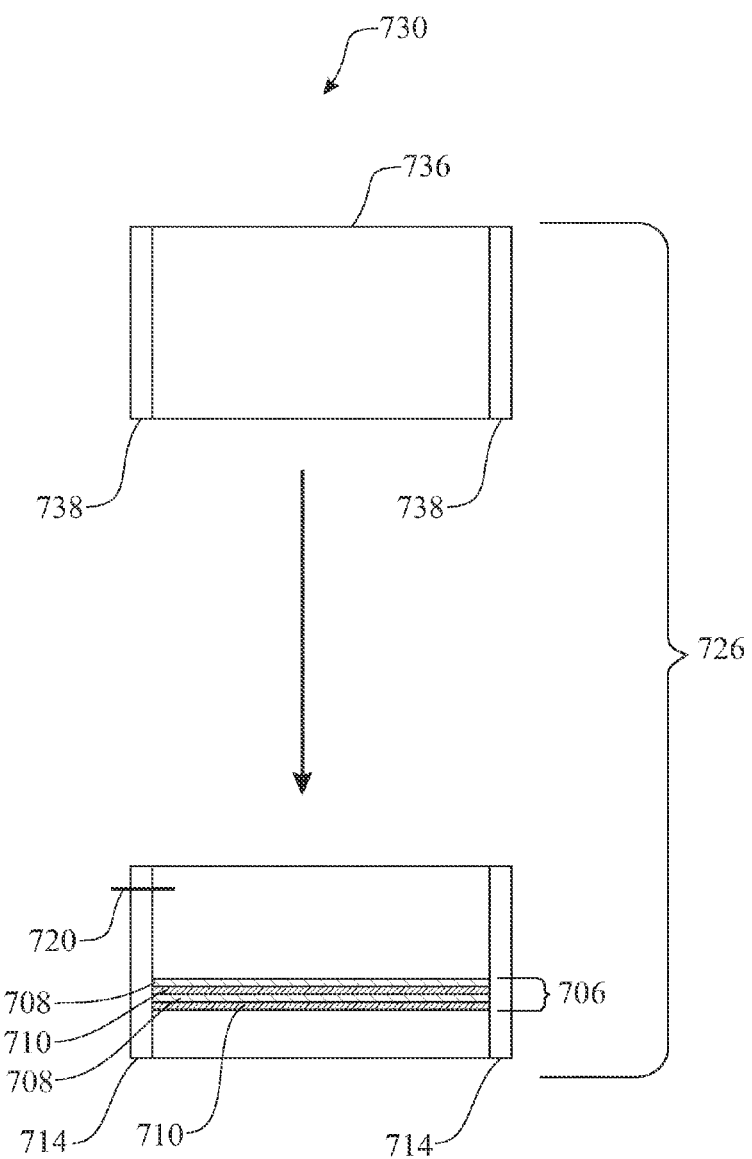
FIG. 43 presents an exploded assembly end view of the straight-wire parallelepiped electromagnetic Halbach-Array Induction device originally introduced in FIG. 36, illustrating both the inductors and inductees.

FIG. 43 illustrates straight-wire parallelepiped electromagnetic Halbach-Array Induction device 726 of FIG. 42, along the line 42-42. Inductor assembly 728 is the Halbach Array 700 of FIGS. 38 and 41, having the same numbering sequence. Inductee assembly 730 is also a Halbach Array having individual inductees 730 including magnetically impermeable compartmental-case 736 having hollow wall 738, in which is housed two-conductor cable 748. As induction device 726, inductee assembly 730 is positioned proximate to inductor assembly 728.

Figure 44:
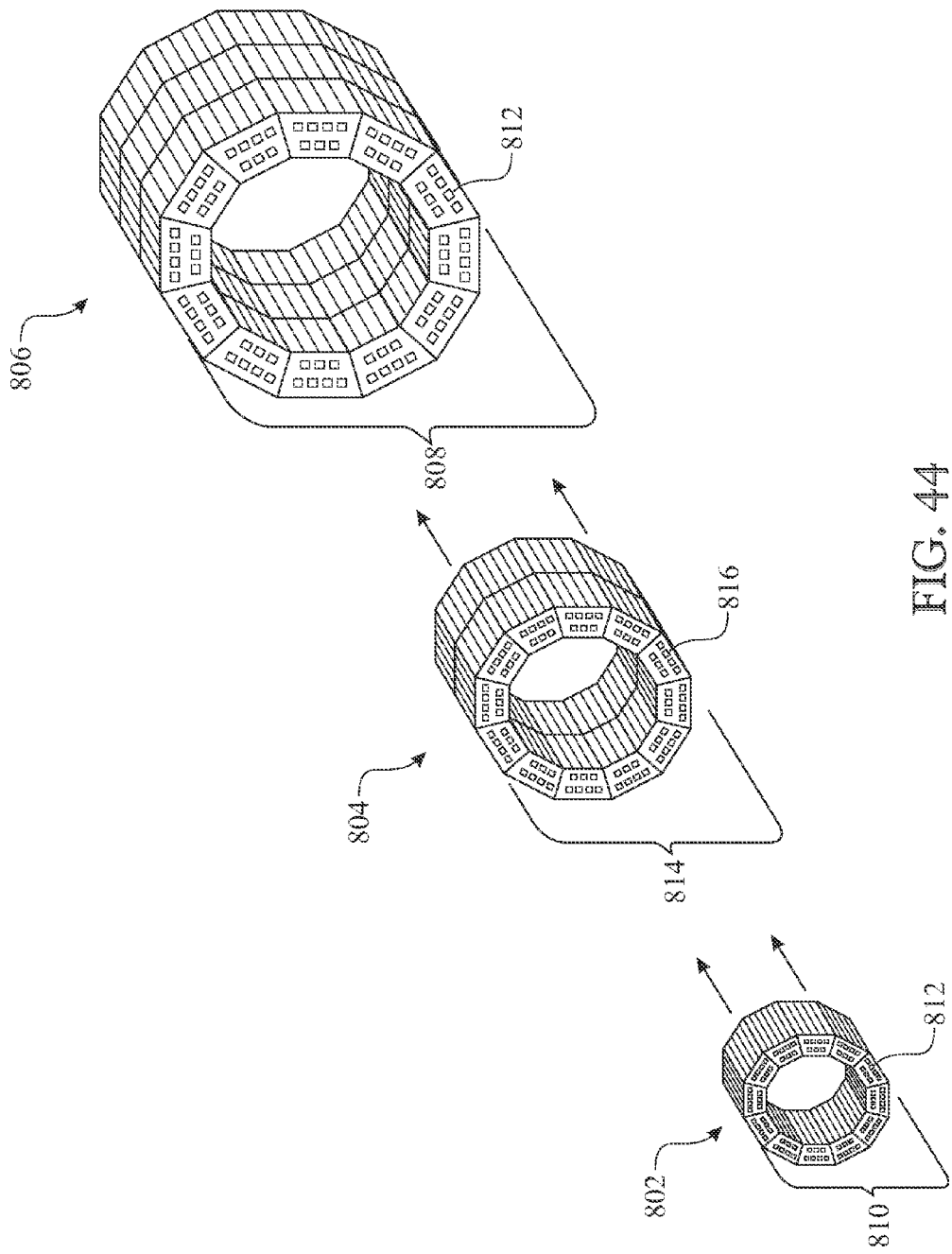
FIG. 44 presents an isometric exploded assembly view of an exemplary embodiment of a Toroidal Electricity Generator.

FIG. 44 illustrates Toroidal Electricity Generator Variant 800, which includes a number of internal toroidal inductees 802 configured in internal secondary volumes 804, and a number of external toroidal inductees 806 configured in external secondary volume 808 which surround toroidal inductor 810. Each said toroidal inductee 802, 806 includes inductee square-sectioned sharp-edged coated straight wires 812 closely assembled in the width and at least one layer in the height along the length of each said toroidal inductee 802, 806, and in such manner that (1) at least one straight wire 812 of at least one layer of a said toroidal inductees 802, 806 is parallel to at least one straight wire 812 of at least one other layer of the said toroidal inductees 802, 806, and that (2) preferably all said straight wires 812 are mutually parallel. Toroidal inductees 802, 806 are, in effect, the electromagnetic device disclosed hereinbefore. Between said toroidal inductees 802 and 806 are configured a number of toroidal inductors 810 in primary volume 814. Each said toroidal inductor 810 includes inductor square-sectioned sharp-edged coated straight wires 816 closely assembled in the width and at least one layer in the height along the length of each said toroidal inductor 810, and in such manner that (1) at least one straight wire 816 of at least one layer of a said toroidal inductor 810 is parallel to at least one straight wire 816 of at least one other layer of said toroidal inductor 810 and that (2) preferably all said straight wires 812 are mutually parallel, as well as being parallel to aforesaid inductee square-sectioned sharp-edged coated straight wires 812 of toroidal inductees 802, 806.

Figure 45:
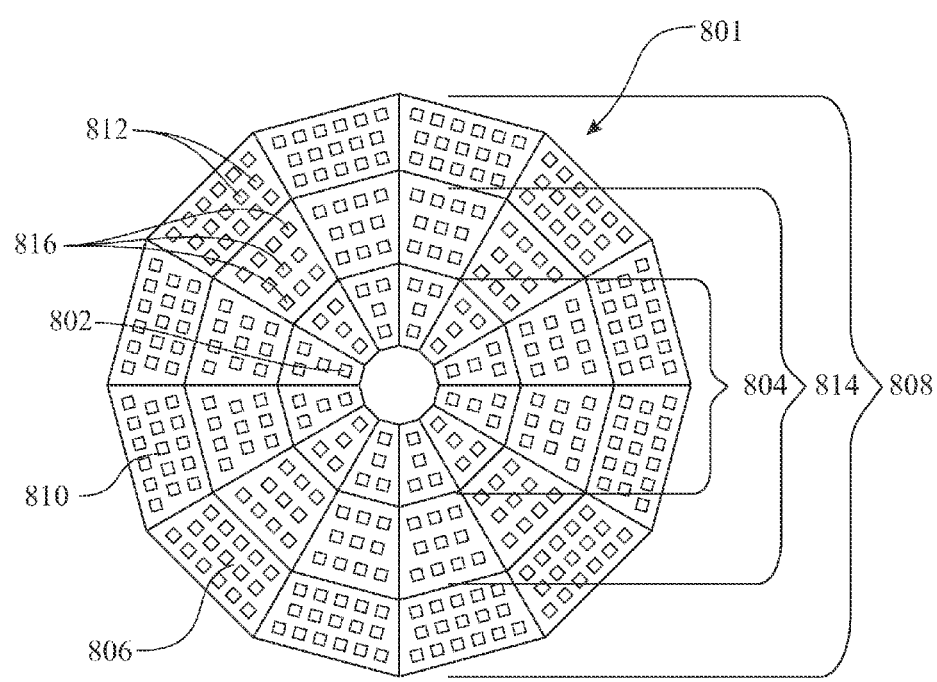
FIG. 45 presents a frontal view of a toroidal ring of the Toroidal Electricity Generator originally introduced in FIG. 44.

FIG. 45 illustrates interlocking toroidal ring 801 a number of which are included in Toroidal Electricity Generator Variant 800. Interlocking toroidal ring 801 comprises a number of internal toroidal inductees 802 of internal secondary volume 804 concentrically nested in toroidal inductors 810 of primary volume 814, both of which are concentrically nested in external toroidal inductees 806 of external secondary volume 808.

Figure 46:
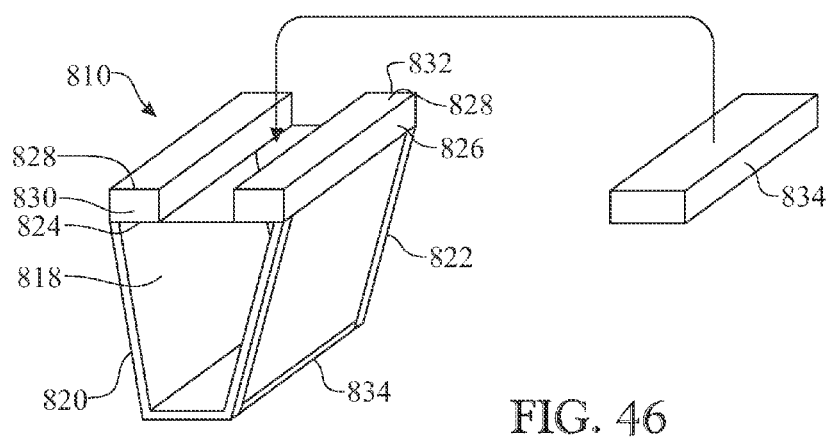
FIG. 46 presents an isometric exploded assembly view of a toroidal inductor that is utilized within the Toroidal Electricity Generator originally introduced in FIG. 44.

FIG. 46 illustrates details of a toroidal inductor 810 housed in magnetically impermeable inductor case 818 on one end of which is situated negative inductor conductor plate 820 and positive inductor conductor plate 822 situated on the other end. Said inductor conductor plates 820, 822 are preferably fabricated of a material being a good conductor of electricity such as copper, and provide a parallel electrical interface for all said straight wires 816 of each toroidal inductor 810 as well as a parallel electrical interface for all toroidal inductors 810. Negative and positive inductor blade extensions 824, 826 project from aforesaid inductor negative and positive inductor conductor plates 820, 822 into longitudinal hollow case channels 828 of magnetically impermeable case 818. Said longitudinal hollow case channels 828 include negative inductor connector band 830 and positive inductor connector band 832 with which aforesaid negative and positive inductor blade extensions 824 and 826 interface physically and electrically, and which provide a parallel electrical circuit for all toroidal inductors 810.

FIG. 47 illustrates details of magnetically permeable core 834, which serve respectively as top and bottom of aforesaid toroidal inductor 810. Magnetically permeable cores 834 include at least one metal sheet 836 having a high relative permeability and low coercion, such as laminated mu-metal or sheet silicon-steel, and at least one insulation sheet 838. Said metal sheets 836 preferably have a uniform grain orientation and are uniformly scribed, to reduce hysteresis loss.

FIG. 48 illustrates details of external toroidal inductee 806 housed in magnetically impermeable external inductee case 840, on one end of which situated negative internal inductee conductor plate 842 and positive internal inductee conductor plate 844 is situated on the other end. Said inductee conductor plates 842, 844 are preferably fabricated of a material being a good conductor of electricity such as copper, and provide a parallel electrical interface for all aforesaid straight wires 816 of external toroidal inductee 806 as well as providing a parallel electrical interface for all external toroidal inductees 806. Negative and positive external inductee blade extensions 846, 848 project from aforesaid negative and positive inductee conductor plates 842, 844 into longitudinal hollow case channels 850 of magnetically impermeable external inductor case 840. Said longitudinal hollow case channels 850 include negative and positive external inductee connector bands 852, 854 with which aforesaid negative and positive external inductee blade extensions 846, 848 physically and electrically interface, providing a parallel electrical interface for all toroidal external inductees 806.

FIG. 49 illustrates details of internal toroidal inductee 802 housed in magnetically impermeable internal inductee case 856, on one end of which is situated negative internal inductee plate 858 and positive internal inductee conductor plate 860 is situated on the other end. Said inductee conductor plates 858, 860 are preferably fabricated of a material being a good conductor of electricity such as copper, and provide a parallel electrical interface for all aforesaid straight wires 816 of internal toroidal inductee 802 as well as providing a parallel electrical interface for all internal toroidal inductees 802.

Negative and positive internal inductee blade extensions 862, 864 project from aforesaid negative and positive internal inductee conductor plates 858, 860 into longitudinal hollow case channels 866 of magnetically impermeable internal inductor case 856. Said longitudinal hollow case channels 866 include negative and positive external inductee connector bands 868, 870 with which aforesaid negative and positive external inductee blade extensions 862, 864 physically and electrically interface, providing a parallel electrical interface for all toroidal internal inductees 802.

Figure 50:
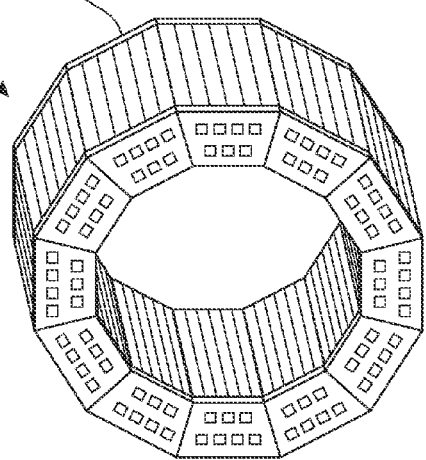
FIG. 50 presents an isometric view of a toroidal ring that is utilized within the Toroidal Electricity Generator originally introduced in FIG. 44.

FIG. 50 illustrates interlocking toroidal ring 801. Said rings 851 interlock with its adjacent interlocking toroidal rings 851 by means of projections and depressions (not shown, but similar to those shown in FIG. 32) configured on connector plate 872 which attaches to sides of aforesaid magnetically impermeable cases 818, 840 and 856 by means of projections and depressions (not shown, but similar to those shown in FIG. 32). Said connector plate 872 has appropriate openings (not shown) for the passage of female blade connectors (not shown). Said female blade connectors interface physically and electrically with aforesaid connector bands 830, 832 and 852, 854, as well as 862, 864 of adjacent interlocking toroidal ring 851.

Figure 51:
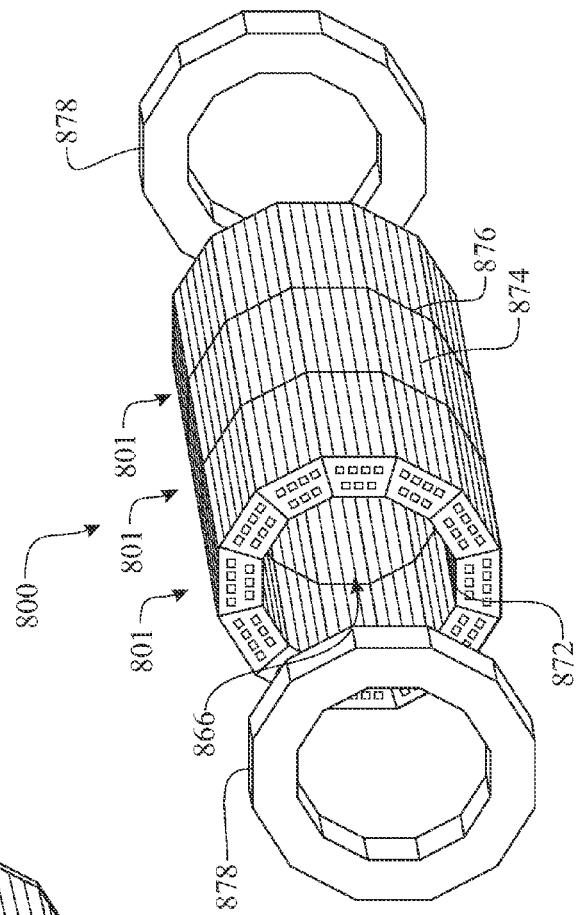
FIG. 51 presents an exploded isometric view of the Toroidal Electricity Generator originally introduced in FIG. 44, illustrating assembly of a pair of end caps Like reference numerals refer to like parts throughout the various views of the drawings.

FIG. 51 illustrates Toroidal Electricity Generator 800 configured in its magnetically impermeable outer case 874 having magnetically impermeable lining 876. Said outer case 874 is preferably fabricated of plastic; if it is metal, it is preferably grounded. The objects of the magnetic impermeability of said outer case 874 and said lining 876 are to concentrate the magnetic field that has traversed the wires of the external inductee 806, preventing it from exiting Toroidal Electricity Generator 800 and thus being wasted, as well as to prevent external magnetic fields from penetrating Toroidal Electricity Generator 800. Magnetically impermeable end caps 878 are configured at each end of Toroidal Electricity Generator 800, one of which includes negative and positive inductor input terminal 880,882 and the other with includes negative and positive inductee output terminals 884, 886.

The above descriptions are considered that of preferred embodiments only. Modifications of the disclosures will occur to those skilled in the art and to those who make or use the disclosures. Therefore, it is understood that the embodiments and variants shown in the drawings and described above are merely for illustrative purposes, not to scale, and are not intended to limit the scope of the disclosures, which are defined by the following claims as interpreted according to the principles of patent law, including the doctrine of equivalents.

Preferred and Non-Preferred Embodiments

A non-preferred embodiment of a generator is one in which the secondary volume(s) are only situated within the primary volume. If it were composed of inductors and inductees having straight wires, the primary volume would be comprised of "electromagnetic Halbach-Array Induction Devices" as inductors, and the magnetic field of the primary volumes would thus be concentrated in its interior where the secondary volumes would be configured. While this configuration would provide the concentration of inductor's magnetic field inside the perimeter of the primary volume, it would necessarily mean that the area of the wires of the inductees in the secondary volume would be inferior to those of the primary volume; this is the opposite of what is desirable. It also means that the magnetic field traversing the secondary volume would not be totally coherent in terms of an inducing field, which is the opposite of what is desired.

Another non-preferred embodiment of a generator is one in which a portion of the current generated, or part of the initial pulse(s) of current to the wires of the primary volume, were utilized to create a motion, such as the vibratory movement of the type found in cell phones. While this would generate electricity, it would require energy to create and sustain that motion while being less effective as a generator that the embodiments having no moving parts disclosed herein, defeating some of its objectives, and eliminating some of the advantages described herein-before.

Calculations for a Nominal Electricity Generator

Dimensions of Generator

The generator has 10 interlocking inductor and inductee sections. The overall dimension of the nominal generator is approximately H4.5 cm×W4.5 cm×L35 cm, not including the casing=708 cm3 (43 In3), not including the automobile battery or computerized control module.

Inductors

The inductors are in a parallel circuit comprised of 1000 lengths of wire, the ampacity of which is 64-73 amps. Each inductor interlocking section has a common permeable core of laminated sheets.

Inductees

The inductee interlocking sections are in parallel circuit, comprised of 11040 lengths of wire.

Current Supply from Battery to Inductor's Parallel Circuit

For the first cycle of AC to the inductor's parallel circuit, the 24 v 550-amp DC automobile battery's power is transformed into 240 v 55 amp AC (13.2 Kva), and regulated to the desired frequency. Thereafter, the feedback circuit from the control module supplies the AC current at that frequency from one part of the output cycle. The inductor's input may be a DC pulse (PDC), in which case the output is Full Wave DC (FWDC).

Induced Voltage $V_s=N_s/N_p$ (Fp).=11040/1000 (Fp)=11.04 (Fp). At 400 Hz AC inducing current, the induced voltage=4416 volts; at 800 Hz=8832 volts; at 3 KHz=33.12K volts; at 6 KHz=66.24K volts; at 60 KHz=662.4K volts; at 600 KHz=6,624K volts; at 780 KHz=8,611.2K volts.

Induced Current $I_s=N_p/N_s$ (Ip)=1000/11040 (55)=4.98 amps (Note: while larger units could have larger cross-sectioned wires, capable of higher ampacity, the amperage in the inductees will always be relatively low, because of the inverse ratio of wires).

Resistance of Circuits (R=I/V)

Inductors=55/240=0.229 ohms; Inductees=4.98/4416 volts at 400 Hz=0.00113 ohns. At higher voltages, resistance is lower. At higher frequencies, circuit resistance increases Flux(Inductor's Voltage×T[frequency]/N[number of wires in inductor]=V(T/N)

240(400/1000)=96000/1000=96 webers; at 800 Hz=192 webers; at 3 KHz=720 webers; at 6 Khz=1,440 webers; at 60 Khz=14400 webers; at 600 KHz=144,000 webers; at 780 KHz=187,200 webers.

"B" Field=Flux/A

Length of Inductors is 0.35 m, height is 0.08 m, Area=0.35×0.08=0.028=96/0.028=3428.57 webers "H" Field=I/2Pi(r)r=average distance from inductor to inductee I=55 amps, r=0.025 m 55/2(3.1416)(0.025)=350 amps/meter Net Power Output after Feedback of 13.32 Kva The net output at 400 Hz is 16.871 Kva (22.6 Hp); at 800 Hz, 33.7 Kva (45.2 Hp); at 3 KHz=128 Kva (171.5 Hp); at 6 KHz=256 Kva (343 Hp); at 60 Khz=2.560 Kva; at 600 KHz=25.60 Kva; at 780 KHz=33.254 Kva.

Generator Rating Per Hour and Observations

The cyclic output per second is multiplied by 3600 to indicate the generator's hourly rating. Thus, at 400 Hz=60.7 Kva/h; at 800 Hz=121.4 Kva/h; at 3 KHz=460.8 Kva/h; at 6 KHz=921.6 Kva/h; at 60 KHz=9.26 Mw/h; at 600 KLHz=92.166 Kw/h; at 780 KHz=119.7 Mw/h. A large home typically requires 15-20 Kva AC; an electric automobile 20-30 Kva DC. A medium-sized heliostat installation may generate 20 Mw; a large one 280 Mw. Three linked nominal generators operating at a frequency of 780 Mhz (see above) provide more power, with incomparably less investment. The simplest method to increase output of a given generator is to increase the frequency of the inductors current, as shown in the calculations above. Obviously, the output of smaller generators may be combined via a parallel circuit, thus increasing the output of the installation. Full Wave DC is the preferable output for small generators, since the apparatus to which they would supply electricity would generally be small (requiring DC at a low amperage).

In the foregoing description those skilled in the art will readily appreciate that modifications may be made to the invention without departing from the concepts disclosed herein. Such modifications are to be considered as included in the following claims, unless these claims expressly state otherwise.

What is claimed is:

1. An electromagnetic device configured to function as an electricity generator, said electromagnetic device comprising:
  an inductive subassembly forming an inductor, said inductive subassembly comprising:
    a pair of electrically conductive conductor plates provided in a spatial arrangement;
    a plurality of electrically conductive wire segments arranged having a first end of each of said plurality of electrically conductive wire segments electromechanically attached to a first conductive conductor plate of said pair of electrically conductive conductor plates and said second, opposite end of each of said plurality of electrically conductive wire segments electromechanically attached to a second conductive conductor plate of said pair of electrically conductive conductor plates and each of said plurality of electrically conductive wire segments extending linearly therebetween, wherein said linear arrangement of said plurality of wires forms a parallel circuit, said wires being arranged forming a plurality of wire planes, each wire plane having a first distal wire defining a first edge of said wire plane and a second, opposite distal wire defining a second, opposite edge of said wire plane and at least one wire being between and coplanar with said first distal wire and said second distal wire, said plurality of wire planes arranged into a plurality of layers and said plurality of wire planes are generally parallel with one another and perpendicular to a plane defined by each of said pair of electrically conductive conductor plates;
  wherein a cyclic current flows in the parallel circuit of said inductor, which generates a current flowing through each of said plurality of wire segments creating a cyclically moving magnetic field in and about each of said plurality of wires.

2. An electromagnetic device as recited in claim 1, wherein said indicative subassembly is a first subassembly, and said electromagnetic device further comprising:
  at least one second inductive subassembly comprising;
    a second plurality of electrically conductive wires forming a second parallel circuit thereof, said second plurality of electrically conductive wires being arranged forming a plurality of planes, each wire plane of said second plurality of electrically conductive wires having a first distal wire defining a first edge of said wire plane and a second, opposite distal wire defining a second, opposite edge of said wire plane and at least one wire being between and coplanar with said first distal wire and said second distal wire, said plurality of planes arranged into a plurality of layers;
  wherein a cyclic voltage differential is applied to said first plurality of electrically conductive wires;
  wherein said cyclic voltage differential generates a cyclic current flow through each of said wires of said first plurality of wires;
  wherein the said cyclic current flow creates a cyclic magnetic field in and about each of said wires of said first plurality of wires;
  wherein said frequency of said cyclic current flow in and about each of said wires of said first plurality of wires determines the frequency of the cyclic magnetic field in and about each of said wires of said first plurality of wires;
  wherein said cyclic magnetic field in and about each of said wires of said first plurality of wires traverses in a cyclic manner each of said wires of said second plurality of wires;
  wherein said traverse of said cyclic magnetic field induces a cyclic voltage in each of said wires of said second plurality of wires;
  wherein the value of said induced cyclic voltage is a function of the cyclic voltage of the current flowing in each of said wires of said first plurality of wires, the frequency of said current, and the ratio of the numeric value of the plurality of wires comprising the at least one second subassembly to that of the numeric value of the plurality of wires comprising the first subassembly;
  wherein said traverse induces a cyclic current flow in each of said wires of said second plurality of wires;
  wherein the amperage of the cyclic current induced in each of said wires of said second plurality of wires is a function of amperage of the current flowing in each of said wires of said first plurality of wires and the inverse ratio of the numeric value of said second plurality of wires to that of the numeric value of said first plurality of wires.

3. An electromagnetic device as recited in claim 1, each of said plurality of wire segments further comprising a rectangular cross section shape.

4. An electromagnetic device as recited in claim 1, further comprising at least one magnetically permeable core, said magnetically permeable core being oriented substantially planar to said plurality of planes of wires.

5. An electromagnetic device as recited in claim 4, further comprising at least one magnetically permeable metal sheet each said at least one magnetically permeable metal sheet being separated from an adjacent magnetically permeable metal sheet by an insulation sheet, wherein said metal sheets and said insulation sheets are parallel to said planes of wires.

6. An electromagnetic device as recited in claim 1, wherein said inducative subassembly is a first subassembly, and said electromagnetic device further comprising:
  a second current carrying subassembly in which said second current is induced by a magnetic field created by a current flowing through said first subassembly comprising:
    a second pair of electrically conductive conductor plates provided in a spatial arrangement;
    a second plurality of electrically conductive wire segments arranged having a first end of each of said plurality of electrically conductive wire segments electromechanically attached to a first conductive conductor plate of said pair of electrically conductive conductor plates and said second, opposite end of each of said plurality of electrically conductive wire segments electromechanically attached to a second conductive conductor plate of said pair of electrically conductive conductor plates and each of said plurality of electrically conductive wire segments extending linearly therebetween, wherein said linear arrangement of said plurality of wires forms a parallel circuit, said wires being arranged forming a plurality of wire planes, said plurality of wire planes arranged into a plurality of layers and said plurality of wire planes are generally perpendicular to a plane defined by each of said pair of electrically conductive conductor plates;

said first inductive subassembly and said second current carrying subassembly having a magnetically permeable core inserted therebetween, wherein said cyclic current flowing through said first plurality of electrically conductive wire segments generates a propagating and collapsing magnetic field therein and there-around said first plurality of electrically conductive wire segments, wherein said magnetic field traverses said second plurality of electrically conductive wire segments, generating a current flow through each of said second plurality of wire segments.

7. An electromagnetic device as recited in claim 1, further comprising:
a plurality of inductive subassemblies, each inductive subassembly having properties similar to said first inductive subassembly; and
at least one magnetically permeable core,
wherein said plurality of inductive subassemblies are combined in a stacked configuration having one of said at least one magnetically permeable core inserted between each pair of adjacently located inductive subassemblies.

8. An electromagnetic device as recited in claim 1, further comprising:
a plurality of inductive subassemblies, each inductive subassembly having properties similar to said first inductive subassembly; and
at least one magnetically permeable core,
wherein said plurality of inductive subassemblies are combined in an end to end configuration having one of said at least one magnetically permeable core inserted between each pair of adjacently located inductive subassemblies.

9. An electromagnetic device as recited in claim 1, further comprising:
a plurality of inductive subassemblies, each inductive subassembly having properties similar to said first inductive subassembly wherein at least one of said inductive subassemblies is formed in a tubular shape,
wherein said plurality of inductive subassemblies are combined in a sleeved configuration.

10. An electromagnetic device as recited in claim 1, further comprising:
a plurality of inductive subassemblies, each inductive subassembly having properties similar to said first inductive subassembly wherein at least one of said inductive subassemblies is formed in a tubular shape; and
at least one magnetically permeable core,
wherein said plurality of inductive subassemblies is combined in a sleeved configuration one of said at least one magnetically permeable core inserted between each pair of adjacently located inductive subassemblies.

11. An electromagnetic device configured to function as an electricity generator, said electromagnetic device comprising:
an enclosure having a first end, a second, opposite end, a pair of sidewalls spanning between edges of said first end and second end, a top member enclosing an upper opening formed by a continuous upper edge of said first end, second end and sidewalls, and a bottom member enclosing a lower opening formed by a continuous lower edge of said first end, second end and sidewalls, collectively forming an interior volume;
an inductive subassembly forming an inductor, said inductive subassembly located within said enclosure interior volume comprising:
a pair of electrically conductive conductor plates provided in a spatial arrangement;
a plurality of electrically conductive wire segments arranged having a first end of each of said plurality of electrically conductive wire segments electromechanically attached to a first conductive conductor plate of said pair of electrically conductive conductor plates and said second, opposite end of each of said plurality of electrically conductive wire segments electromechanically attached to a second conductive conductor plate of said pair of electrically conductive conductor plates and each of said plurality of electrically conductive wire segments extending linearly therebetween, wherein said linear arrangement of said plurality of wires forms a parallel circuit, said wires being arranged forming a plurality of wire planes, said plurality of wire planes arranged into a plurality of layers and said plurality of wire planes are generally perpendicular to a plane defined by each of said pair of electrically conductive conductor plates;
a second enclosure having a first end, a second, opposite end, a pair of sidewalls spanning between edges of said first end and second end, a top member enclosing an upper opening formed by a continuous upper edge of said first end, second end and sidewalls, and a bottom member enclosing a lower opening formed by a continuous lower edge of said first end, second end and sidewalls, collectively forming a second interior volume;
a second cyclic current carrying subassembly in which said second current is induced by a cyclically moving magnetic field created by a current flowing through said first subassembly, wherein said second current carrying subassembly is located within said second enclosure interior volume comprising:
a second pair of electrically conductive conductor plates provided in a spatial arrangement;
a second plurality of electrically conductive wire segments linearly arranged spanning between said second pair of electrically conductive conductor plates forming a second parallel circuit comprising each of said respective second plurality of electrically conductive wire segments, said second plurality of electrically conductive wire segments being arranged forming a second plurality of planes, said second plurality of planes arranged into a second plurality of layers;
said first enclosure and said second enclosure being assembled to and separated by a magnetically permeable core,
wherein a cyclic current flowing through said first plurality of electrically conductive wire segments generates a cyclically moving magnetic field in and about said first plurality of electrically conductive wire segments, wherein said cyclically moving magnetic field traverses said second plurality of electrically conductive wire segments, generating a current flow through each of said second plurality of wire segments.

12. An electromagnetic device as recited in claim 11, said plurality of wire segments further being provided in a parallel arrangement with one another.

13. An electromagnetic device as recited in claim 11, each of said plurality of wire segments further comprising a rectangular cross section shape.

14. An electromagnetic device as recited in claim 11, said enclosure further comprising a coupling feature provided on at least one of:
- one of said sidewalls,
- said first end wall,
- said second end wall,
- said top member, and
- said bottom member,
wherein said coupling feature provides a mechanical joint for assembling said enclosure to one of a like enclosure and a magnetically permeable core to increase the efficiency of the generated magnetic field.

15. An electromagnetic device as recited in claim 11, further comprising at least one magnetically permeable core, said magnetically permeable core being oriented substantially planar to said plurality of planes of wires.

16. An electromagnetic device as recited in claim 15, said magnetically permeable core further comprising at least one magnetically permeable metal sheet said at least one magnetically permeable metal sheet being separated from an adjacent magnetically permeable metal sheet by an insulation sheet.

17. An electromagnetic device as recited in claim 11, further comprising:
- a plurality of enclosures, each enclosure having properties similar to said first enclosure;
- a plurality of inductive subassemblies, each inductive subassembly having properties similar to said first inductive subassembly and is located within a respective enclosure interior volume;
- at least one magnetically permeable core wherein said plurality of enclosures is combined in a stacked configuration having one of said at least one magnetically permeable core inserted between each pair of adjacent enclosures.

18. An electromagnetic device comprising:
- at least one inductive subassembly comprising:
- a pair of electrically conductive conductor plates provided in a spatial arrangement;
- a plurality of electrically conductive wire segments arranged having a first end of each of said plurality of electrically conductive wire segments electromechanically attached to a first conductive conductor plate of said pair of electrically conductive conductor plates and said second, opposite end of each of said plurality of electrically conductive wire segments electromechanically attached to a second conductive conductor plate of said pair of electrically conductive conductor plates and each of said plurality of electrically conductive wire segments extending linearly therebetween, wherein said linear arrangement of said plurality of wires forms a parallel circuit, said wires being arranged forming a plurality of wire planes, each wire plane having a first distal wire defining a first edge of said wire plane and a second, opposite distal wire defining a second, opposite edge of said wire plane and at least one wire being between and coplanar with said first distal wire and said second distal wire, said plurality of wire planes arranged into a plurality of layers and said plurality of wire planes are generally parallel with one another and perpendicular to a plane defined by each of said pair of electrically conductive conductor plates;
- wherein a cyclic voltage differential is applied between said pair of conductor plates,
- wherein said cyclic voltage differential generates a cyclic current flow through each of said plurality of wire segments creating a cyclic magnetic field about each of said at least one inductive subassemblies.

19. An electromagnetic device of claim 18, further comprising:
- at least one second electromagnetic subassembly comprising at least one inductive subassembly comprising:
- a second pair of electrically conductive conductor plates provided in a spatial arrangement;
- a second plurality of electrically conductive wire segments arranged having a first end of each of said plurality of electrically conductive wire segments electromechanically attached to a first conductive conductor plate of said pair of electrically conductive conductor plates and said second, opposite end of each of said plurality of electrically conductive wire segments electromechanically attached to a second conductive conductor plate of said pair of electrically conductive conductor plates and each of said plurality of electrically conductive wire segments extending linearly therebetween, wherein said linear arrangement of said plurality of wires forms a parallel circuit, said wires being arranged forming a plurality of wire planes, each wire plane having a first distal wire defining a first edge of said wire plane and a second, opposite distal wire defining a second, opposite edge of said wire plane and at least one wire being between and coplanar with said first distal wire and said second distal wire, said plurality of wire planes arranged into a plurality of layers and said plurality of wire planes are generally parallel with one another and perpendicular to a plane defined by each of said pair of electrically conductive conductor plates;
- wherein said cyclic magnetic field of said at least one first inductive subassemblies induces a cyclic current flow in said plurality of electrically conductive wire segments of said at least one second electromagnetic subassembly.

20. An electromagnetic device as recited in claim 18, wherein said indicative subassembly is a first subassembly, and said electromagnetic device further comprising:
- at least one second inductive subassembly comprising;
- a second plurality of electrically conductive wires forming a second parallel circuit thereof, said second plurality of electrically conductive wires being arranged forming a plurality of planes, each wire plane of said second plurality of electrically conductive wires having a first distal wire defining a first edge of said wire plane and a second, opposite distal wire defining a second, opposite edge of said wire plane and at least one wire being between and coplanar with said first distal wire and said second distal wire, said plurality of planes arranged into a plurality of layers;
- wherein a cyclic voltage differential is applied to said first plurality of electrically conductive wires;
- wherein said cyclic voltage differential generates a cyclic current flow through each of said wires of said first plurality of wires;
- wherein the said cyclic current flow creates a cyclic magnetic field in and about each of said wires of said first plurality of wires;

wherein said frequency of said cyclic current flow in and about each of said wires of said first plurality of wires determines the frequency of the cyclic magnetic field in and about each of said wires of said first plurality of wires;

wherein said cyclic magnetic field in and about each of said wires of said first plurality of wires traverses in a cyclic manner each of said wires of said second plurality of wires;

wherein said traverse of said cyclic magnetic field induces a cyclic voltage in each of said wires of said second plurality of wires;

wherein the value of said induced cyclic voltage is a function of the cyclic voltage of the current flowing in each of said wires of said first plurality of wires, the frequency of said current, and the ratio of the numeric value of the plurality of wires comprising the at least one second subassembly to that of the numeric value of the plurality of wires comprising the first subassembly;

wherein said traverse induces a cyclic current flow in each of said wires of said second plurality of wires;

wherein the amperage of the cyclic current induced in each of said wires of said second plurality of wires is a function of amperage of the current flowing in each of said wires of said first plurality of wires and the inverse ratio of the numeric value of said second plurality of wires to that of the numeric value of said first plurality of wires.

* * * * *